United States Patent [19]
Nakamura et al.

[11] Patent Number: 4,917,981
[45] Date of Patent: Apr. 17, 1990

[54] PHOTOSENSITIVE MEMBER FOR ELECTROPHOTOGRAPHY

[75] Inventors: Yoichi Nakamura; Masami Kuroda; Noboru Furusho, all of Kanagawa, Japan

[73] Assignee: Fuji Electric Co., Ltd., Kanagawa, Japan

[21] Appl. No.: 138,118

[22] Filed: Dec. 28, 1987

[30] Foreign Application Priority Data

Dec. 25, 1986 [JP] Japan .................................. 61-313499
Jan. 19, 1987 [JP] Japan .................................. 62-9245
Jan. 20, 1987 [JP] Japan .................................. 62-10435
Jan. 26, 1987 [JP] Japan .................................. 62-15437
Jan. 29, 1987 [JP] Japan .................................. 62-18967

[51] Int. Cl.$^4$ .............................................. G03G 5/06
[52] U.S. Cl. ......................................... 430/75; 430/76; 430/79; 430/82; 534/761; 534/796; 534/797; 534/799
[58] Field of Search ..................... 430/75, 76, 79, 82; 534/761, 796, 797, 799

[56] References Cited

U.S. PATENT DOCUMENTS

3,615,384 10/1971 Gipstein et al. ........................ 430/75
4,123,270 10/1978 Heil et al. ............................. 430/128
4,568,623 2/1986 Makino et al. ..................... 430/75 X
4,808,503 2/1989 Yamada et al. ....................... 430/75

*Primary Examiner*—Paul R. Michl
*Assistant Examiner*—Jeffery A. Lindeman
*Attorney, Agent, or Firm*—Sughrue, Mion, Zinn, Macpeak & Seas

[57] ABSTRACT

A photosensitive member for electrophotography which comprises a photosensitive layer containing at least one member of the group consisting of thiophene structure-containing azo compounds having one of the general formulae (I) to (X):

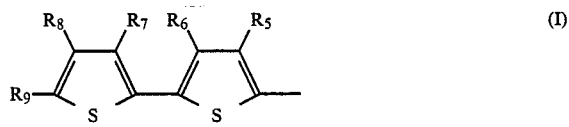

(I)

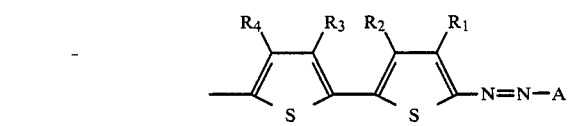

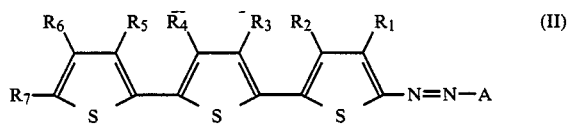

(II)

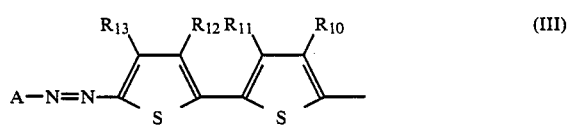

(III)

(IV)

(V)

(VI)

(Abstract continued on next page.)

-continued
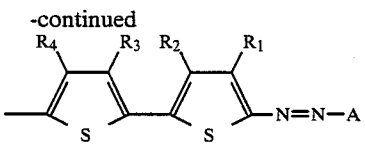
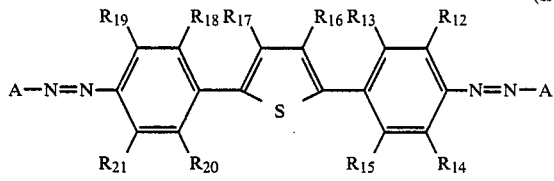
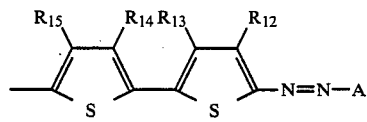
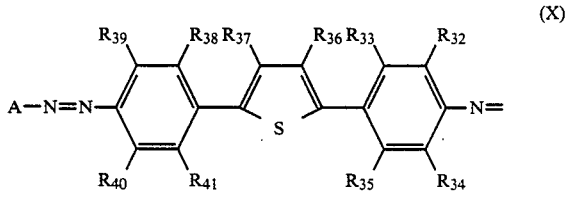
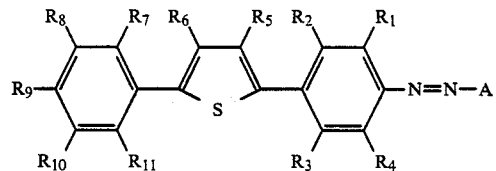
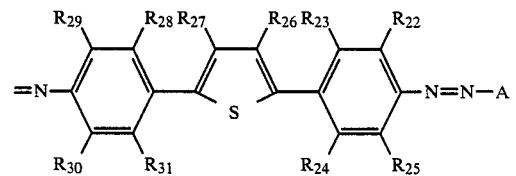
wherein all the symbols are defined in the specification.
13 Claims, 1 Drawing Sheet

PHOTOSENSITIVE MEMBER FOR ELECTROPHOTOGRAPHY

FIELD OF THE INVENTION

This invention relates to a photosensitive member for electrophotography. More particularly, it relates to a photosensitive member for electrophotography which contains a specific thiophene structure-containing azo compound in the photosensitive layer formed on an electroconductive substrate.

BACKGROUND OF THE INVENTION

Photosensitive materials so far used in photosensitive members for electrophotography (hereinafter also referred to as "photosensitive members") include inorganic photoconductive substances, such as selenium and selenium alloys, dispersions of inorganic photoconductive substances, such as zinc oxide and cadmium sulfide, in resin binders, organic photoconductive substances, such as poly-N-vinylcarbazole and polyvinylanthracene, organic photoconductive substances, such as phthalocyanine compounds and bisazo compounds, and dispersions of such organic photoconductive substances in resin binders.

Photosensitive members are required to have the function of holding surface charges in the dark, the function of receiving light and generating charges and the function of receiving light and transporting charges. There are two kinds of photosensitive members, namely, the so-called monolayer type photosensitive member consisting of one single layer having all the three functions and the so-called laminate type photosensitive member composed of functionally distinguishable layers, namely, a layer which contributes mainly to charge generation and a layer which contributes mainly to retention of surface charges in the dark and charge transport upon receiving light. In electrophotographic image formation using these photosensitive members, the technique of Carlson, for example, is applied. Image formation by this technique includes charging of the photosensitive member by corona discharge in the dark, formation of latent electrostatic images (e.g., letters, pictures) by illumination of the charged photosensitive member surface, development of the latent electrostatic images thus formed with a toner and fixation of the developed toner images on a supporting member, such as a paper sheet. After toner image transfer, the photosensitive member is subjected to the steps of charge removal, removal of remaining toner (cleaning), residual charge neutralization by means of light (erasion), and so on, and then submitted to reuse.

In recent years, photosensitive members for electrophotography in which organic materials are used have been put to practical use because of their advantageous features such as flexibility, thermal stability and film forming property. Thus, for example, there may be mentioned photosensitive members comprising poly-N-vinylcarbazole and 2,4,7-trinitrofluoren-9-one (described in U.S. Pat. No. 3,484,237), photosensitive members in which an organic pigment is used as the main component (described in Japanese Patent Application (OPI) No. 37543/72) (the term "OPI" as used herein refers to a "published unexamined Japanese patent application") and photosensitive members in which a eutectic complex is used as the main component (Japanese Patent Application (OPI) No. 10735/72). A number of novel hydrazone compounds have also been put to practical use.

However, although organic materials have a number of advantageous features as compared with inorganic materials, none of organic materials can fully meet all requirements set forth with respect to the characteristic properties of photosensitive members for electrophotography. Organic materials are still unsatisfactory particularly in respect of photosensitivity and of characteristics in continuous repeated use.

Accordingly, it is an object of the invention, which has been made in view of the foregoing, to provide a photosensitive member for use in electrophotography, which has high sensitivity and shows good characteristics in repeated use, through the use, as a charge generating substance in the photosensitive layer, of a novel organic material that has not yet been used.

SUMMARY OF THE INVENTION

In accordance with the invention, the above object is achieved by using a photosensitive member for electrophotography which has a photosensitive layer containing at least one thiophene structure-containing azo compound selected from compounds having one of the following structural formulae (I) to (X):

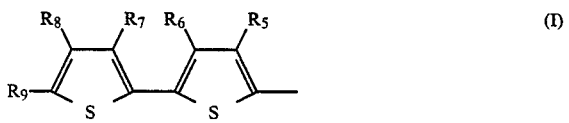

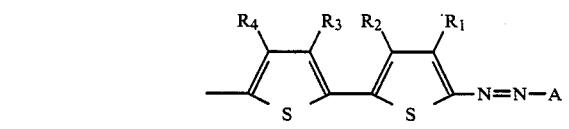

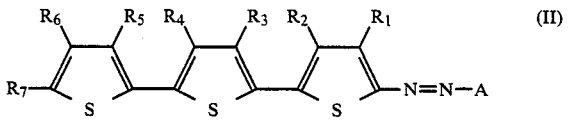

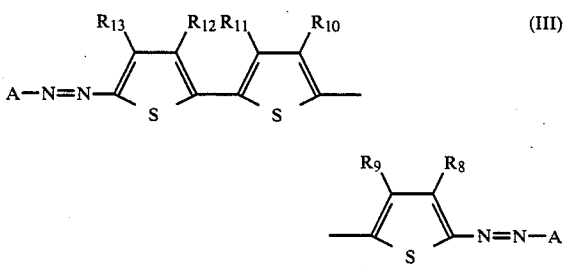

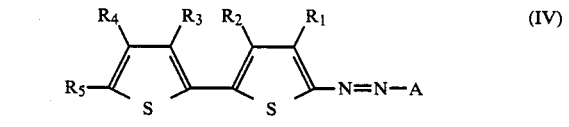

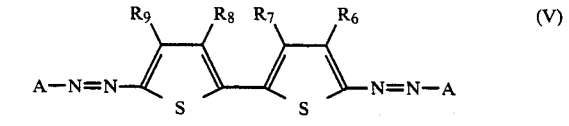

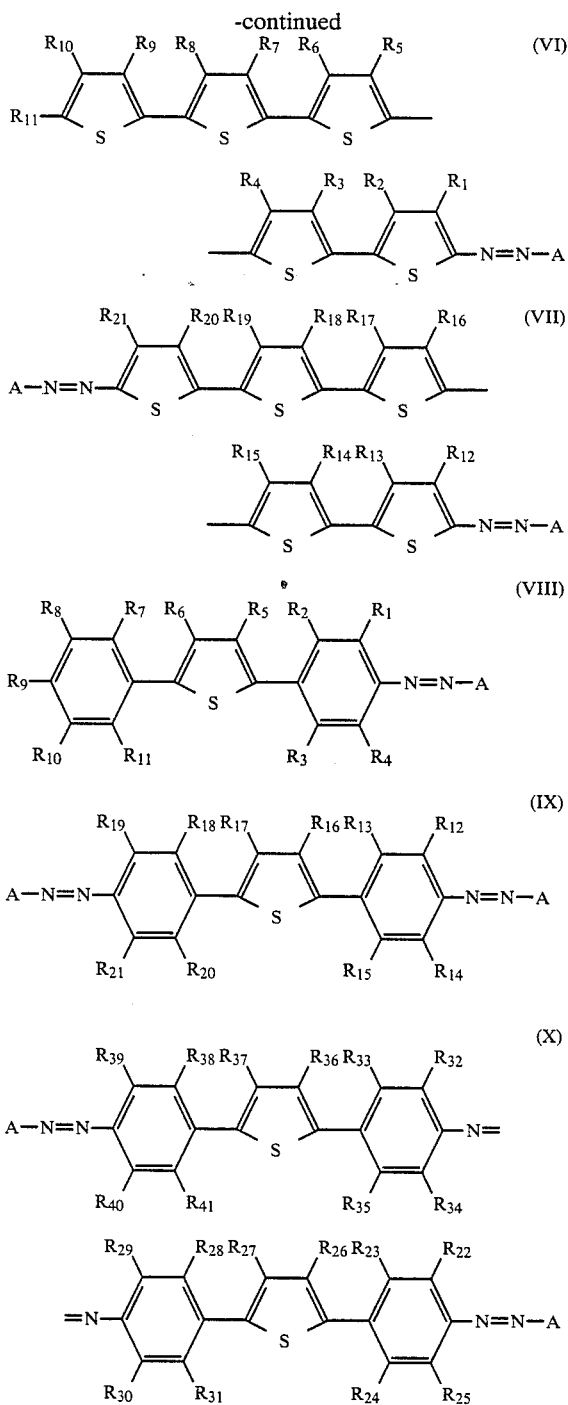

In the above formulae (I) to (X), $R_1$ to $R_{41}$ each is a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A is a coupler residue.

DETAILED DESCRIPTION OF THE INVENTION

Figure 1:
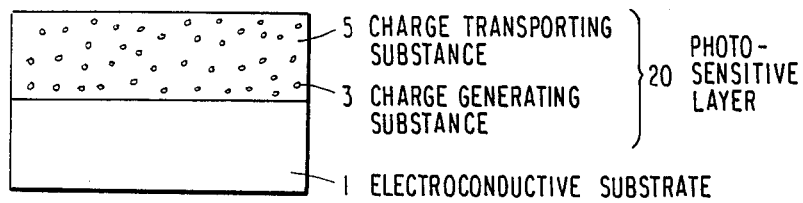
FIGS. 1 to 3 each is a schematic cross-sectional representation of a photosensitive member of the invention. The three embodiments shown differ in mode from one another. In the figures, an electroconductive substrate is indicated by reference number 1, a charge generating substance by 3, a charge generating layer by 4, a charge transporting substance by 5, a charge transport layer by 6, a covering layer by 7, and a photosensitive layer by 20, 21 or 22.

As for the use of the azo compounds represented by the general formulae given above in photosensitive layers, there has been no precedent before. In the course of their intensive study of various organic materials as made in an attempt to achieve the above object, the present inventors conducted a number of experiments with those azo compounds and, as a result, found that the use of such specific azo compounds represented by the above general formulae (I) to (X) as charge generating substances is very effective in improving electrophotographic characteristics, although the fact has not been given a satisfactory technical explanation as yet. Based on this finding, they obtained photosensitive members having high sensitivity and good repeated use characteristics.

The azo compounds of general formulae (I) to (X) to be used in accordance with the invention can be synthesized by reacting the corresponding diazonium salt and coupler in an appropriate organic solvent, such as N,N-dimethylformamide (DMF), in the presence of a base (coupling reaction).

The corresponding diazonium salts can be synthesized by diazotizing the corresponding amines in conventional means, and such the amines can be synthesized by reducing the corresponding nitro compounds in conventional means (for example, reducing in ethyl alcohol by using hydrogen chloride or an iron metal as a catalyst). The corresponding nitro compounds can be prepared by nitrating the corresponding thiophene compounds in conventional means (for example, reacting with sulfuric acid and nitric acid).

The alkyl group and alkoxy group as $R_1$ to $R_{41}$ in the formulae (I) to (X) have preferably 1 to 6 carbon atoms, respectively. The acyl group as $R_1$ to $R_{41}$ includes an aliphatic acyl group having preferably 1 to 6 carbon atoms and an aromatic acyl group such as a benzoyl group or a naphthoyl group. The halogen atom as $R_1$ to $R_{41}$ includes a chlorine atom, a fluorine atom and a bromine atom. The alkylamino group as $R_1$ to $R_{41}$ includes a monoalkylamino group and a dialkylamino group in which the alkyl substituent has preferably 1 to 5 carbon atoms. The ester group as $R_1$ to $R_{41}$ includes a methyl ester group and an ethyl ester group. The arylamino group as $R_1$ to $R_{41}$ includes as the aryl substituent a phenyl group and a naphthyl group both of which may be further substituted. The aryl group as $R_1$ to $R_{41}$ includes a phenyl group and a naphthyl group. The aralkyl group as $R_1$ to $R_{41}$ has preferably 7 to 20 carbon atoms and includes as the aryl substituent a phenyl group and a naphthyl group. Among the above groups as $R_1$ to $R_{41}$, the aryl substituents may be further substituted with, for example, a halogen atom, an aldehyde group or an alkyl group, and also the alkyl substituents may be further substituted with, for example, a halogen atom or an aldehyde group. The coupler residue as A in the formulae (I) to (X) includes a naphthol type coupler residue and a pyrazolone type coupler residue.

Typical examples of the thus-obtainable azo compound of general formulae (I) to (X) are given below. In the first place, examples of the azo compounds of general formula (I) are shown.
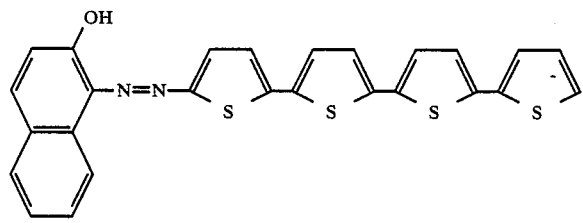
I-1
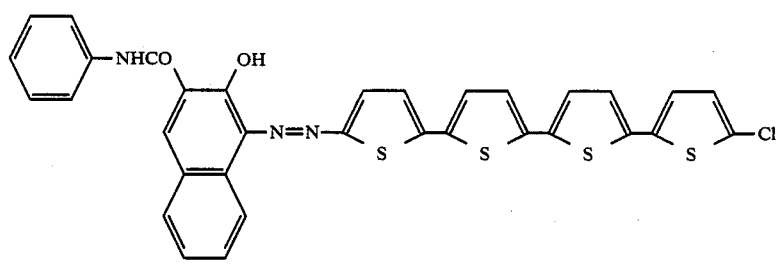
I-2
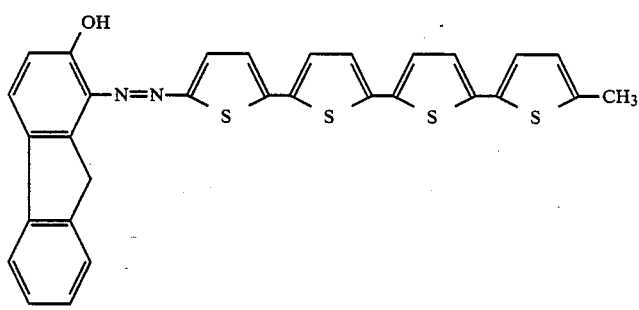
I-3
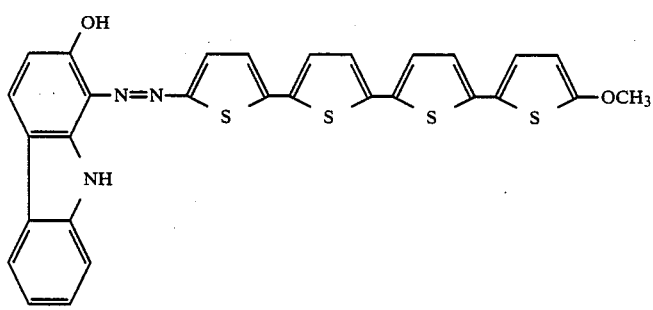
I-4
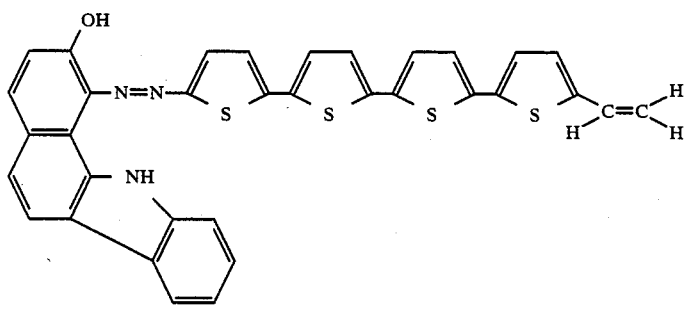
I-5

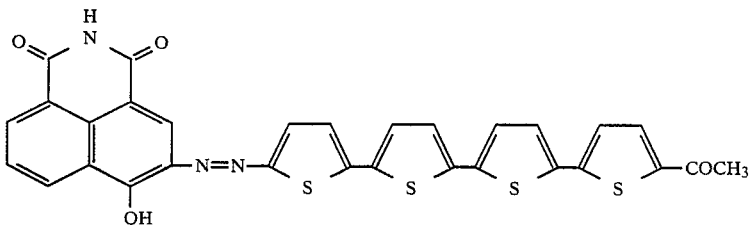
I-6
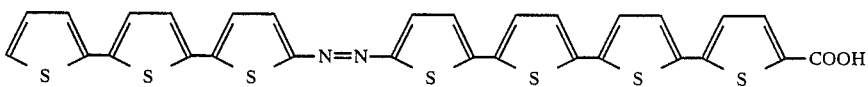
I-7
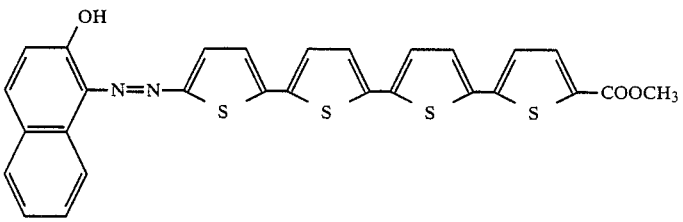
I-8
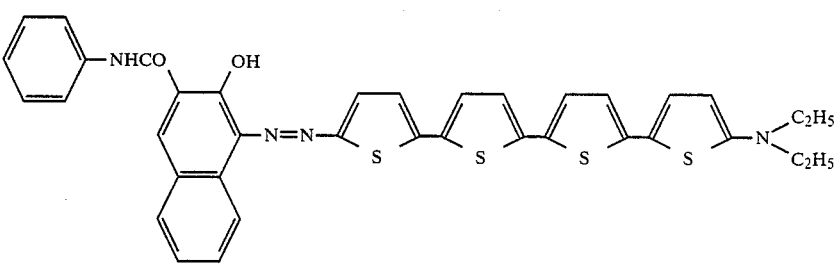
I-9
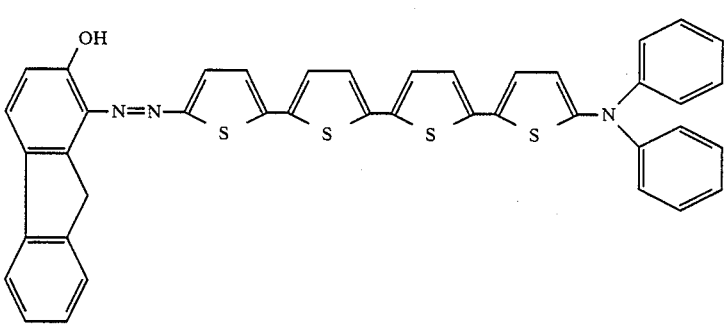
I-10
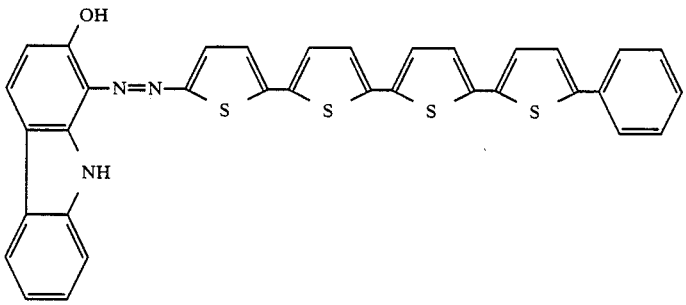
I-11

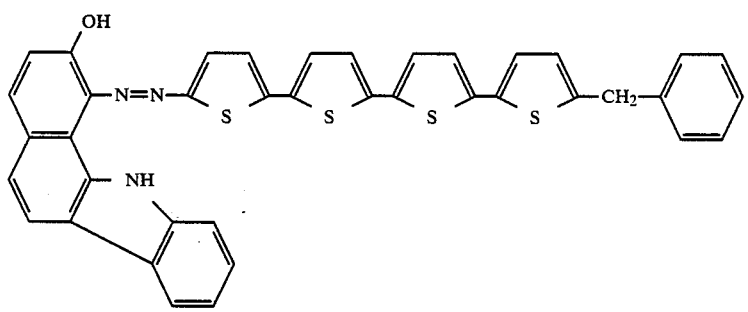
I-12
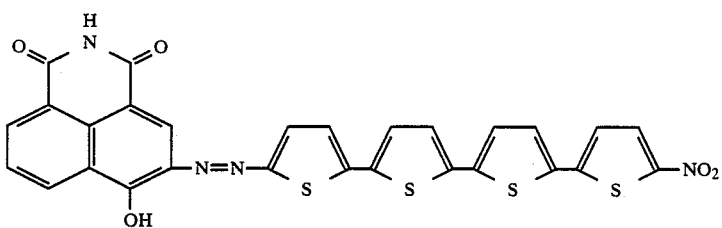
I-13
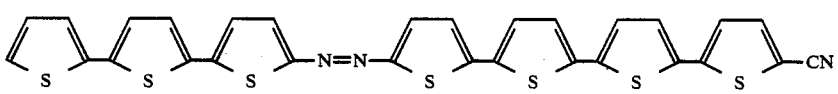
I-14
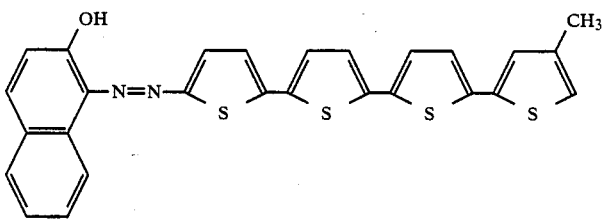
I-15
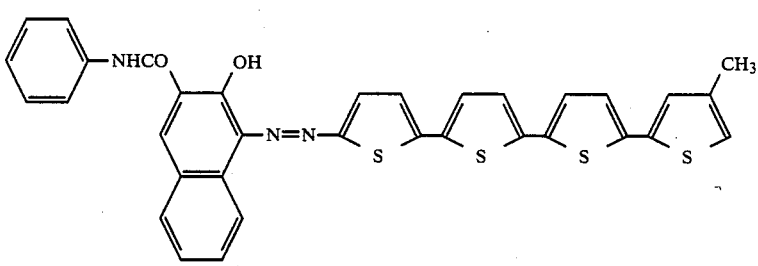
I-16
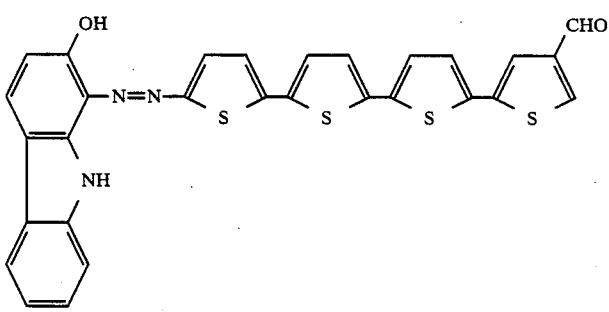
I-17

-continued
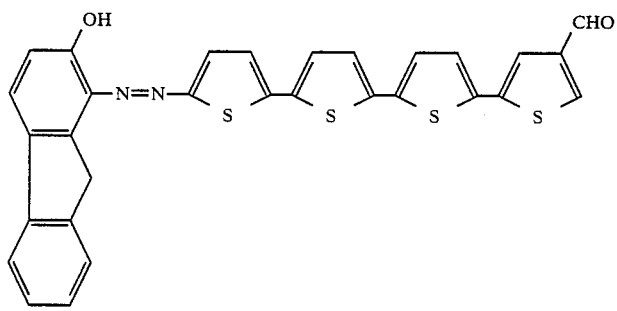
I-18
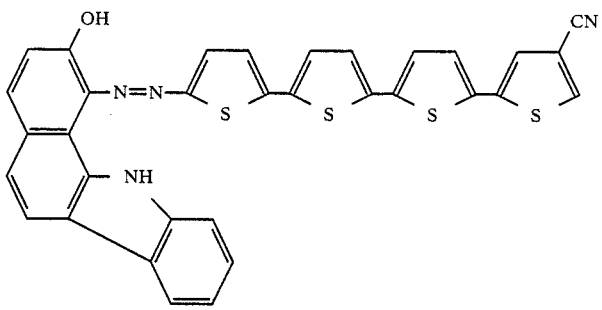
I-19
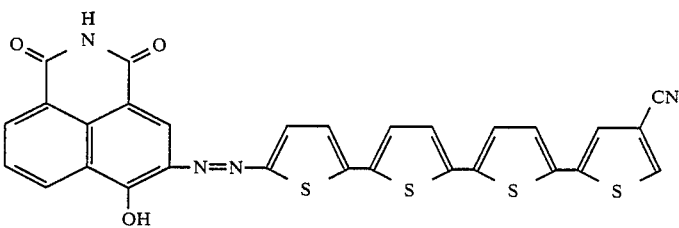
I-20
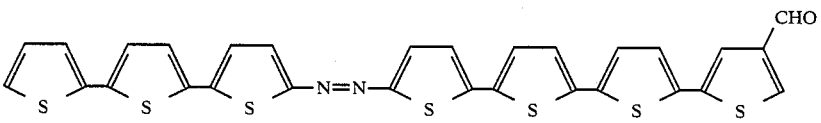
I-21
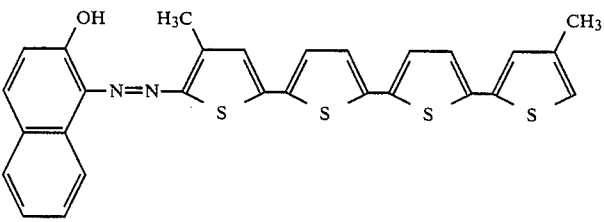
I-22
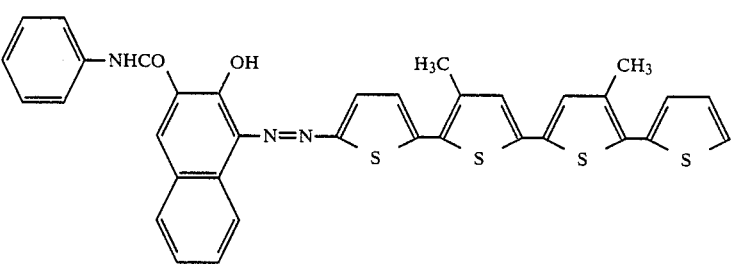
I-23

-continued
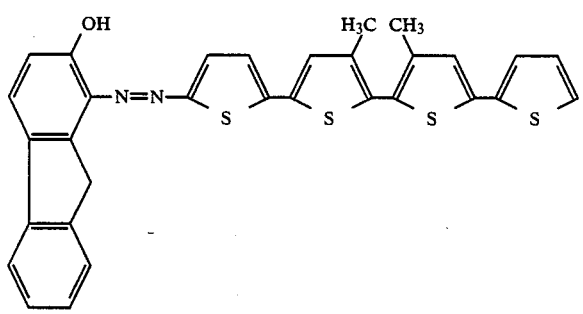 I-24
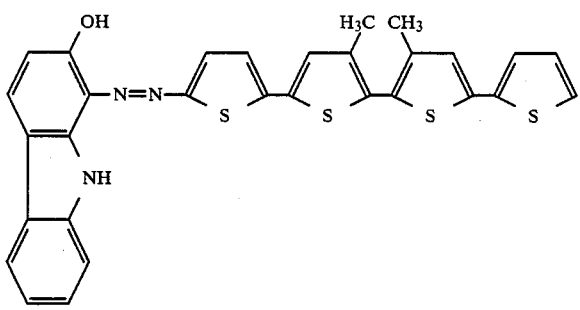 I-25
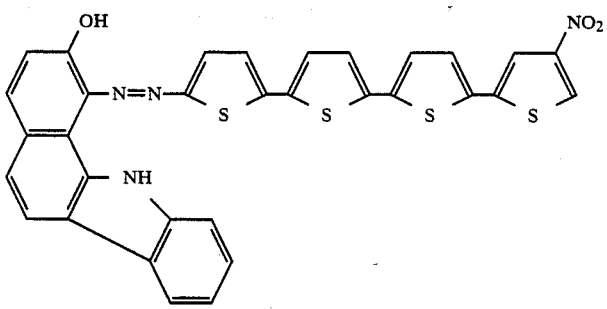 I-26
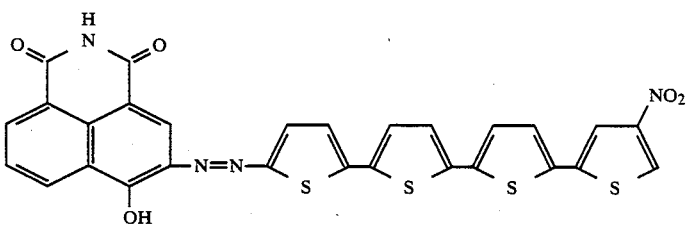 I-27
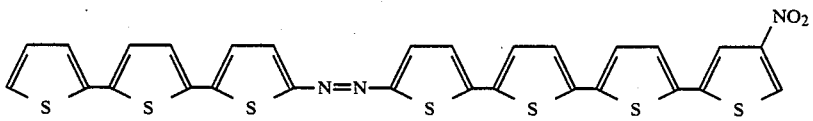 I-28
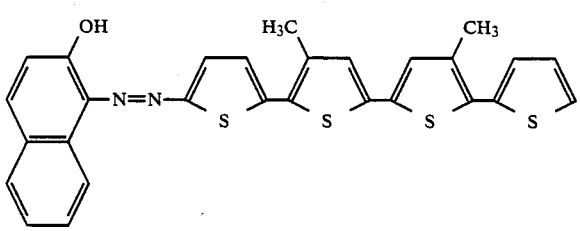 I-29

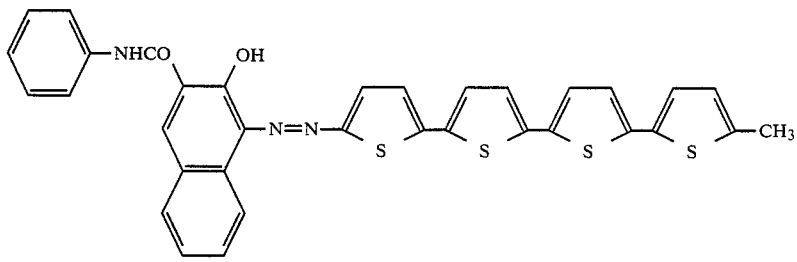
I-30
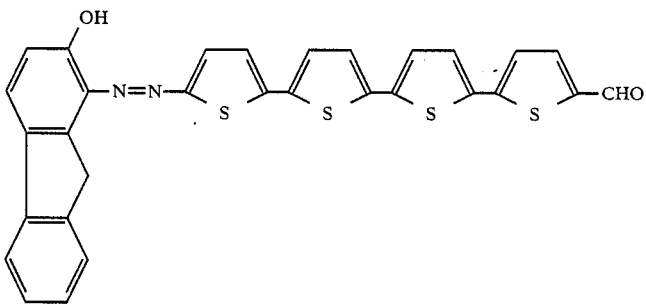
I-31
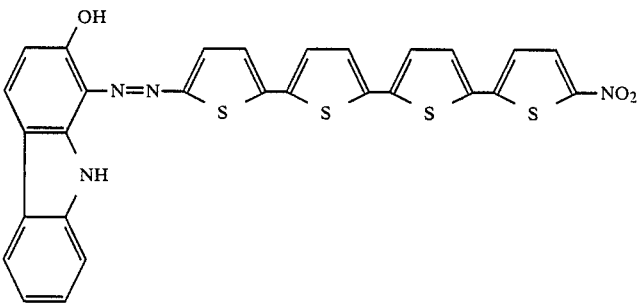
I-32
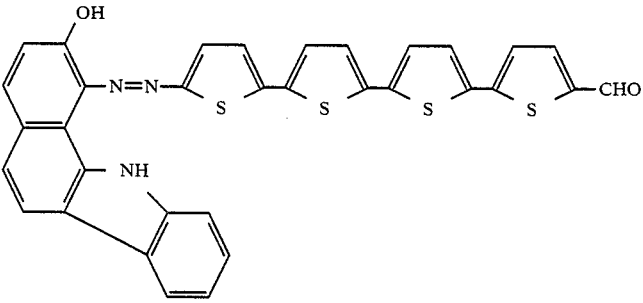
I-33
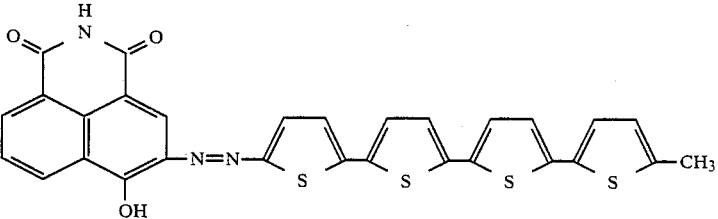
I-34
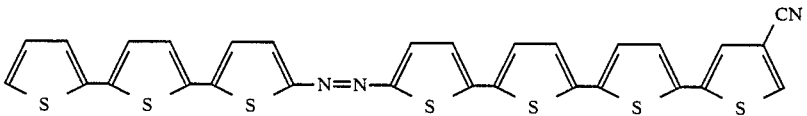
I-35
Examples of the azo compounds of general formula (II) and of general formula (III) are as follows:

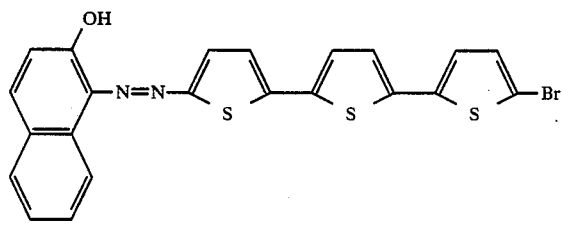 II-1
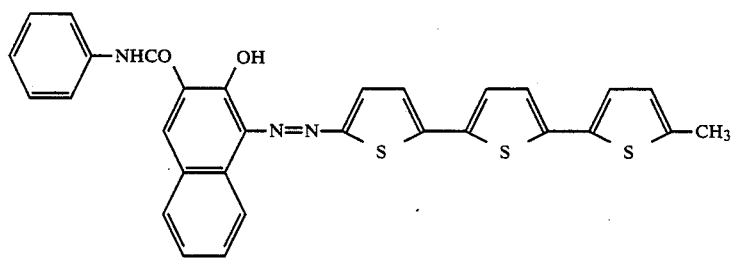 II-2
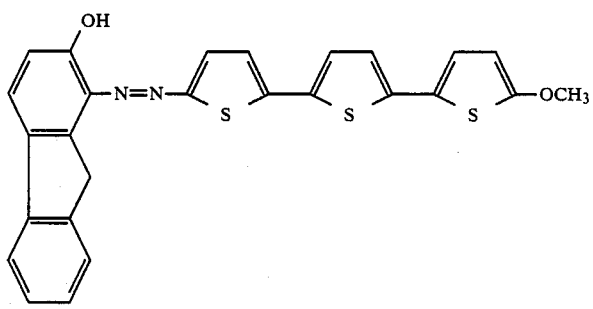 II-3
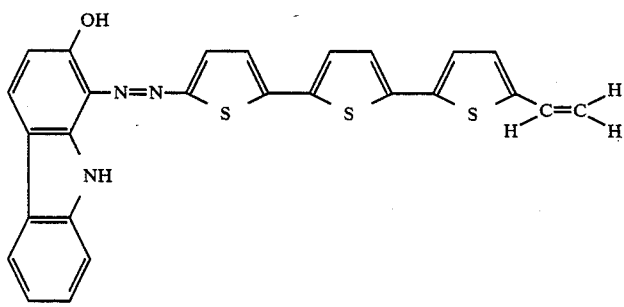 II-4
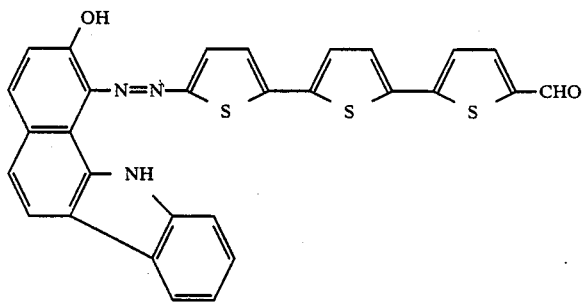 II-5
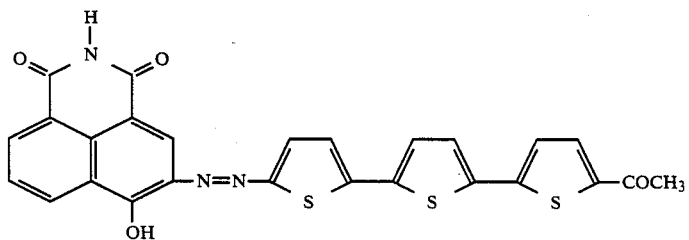 II-6

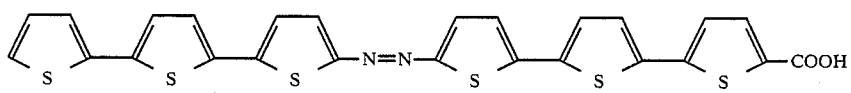
II-7
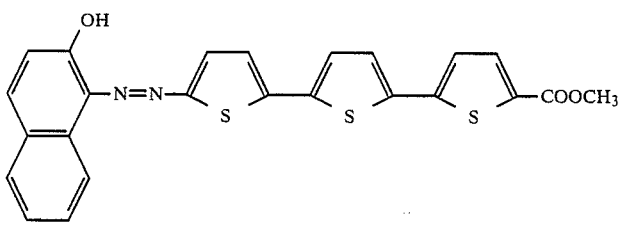
II-8
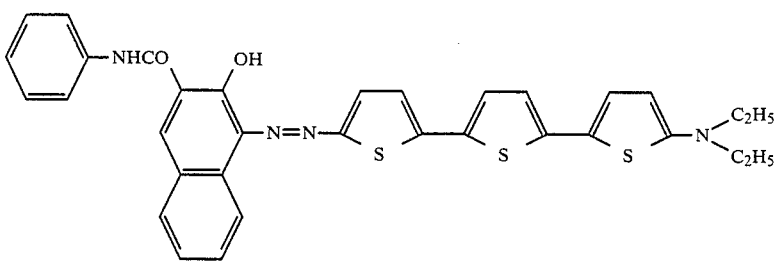
II-9
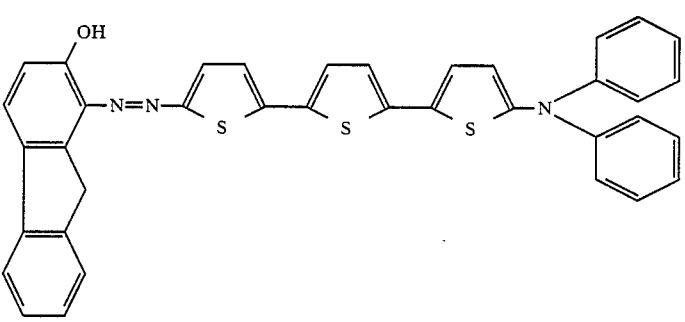
II-10
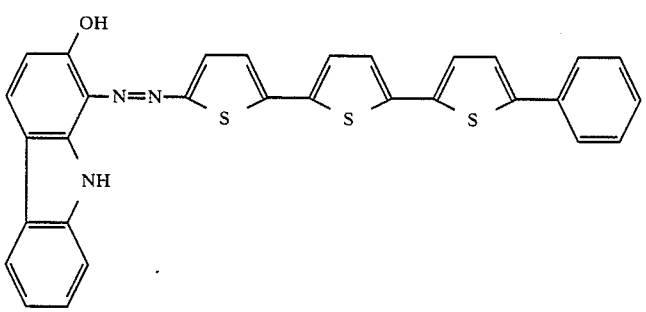
II-11
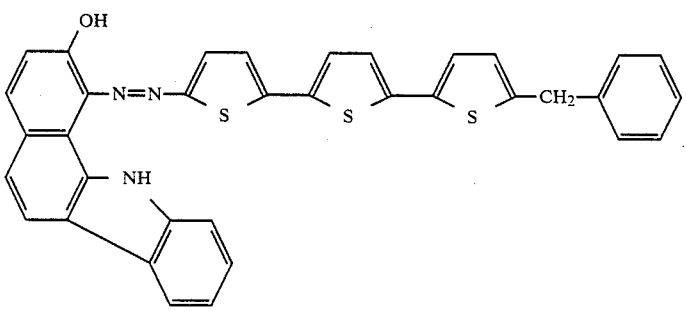
II-12

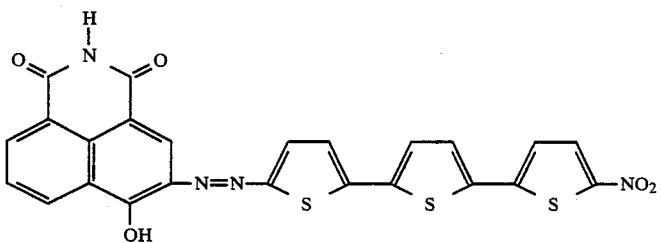
II-13
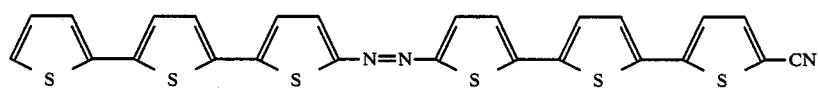
II-14
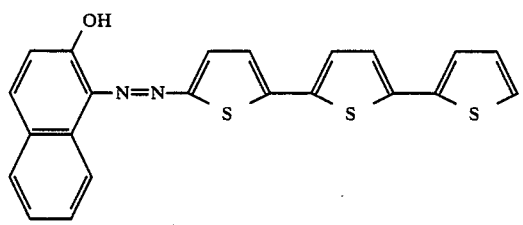
II-15
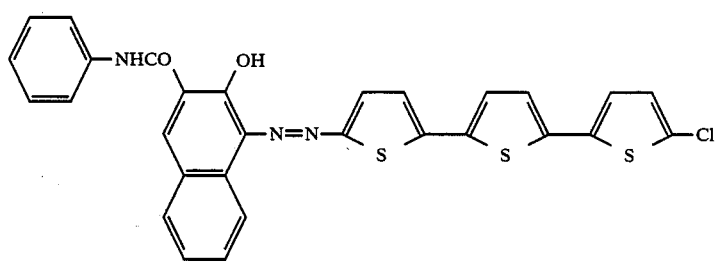
II-16
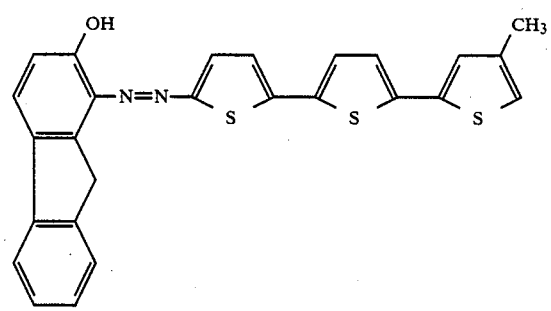
II-17
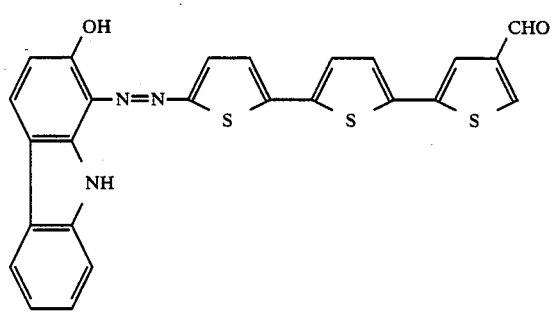
II-18

-continued
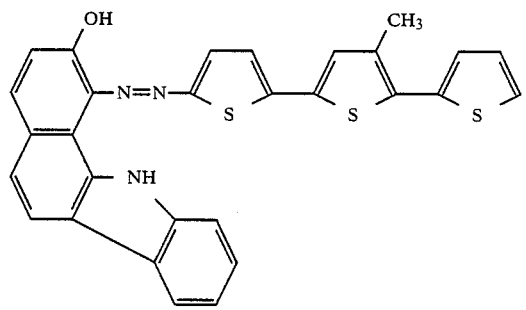
II-19
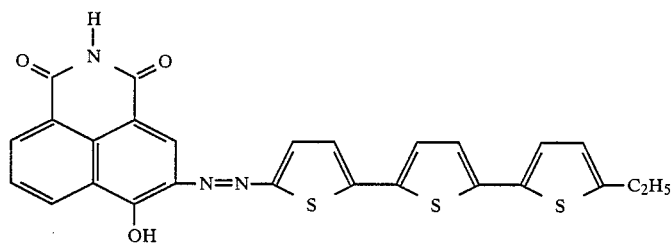
II-20
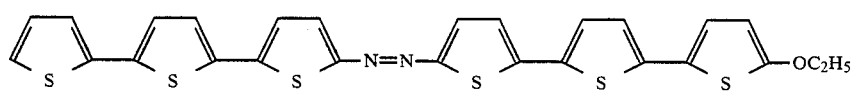
II-21
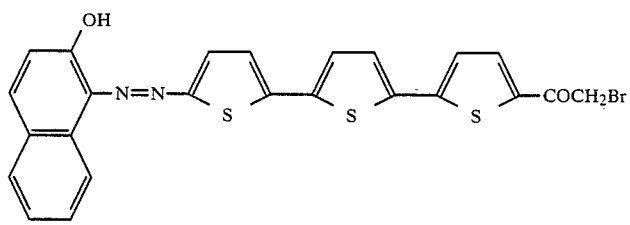
II-22
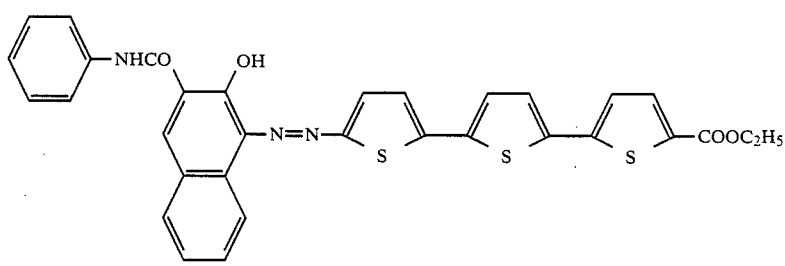
II-23
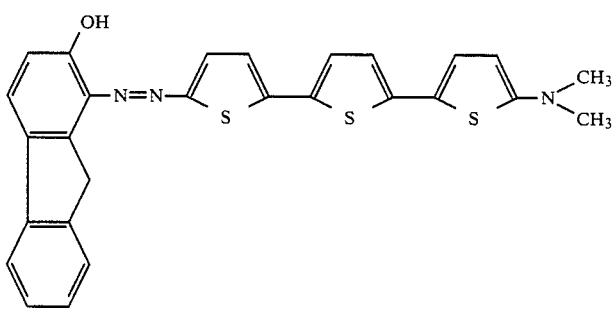
II-24

II-25
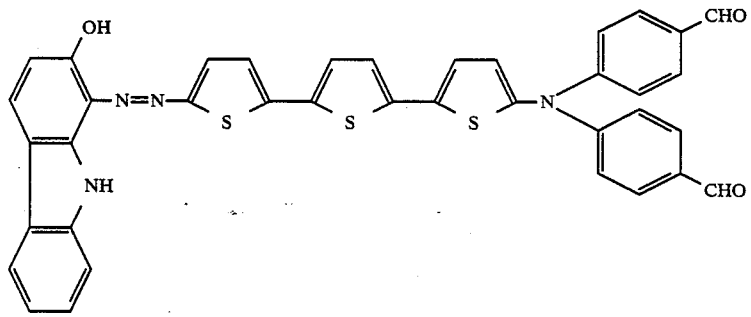
II-26
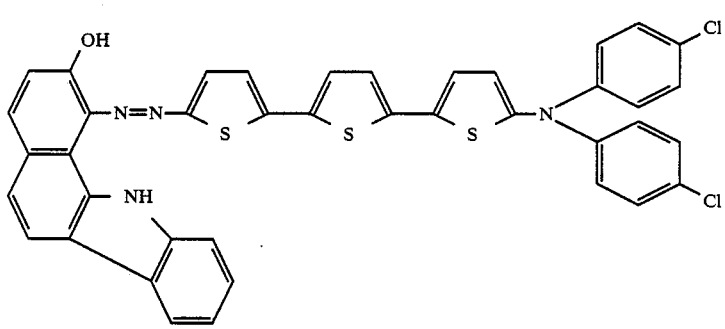
II-27
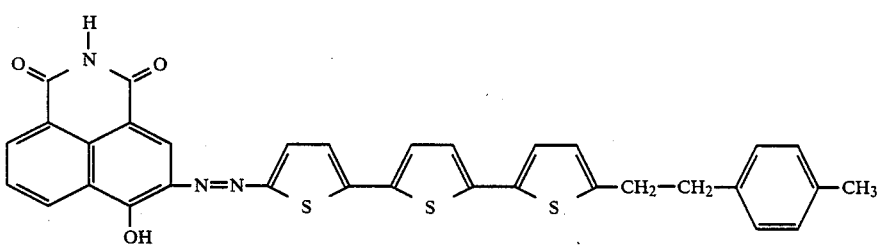
II-28
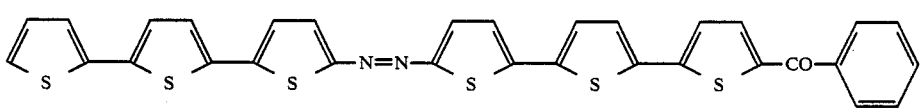
II-29
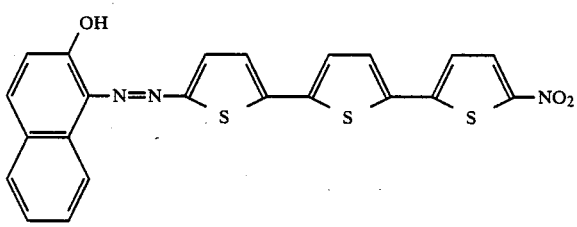
II-30
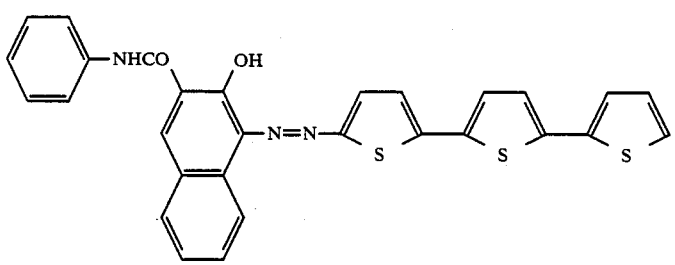

-continued
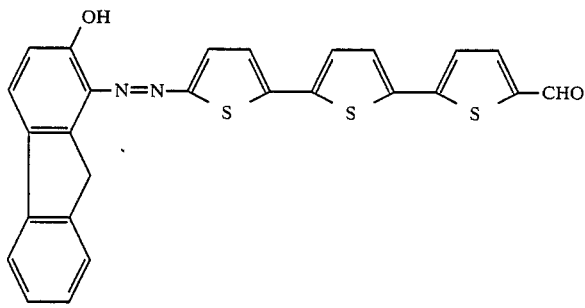
II-31
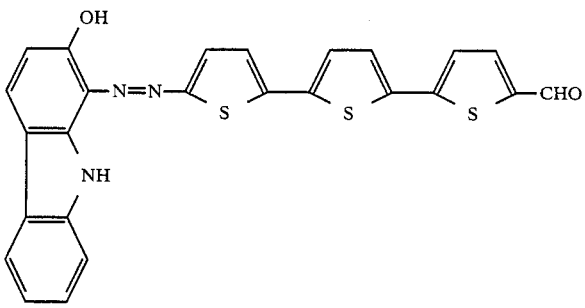
II-32
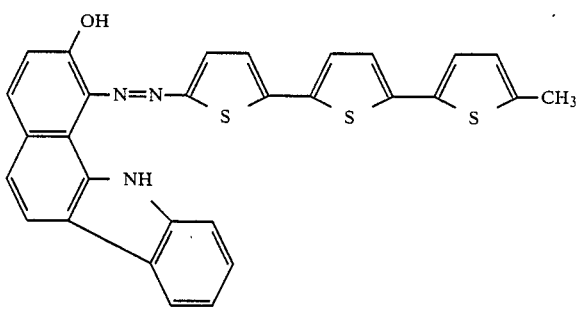
II-33
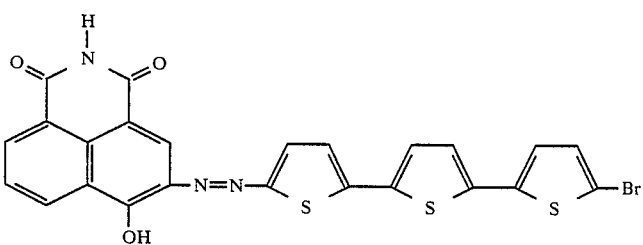
II-34
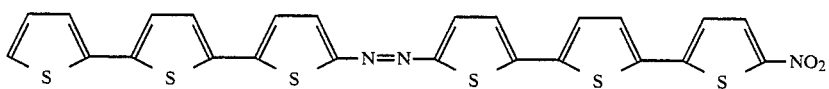
II-35
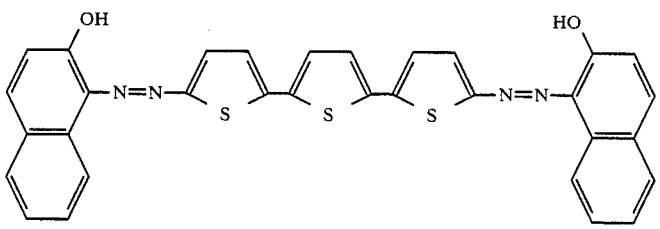
III-36

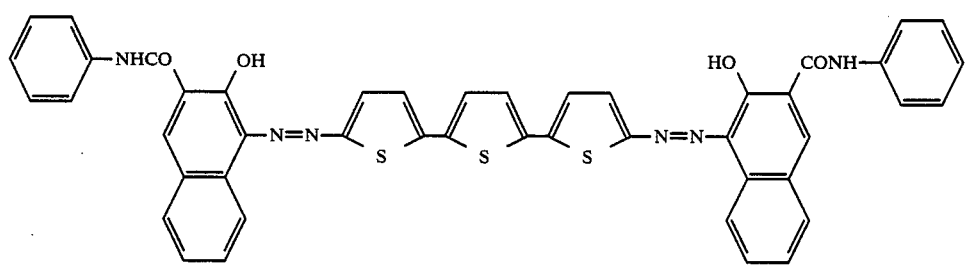
III-37
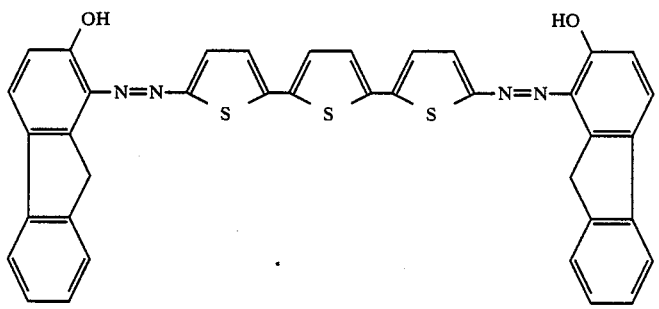
III-38
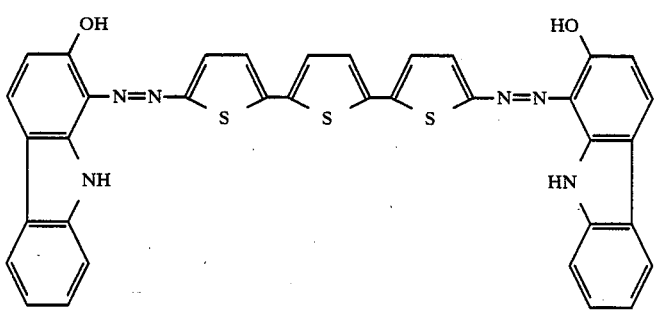
III-39
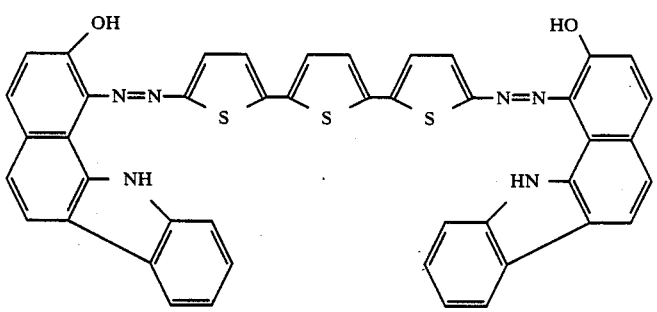
III-40
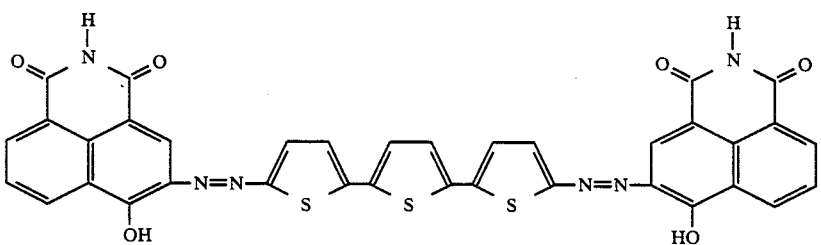
III-41
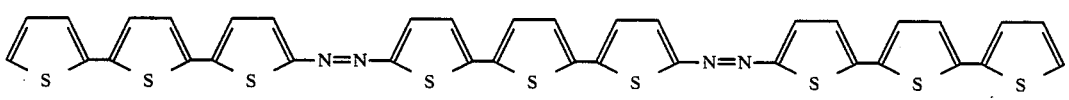
III-42

-continued
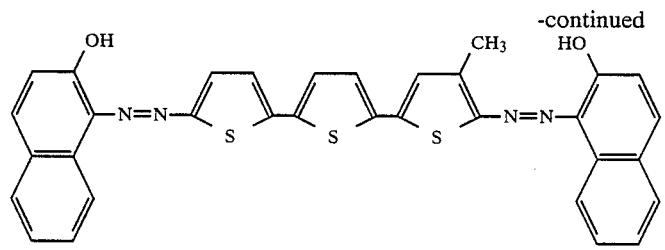
III-43
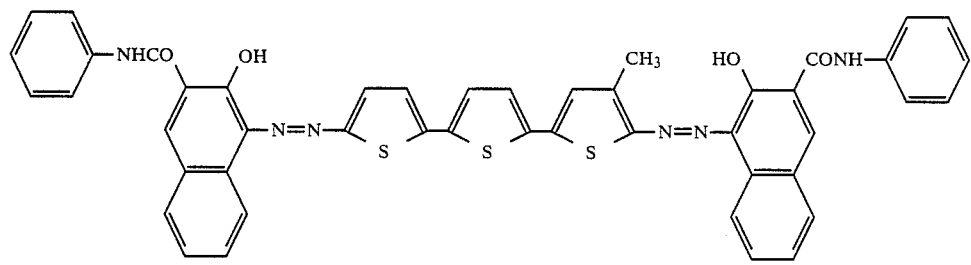
III-44
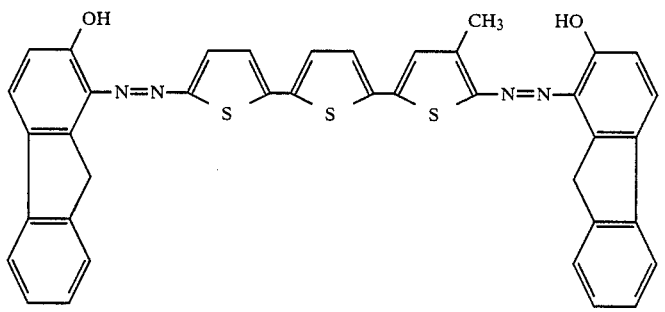
III-45
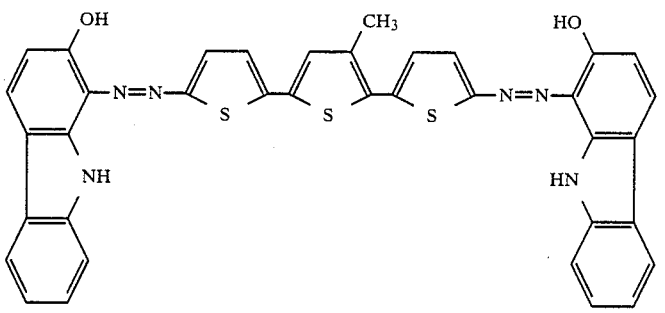
III-46
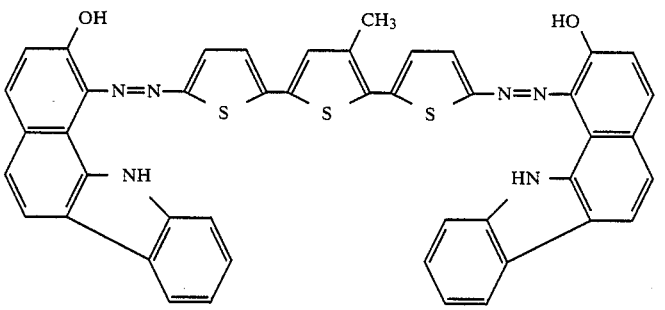
III-47
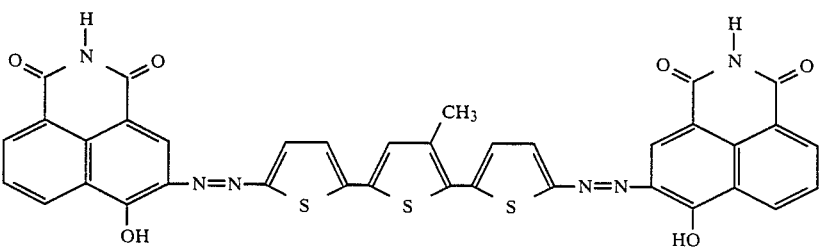
III-48

-continued
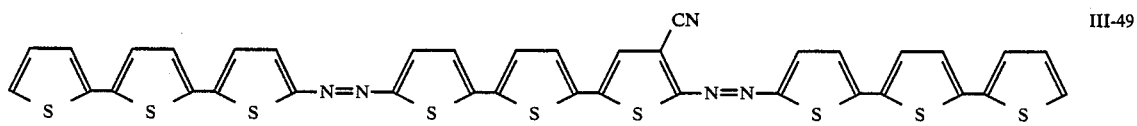
III-49
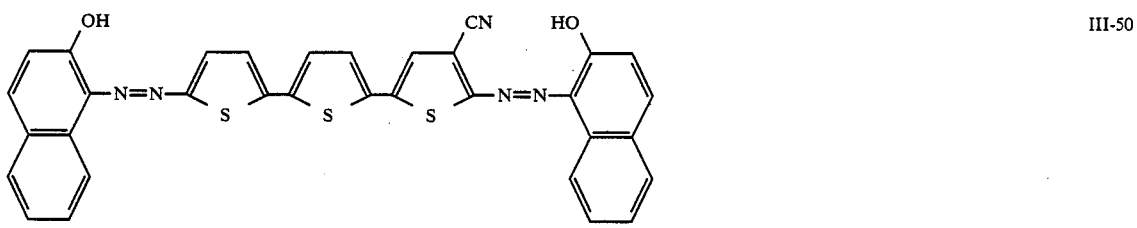
III-50
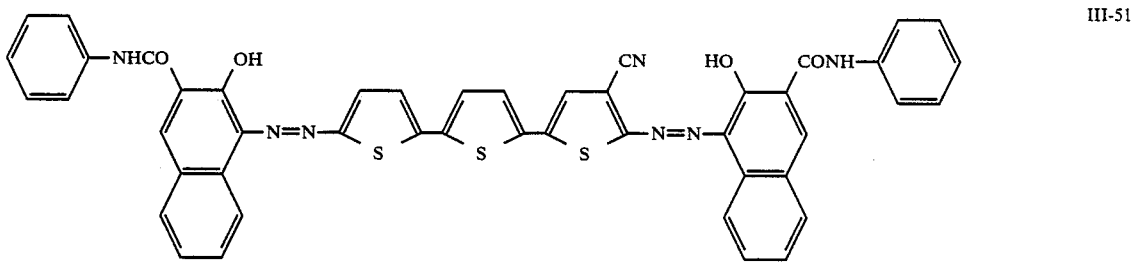
III-51
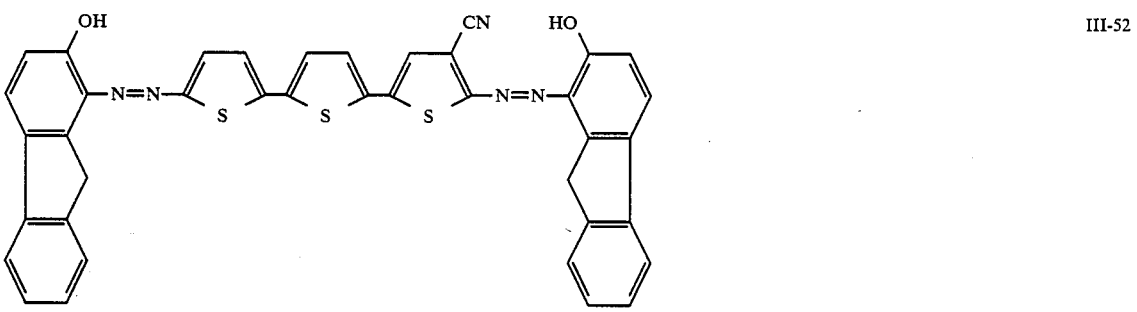
III-52
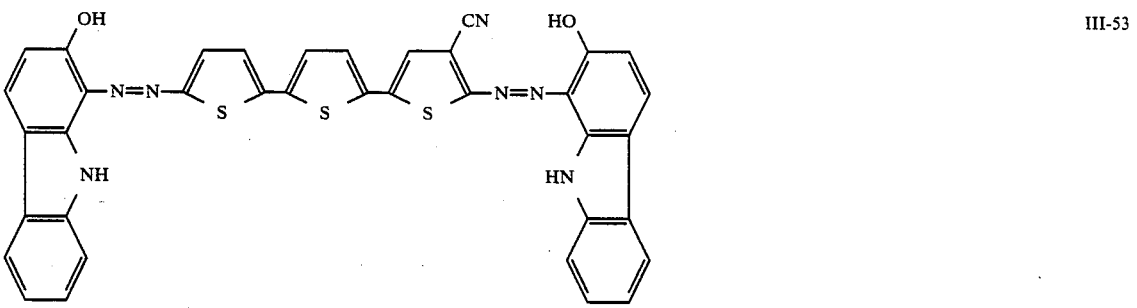
III-53
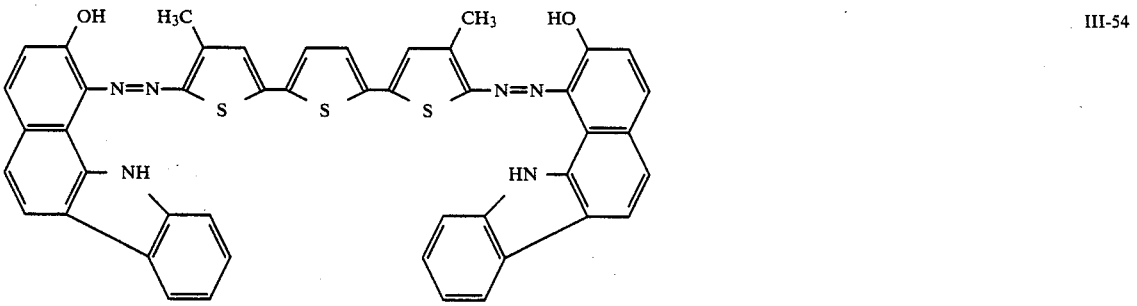
III-54

-continued
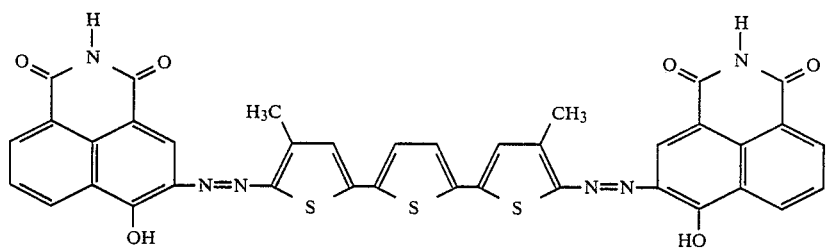
III-55
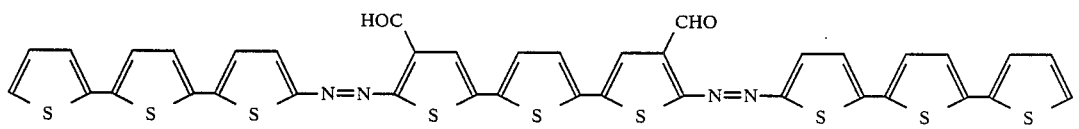
III-56
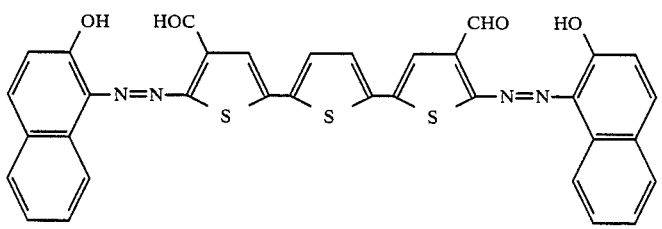
III-57
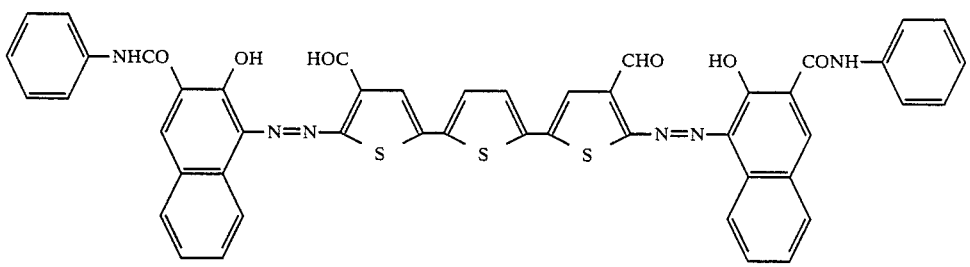
III-58
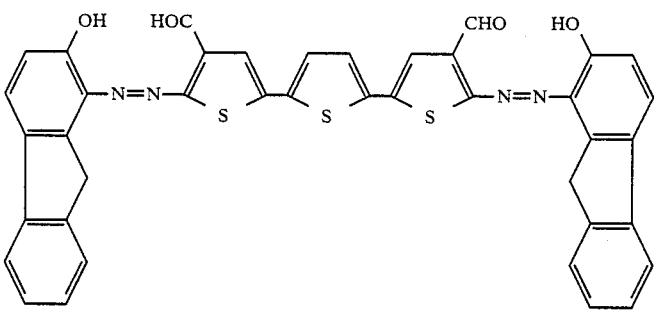
III-59
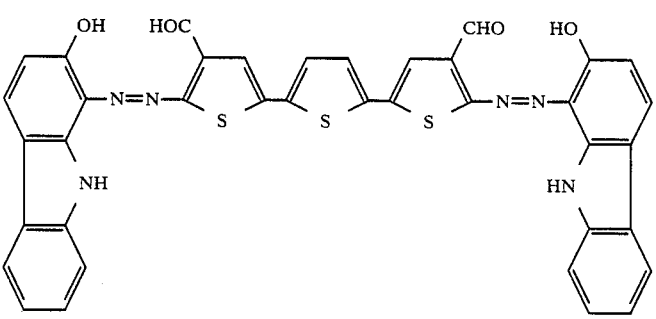
III-60

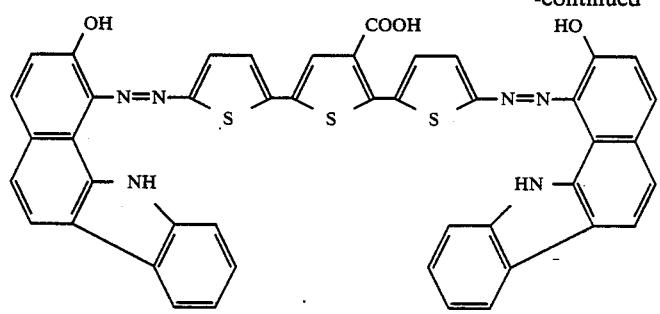
III-61
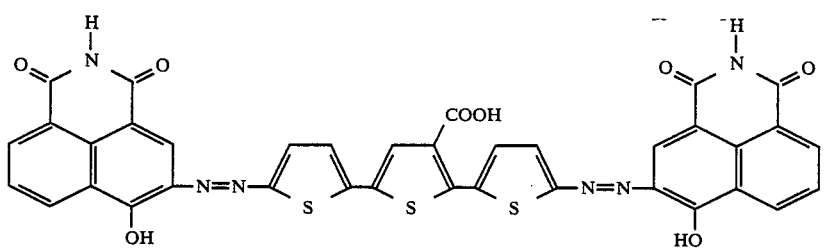
III-62
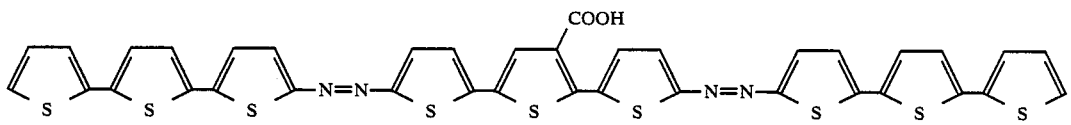
III-63
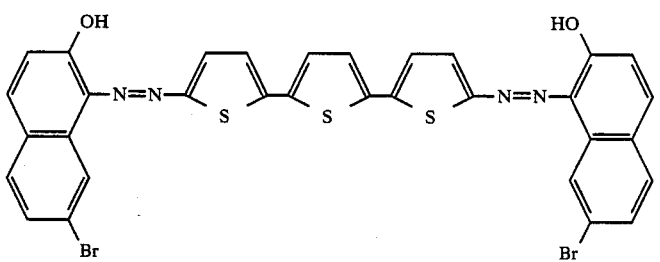
III-64
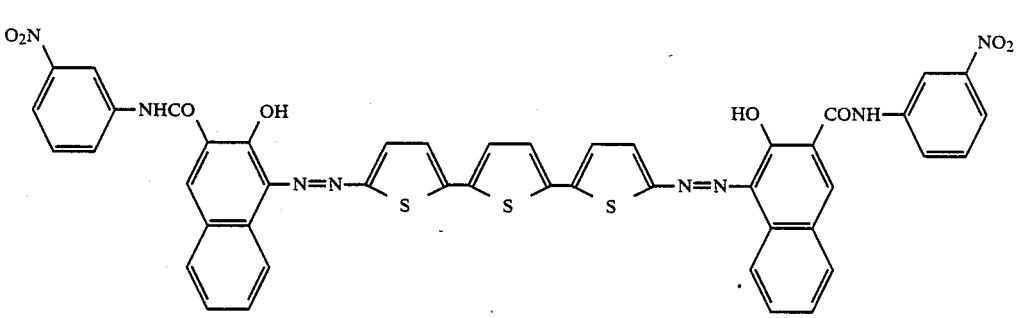
III-65
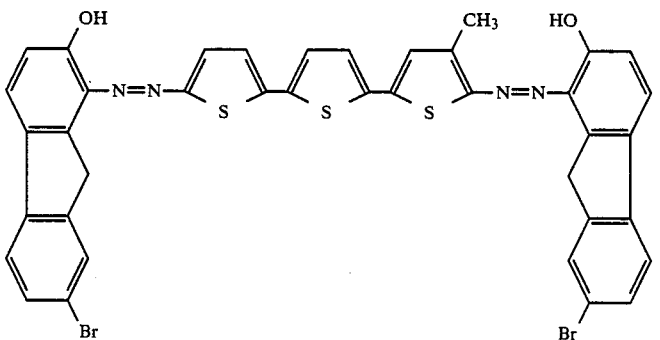
III-66

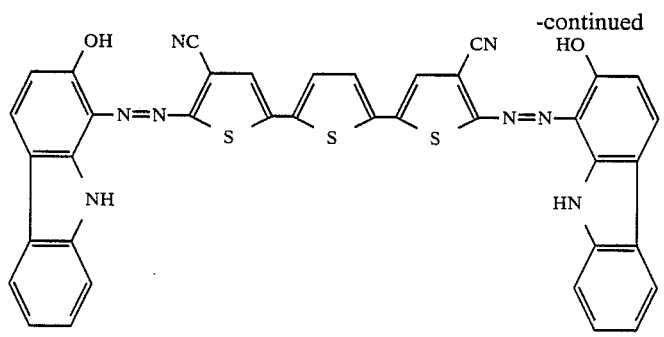
III-67
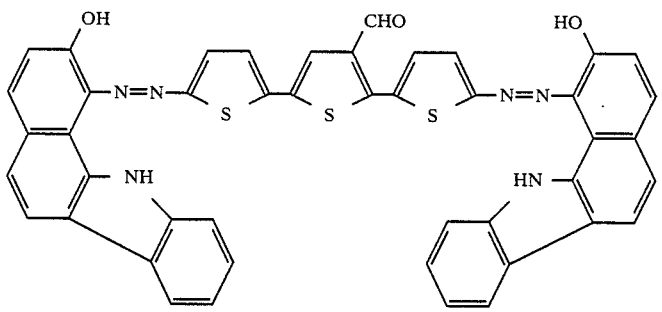
III-68
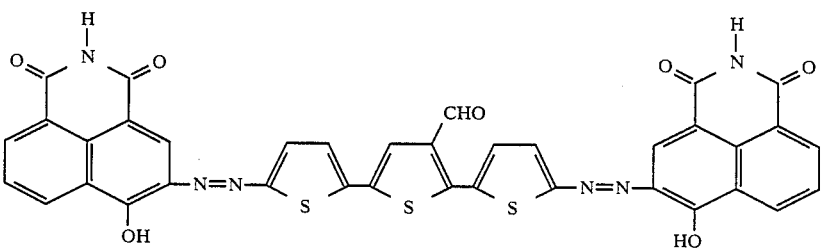
III-69
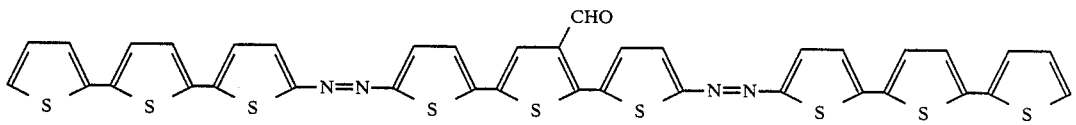
III-70
In the above examples, Compounds II-1 to II-35 correspond to general formula (II) and Compounds III-36 to III-70 correspond to general formula (III).
In the next place, examples of the azo compounds of general formula (IV) and of general formula (V) are shown in the following:
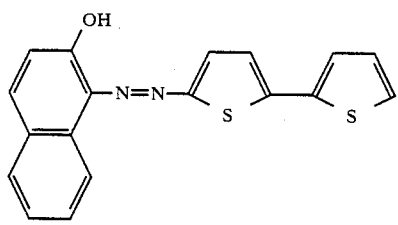
IV-1
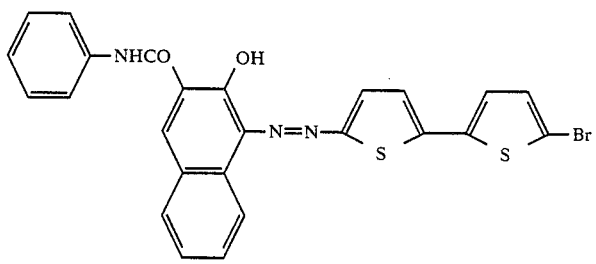
IV-2

-continued
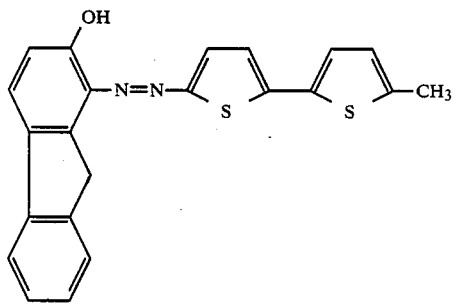
IV-3
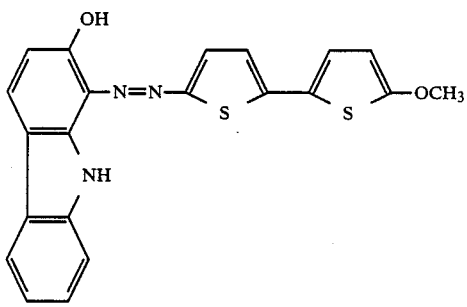
IV-4
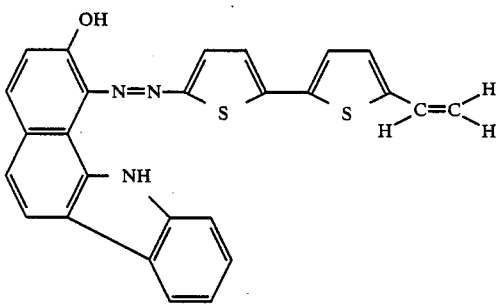
IV-5
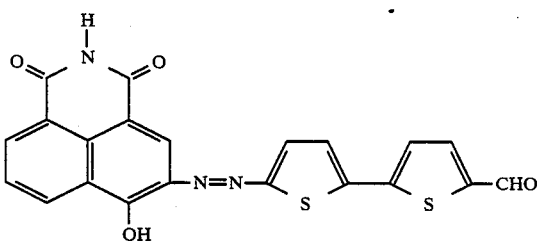
IV-6
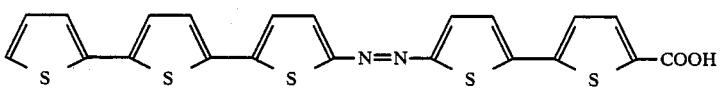
IV-7
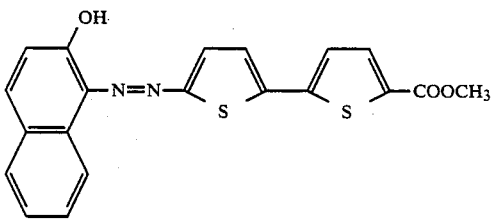
IV-8

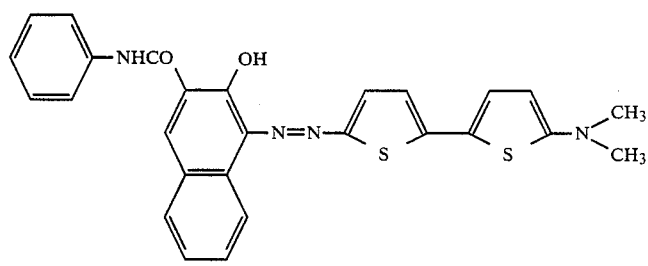
IV-9
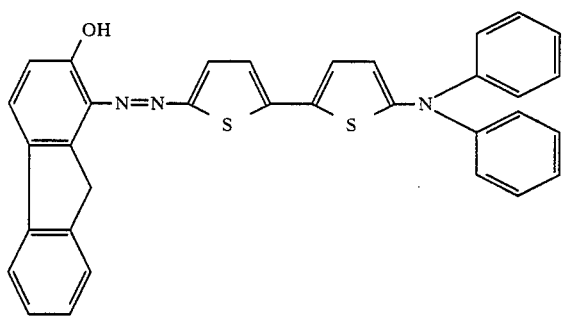
IV-10
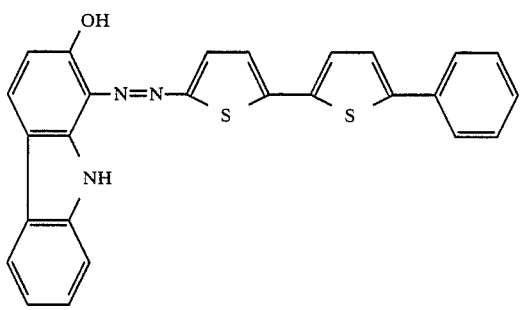
IV-11
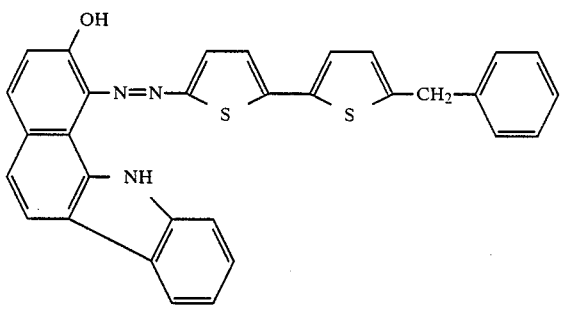
IV-12
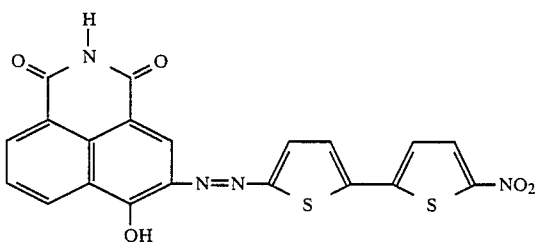
IV-13
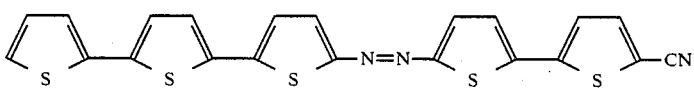
IV-14

-continued
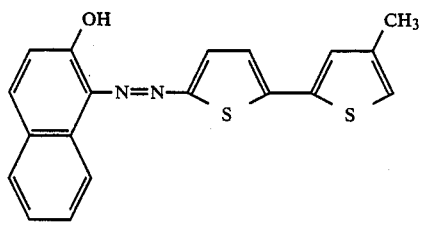　IV-15
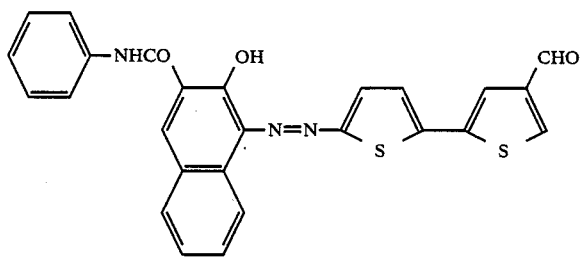　IV-16
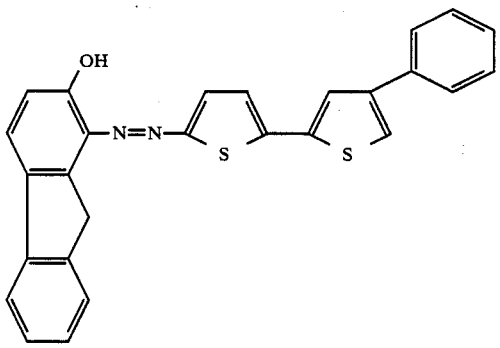　IV-17
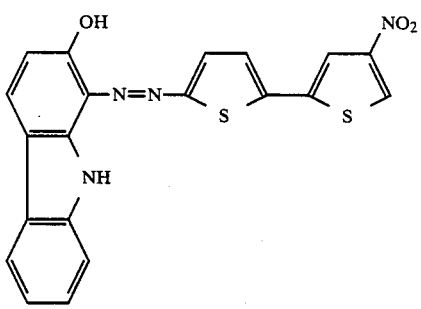　IV-18
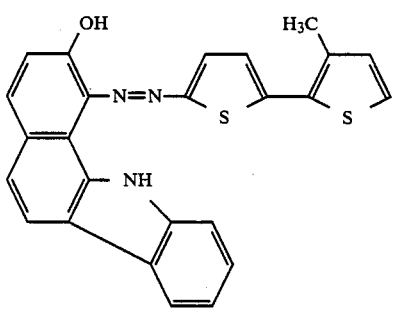　IV-19

-continued
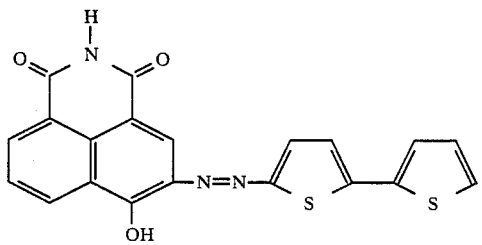
IV-20
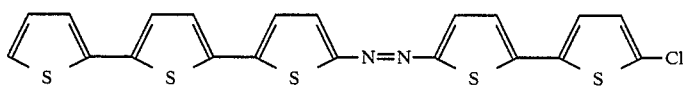
IV-21
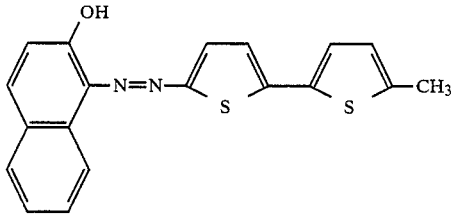
IV-22
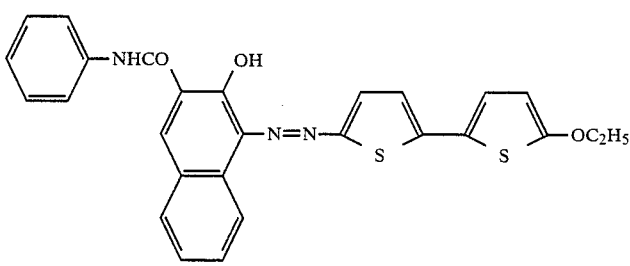
IV-23
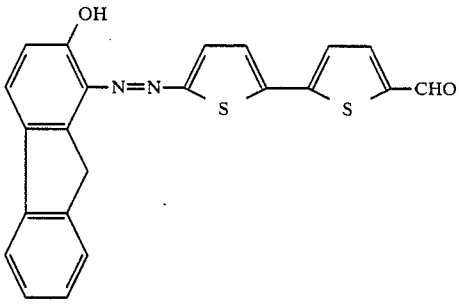
IV-24
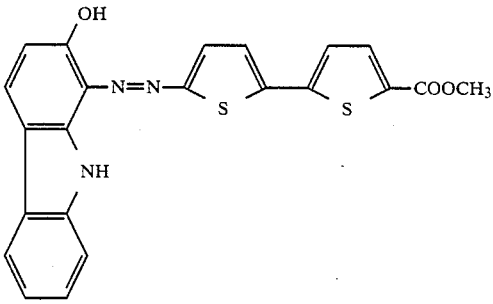
IV-25

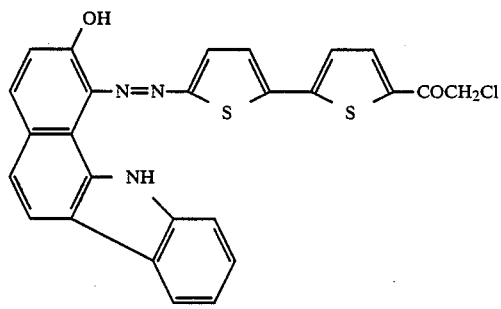
IV-26
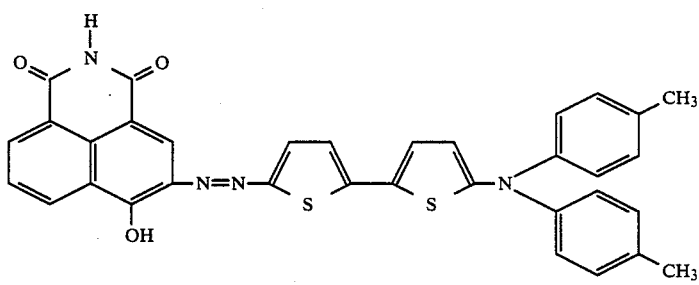
IV-27
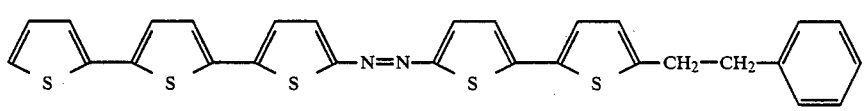
IV-28
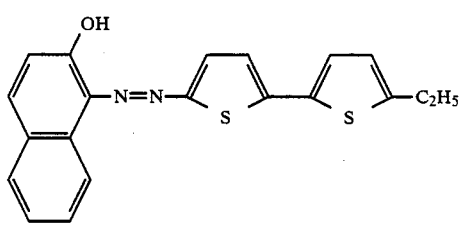
IV-29
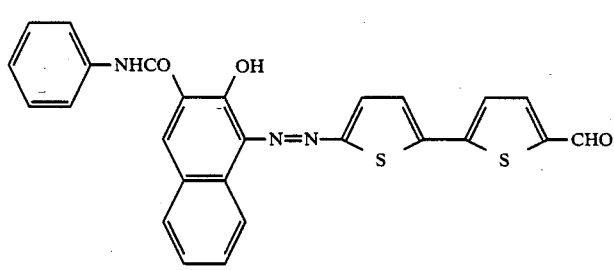
IV-30
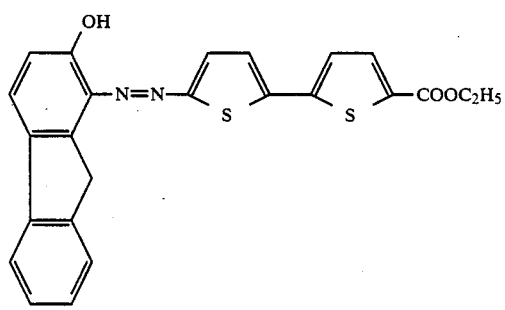
IV-31

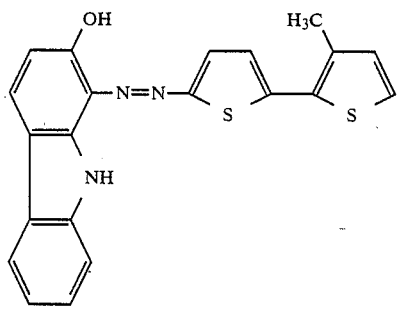
IV-32
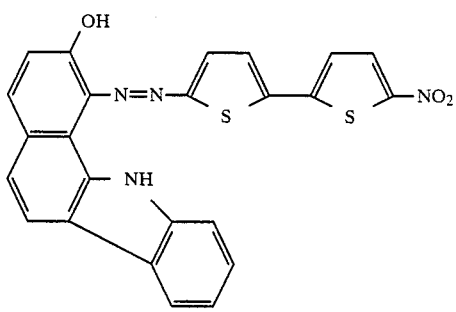
IV-33
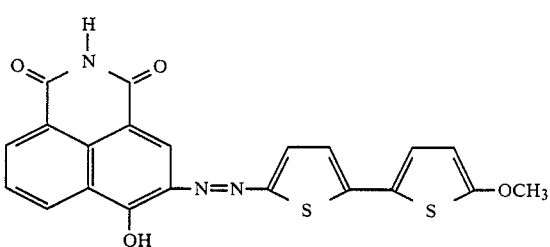
IV-34
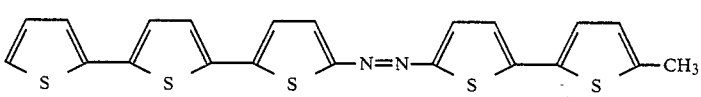
IV-35
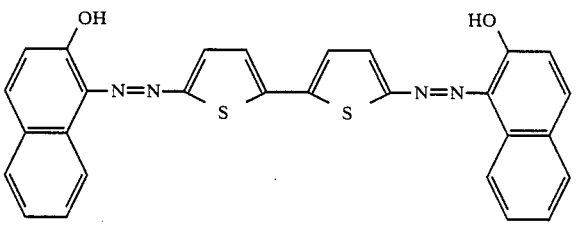
V-36
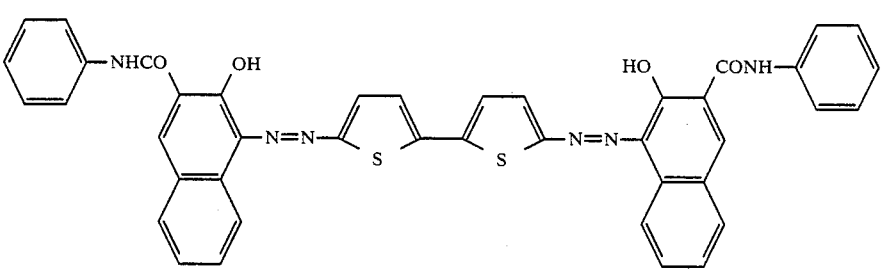
V-37

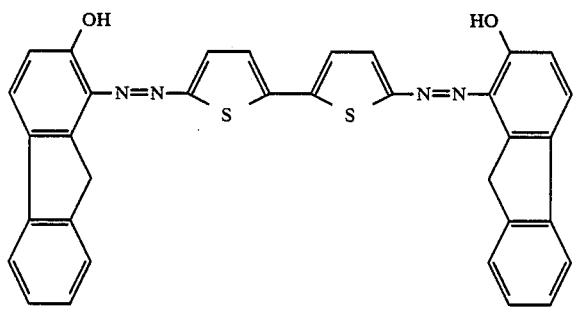
V-38
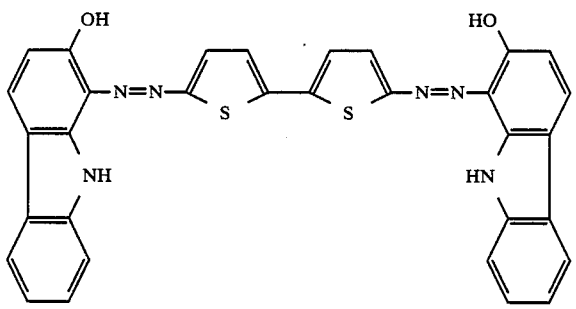
V-39
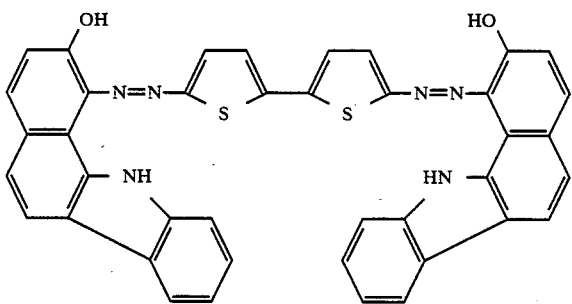
V-40
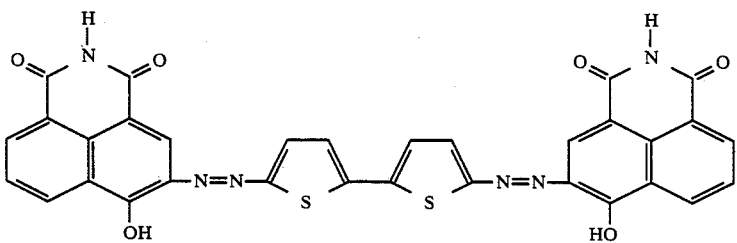
V-41
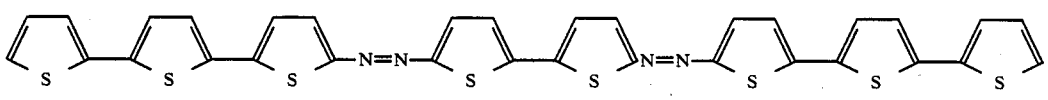
V-42
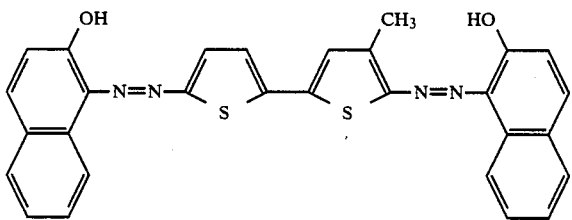
V-43

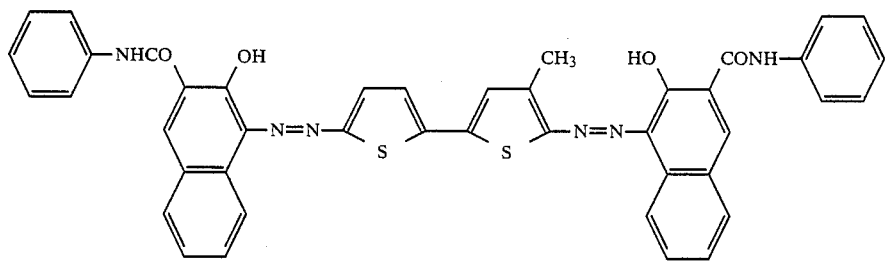
V-44
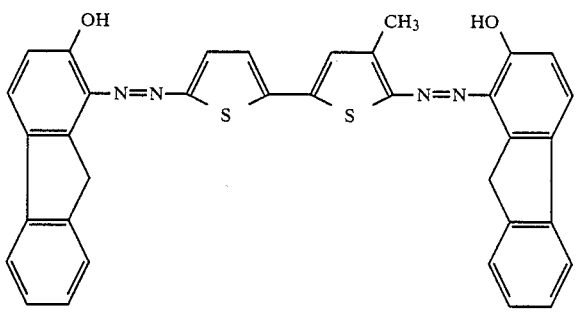
V-45
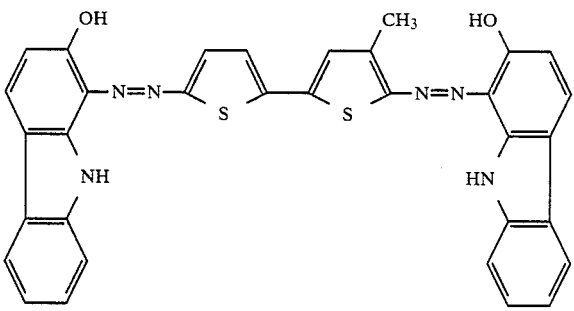
V-46
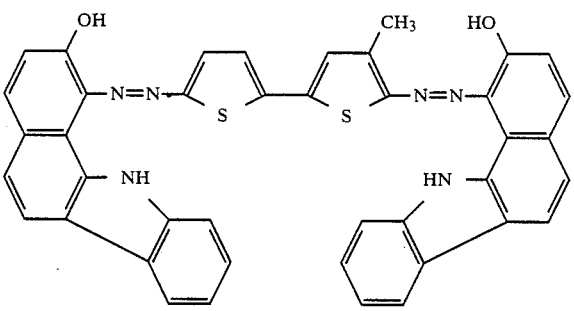
V-47
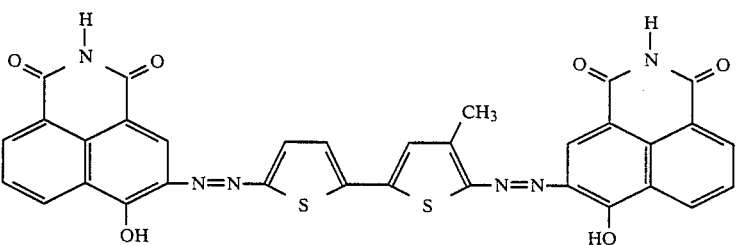
V-48
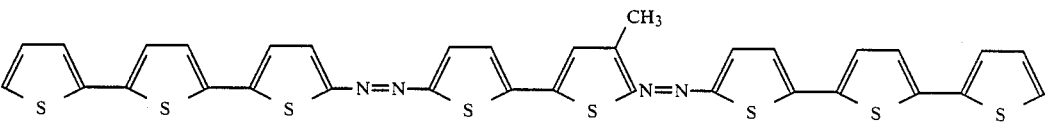
V-49

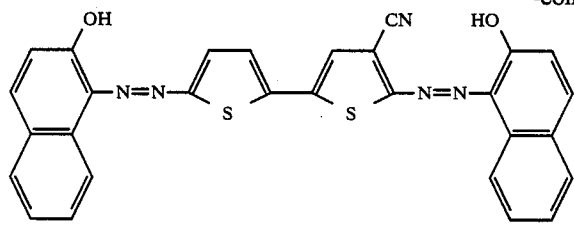
V-50
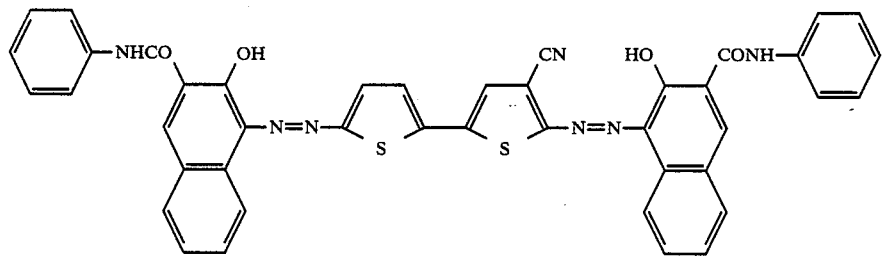
V-51
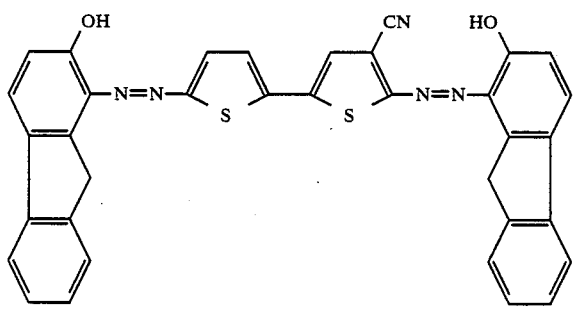
V-52
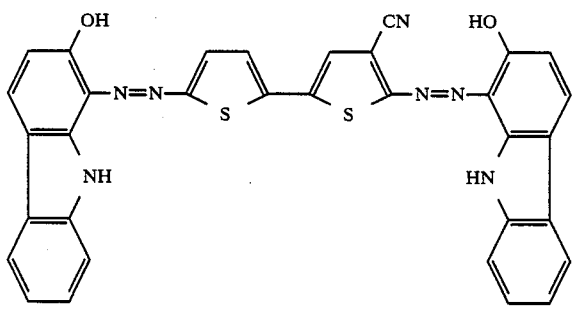
V-53
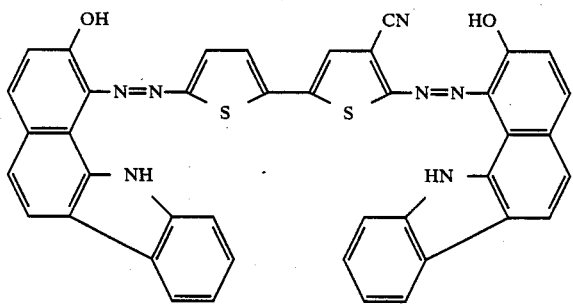
V-54
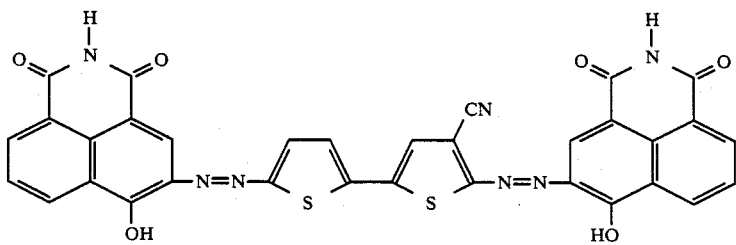
V-55

-continued
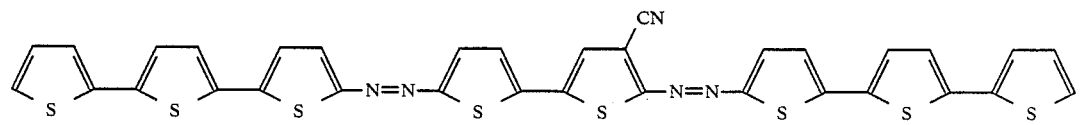 V-56
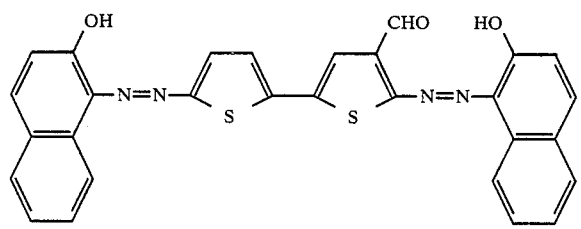 V-57
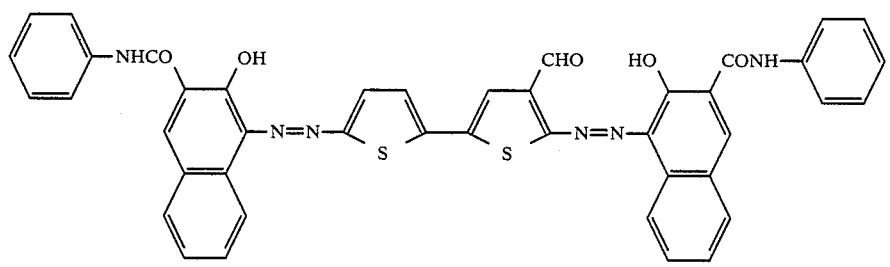 V-58
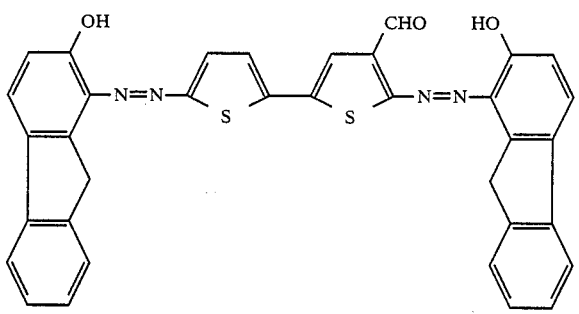 V-59
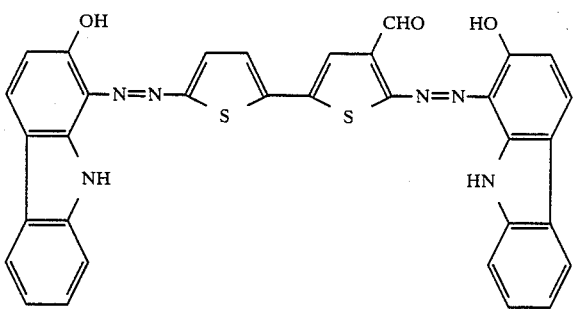 V-60
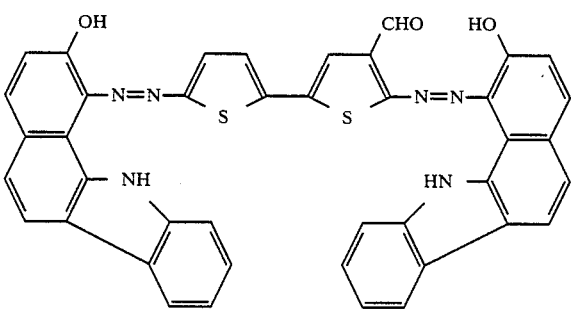 V-61

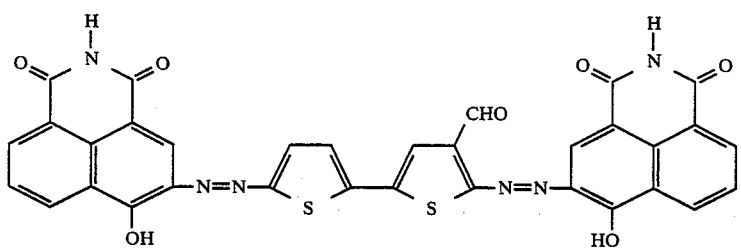
V-62
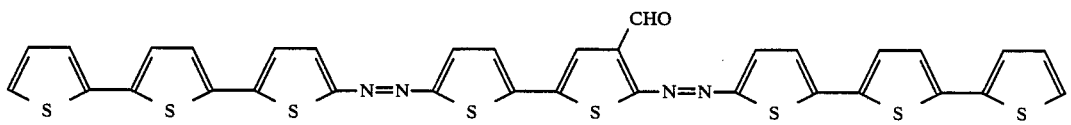
V-63
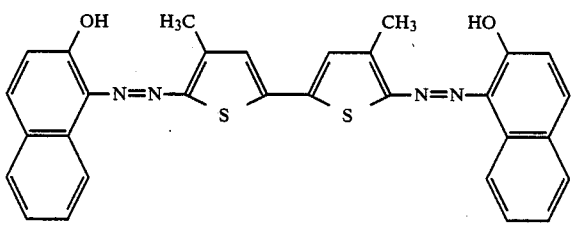
V-64
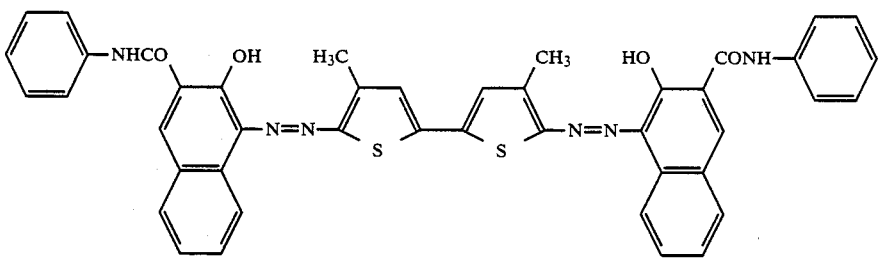
V-65
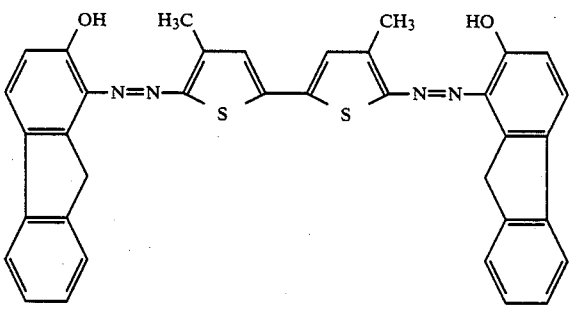
V-66
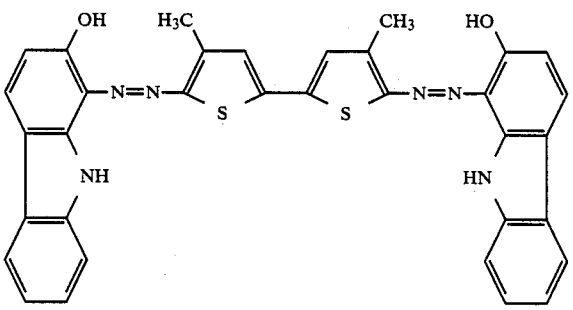
V-67

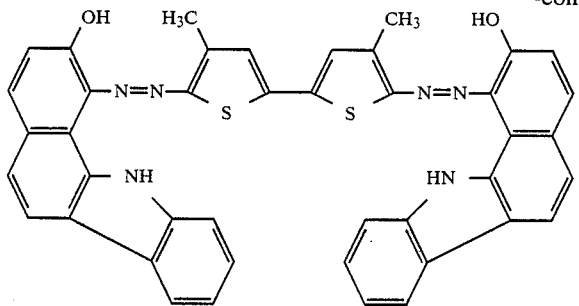
V-68
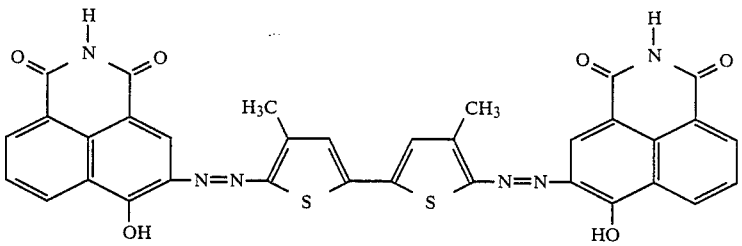
V-69
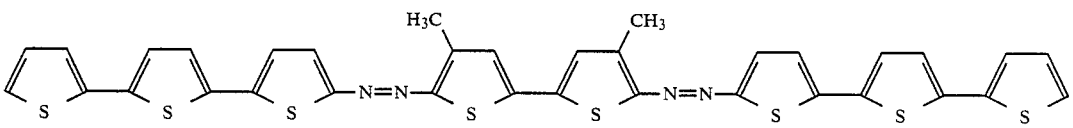
V-70
In the above examples, Compounds IV-1 to IV-35 correspond to genreal formula (IV) and Compounds V-36 to V-70 correspond to general formula (V).
The following are examples of the azo compounds of general formula (VI) and of general formula (VII):

VI-1 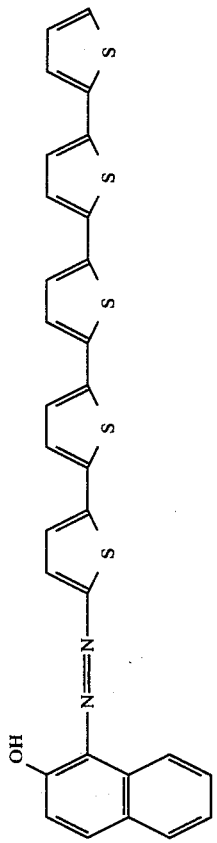
VI-2 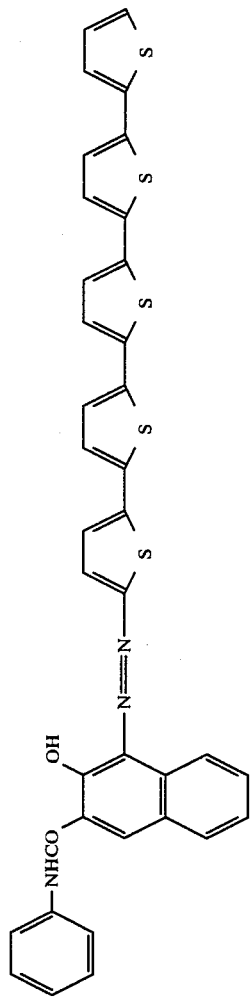
VI-3 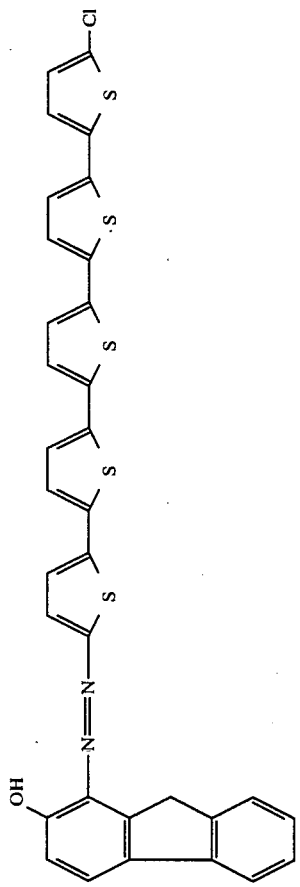
VI-4 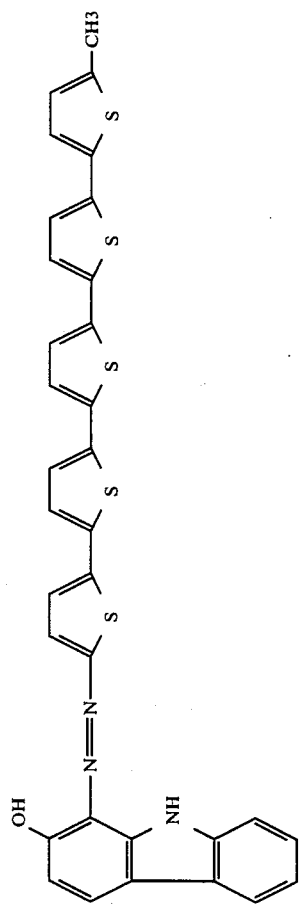

VI-5 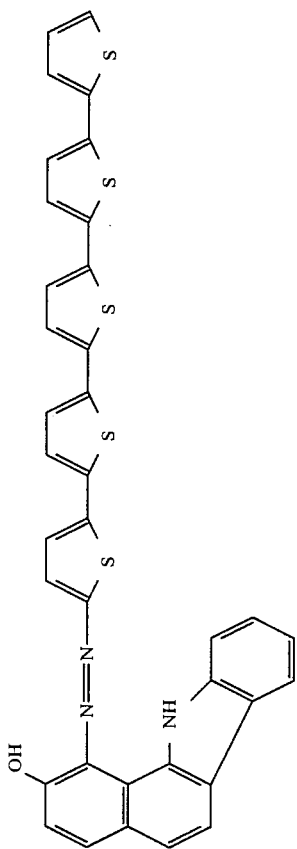
VI-6 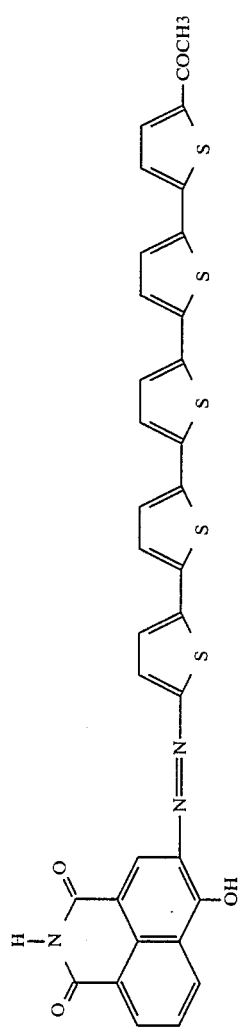
VI-7 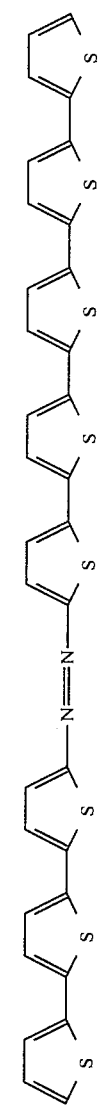
VI-8 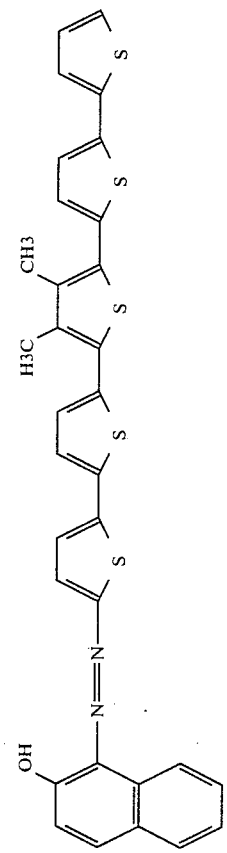

VI-9
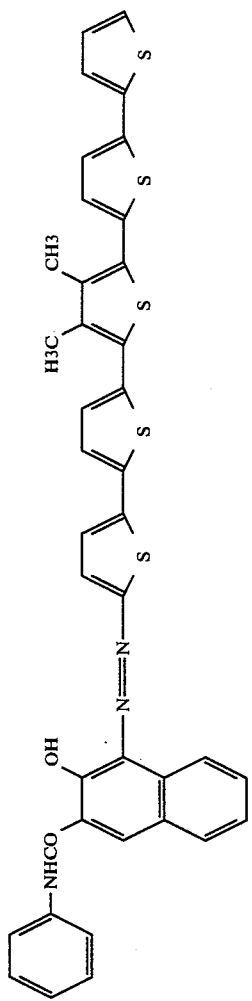
VI-10
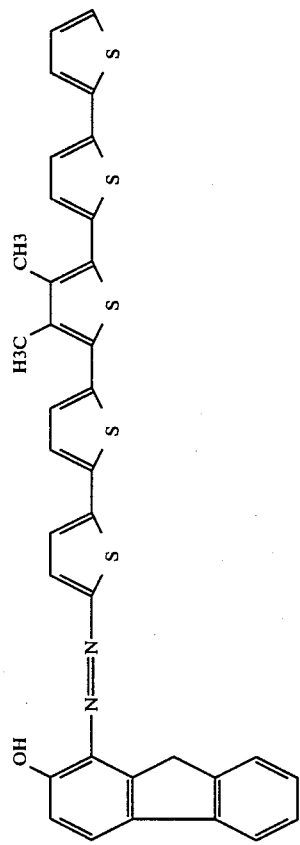
VI-11
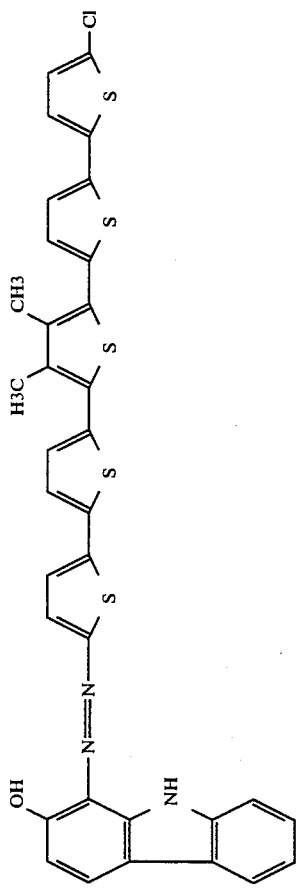

-continued
VI-12 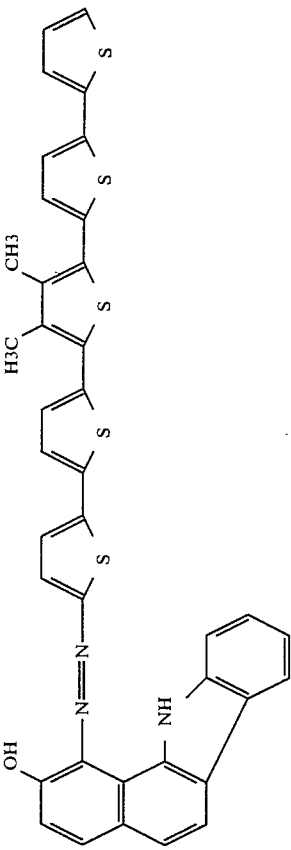
VI-13 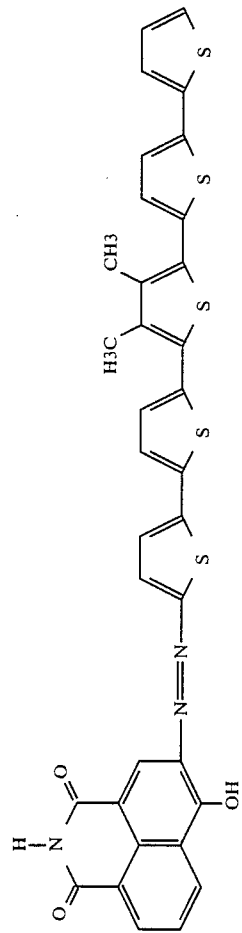
VI-14 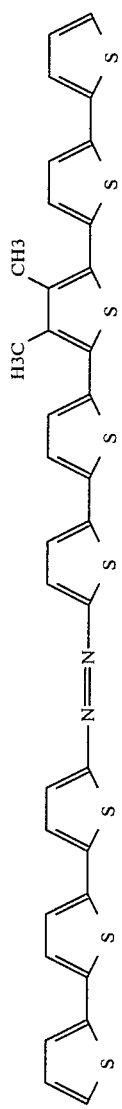
VII-15 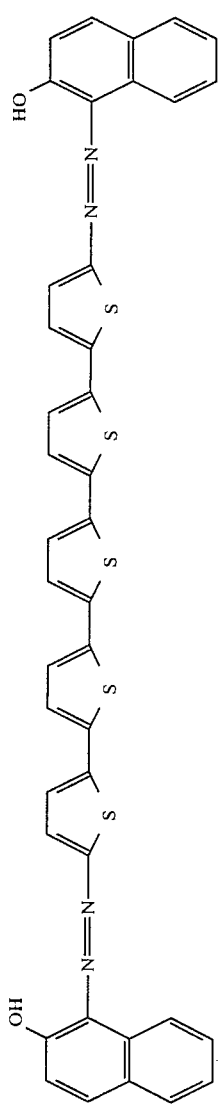

-continued
VII-16
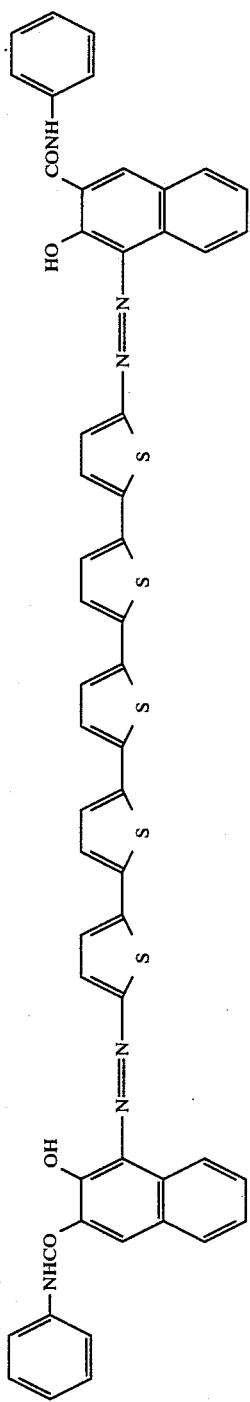
VII-17
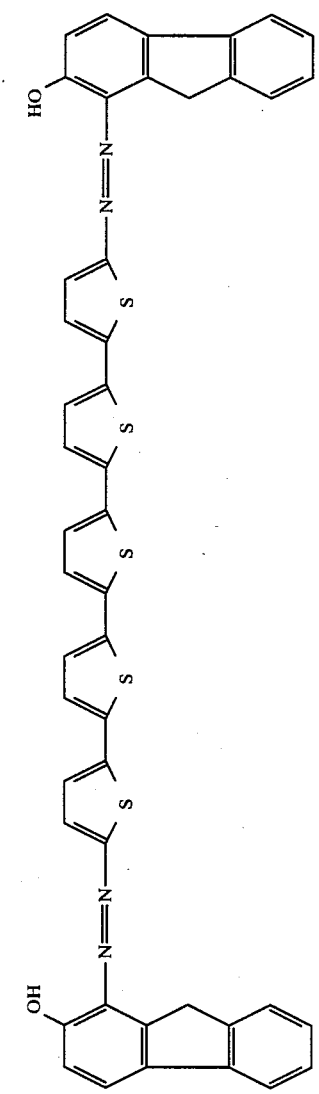
VII-18
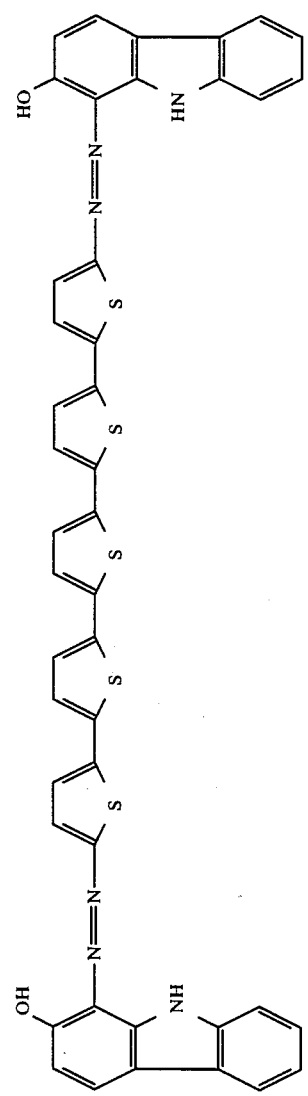

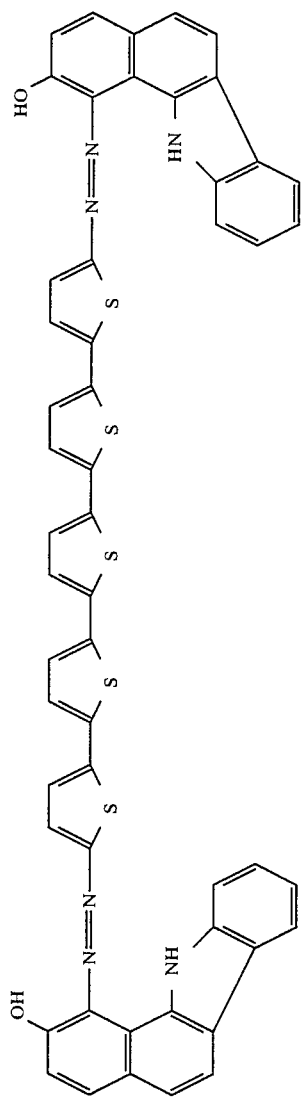
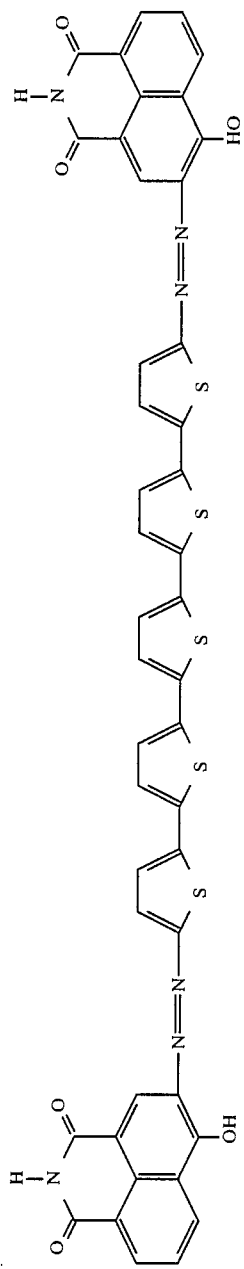
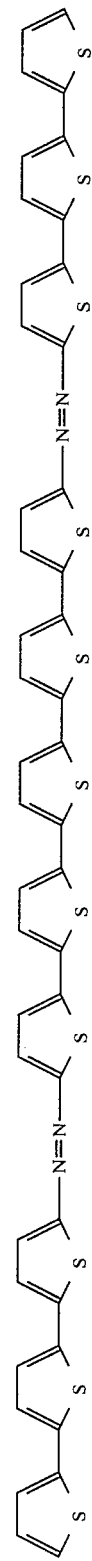
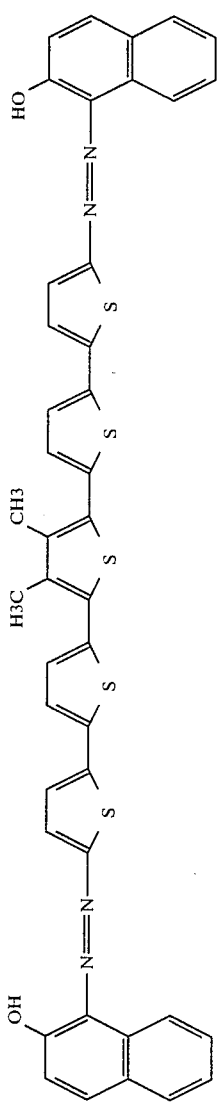

-continued
VII-23
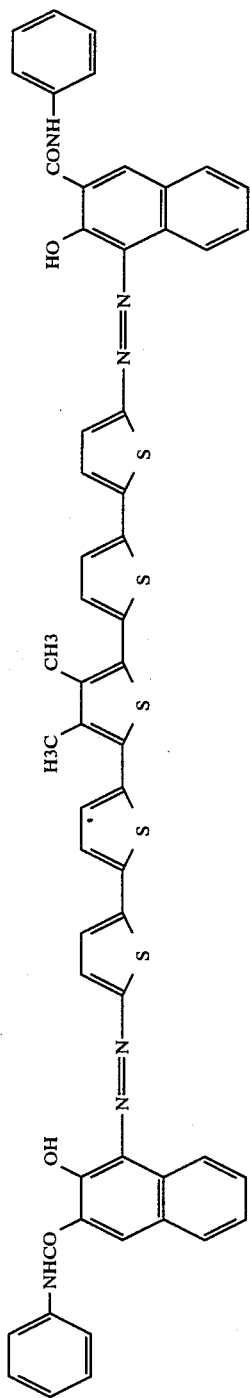
VII-24
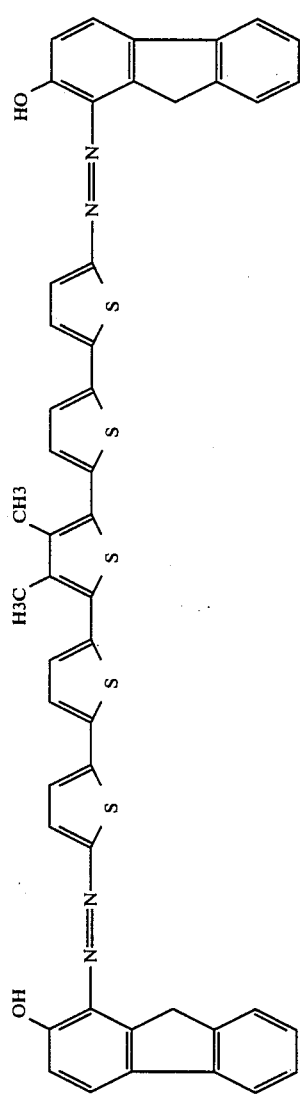
VII-25
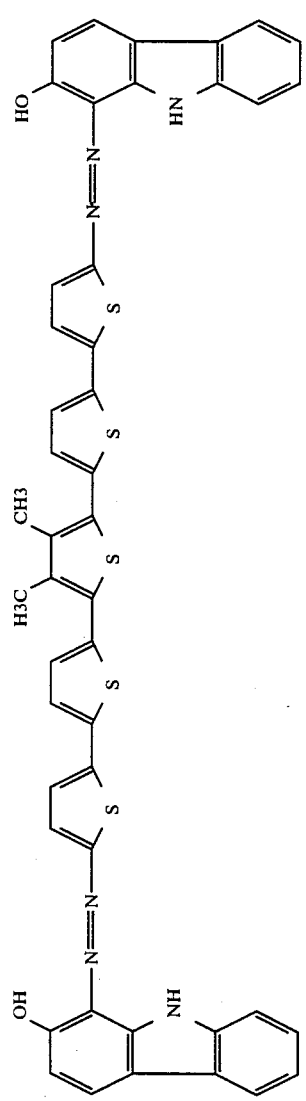

VII-26
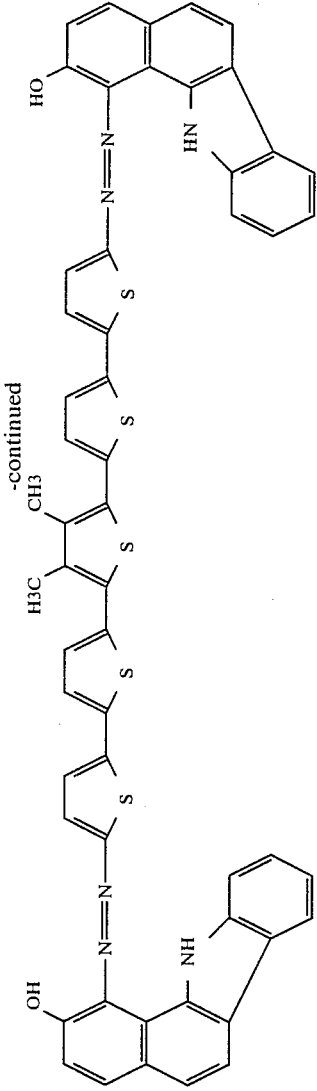
VII-27
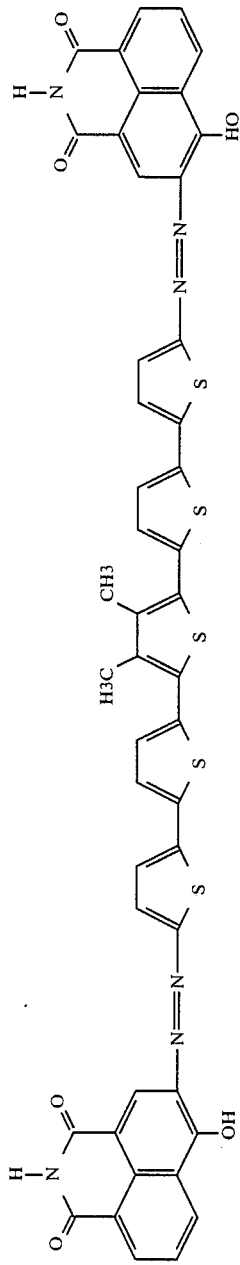
VII-28
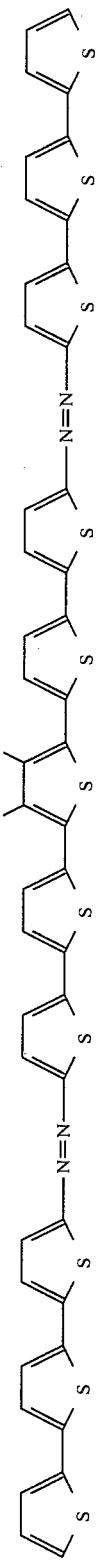

In the above examples, Compounds VI-1 to VI-14 correspond to general formula (VI) and Compounds VII-15 to VII-28 correspond to general formula (VII).

In the following, examples of the azo compounds of general formula (VIII), of general formula (IX) and of general formula (X) are shown.

VIII-1 VIII-2 VIII-3 VIII-4
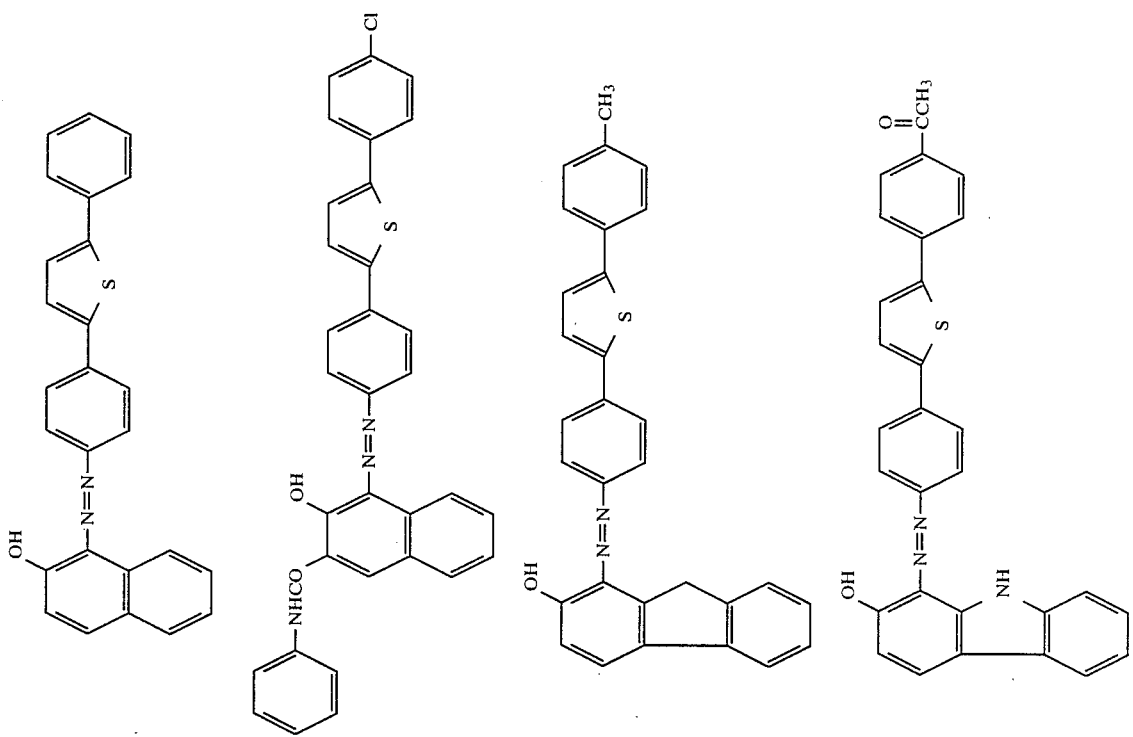

VIII-5
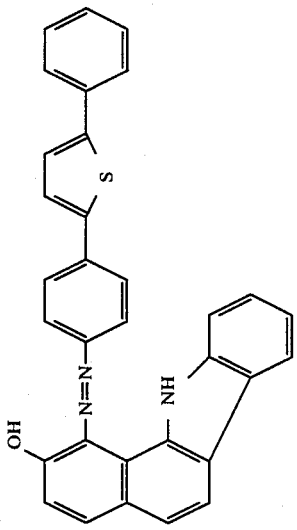
VIII-6
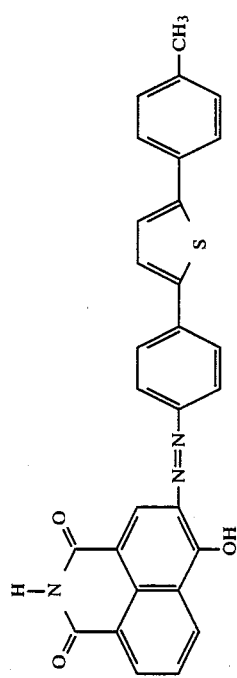
VIII-7 VIII-8
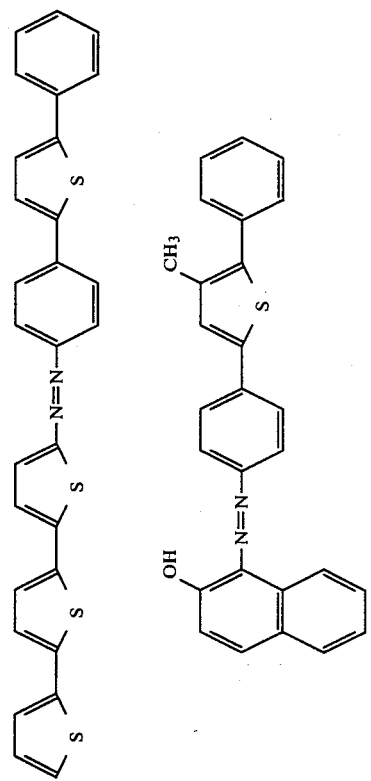

VIII-9
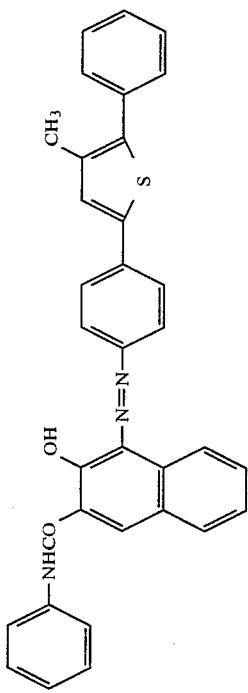
VIII-10
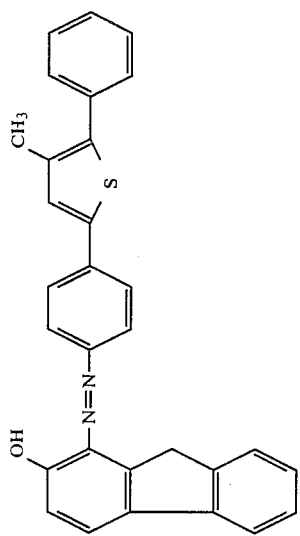
VIII-11
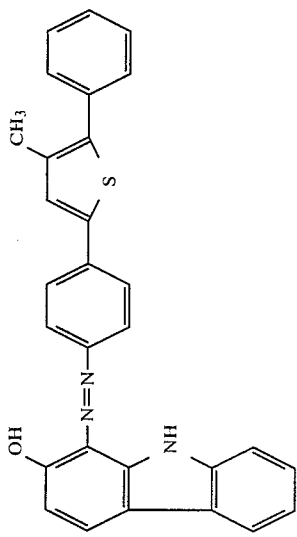

VIII-12
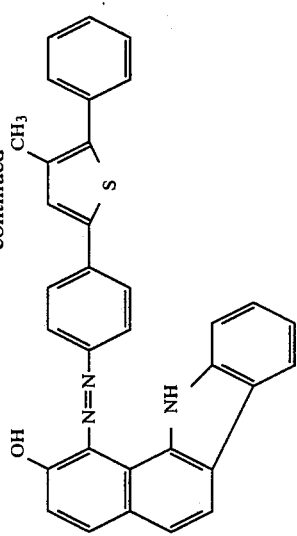
VIII-13
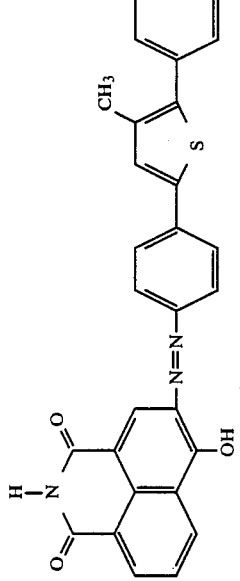
VIII-14
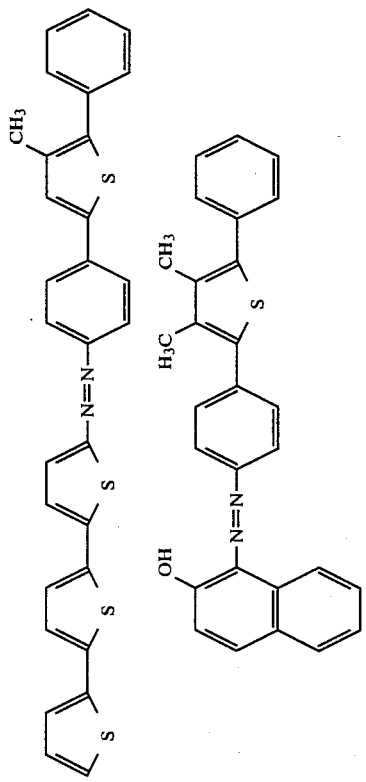
VIII-15
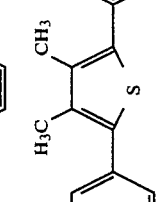

VIII-16
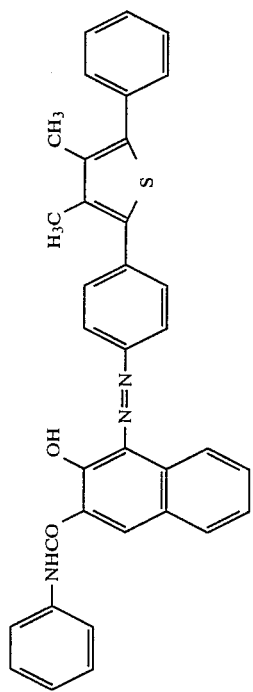
VIII-17
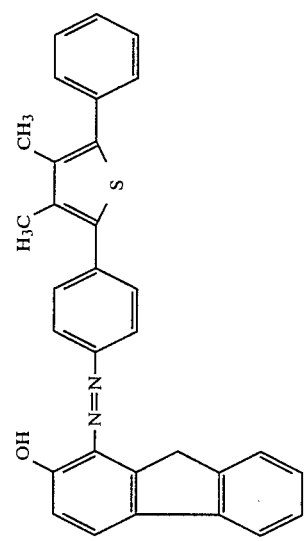
VIII-18
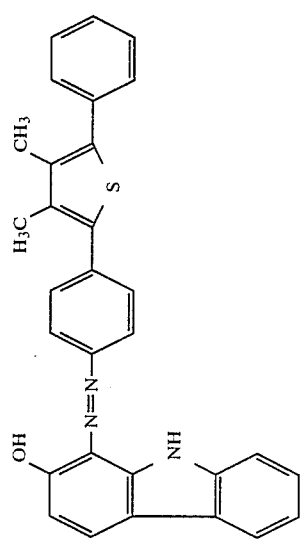

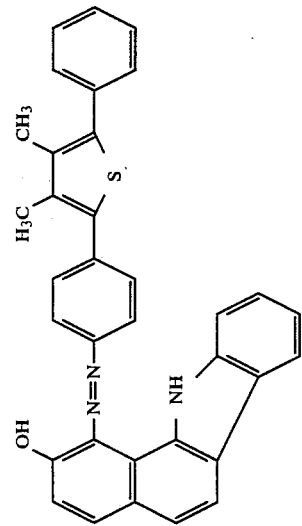

VIII-23
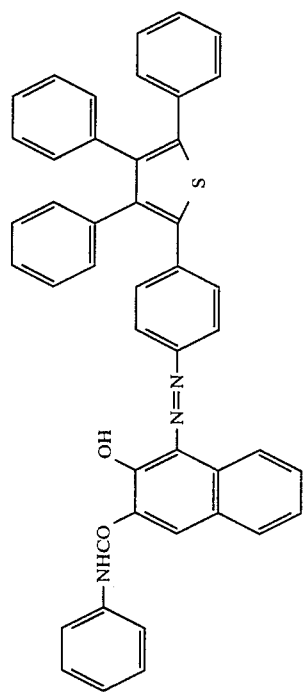
VIII-24
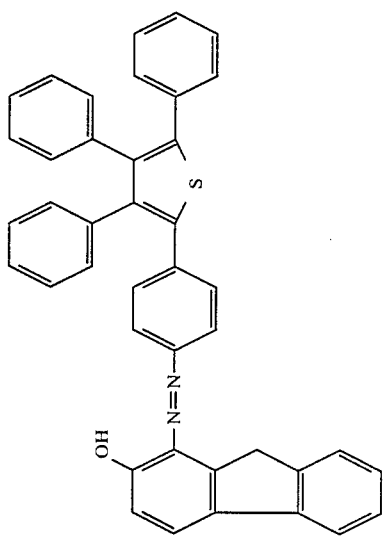

-continued
VIII-25
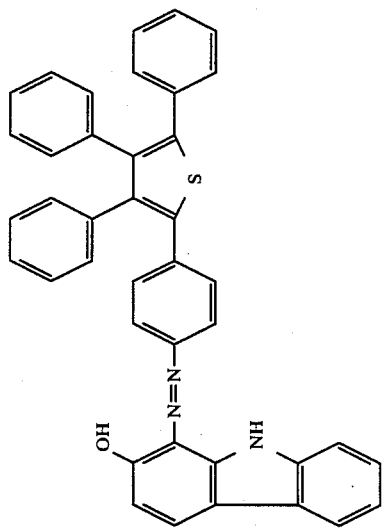
VIII-26
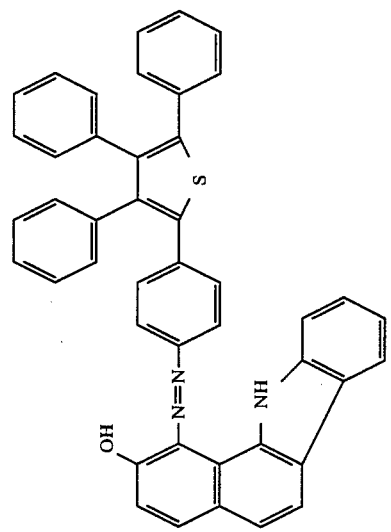
VIII-27
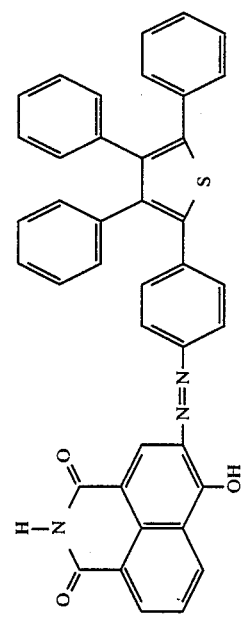

VIII-28 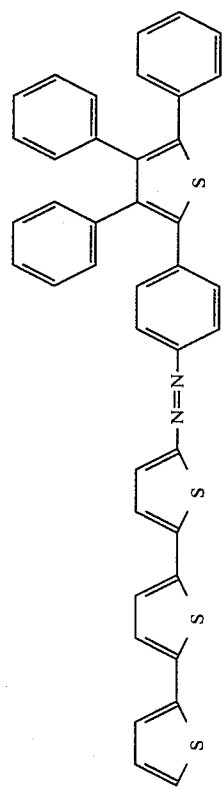
VIII-29 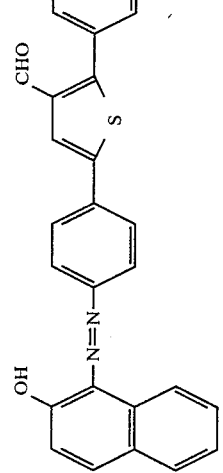
VIII-30 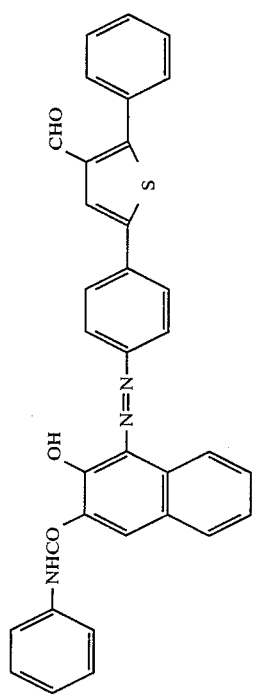
VIII-31 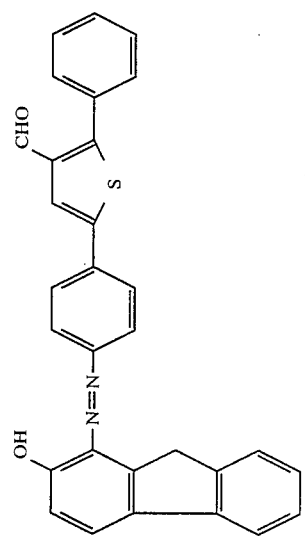

-continued
VIII-32
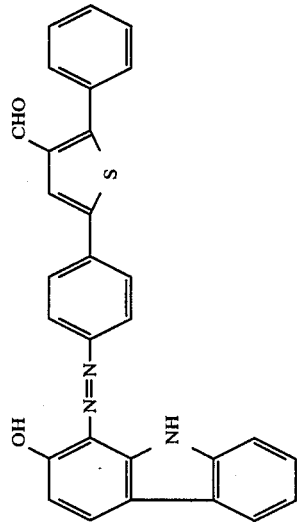
VIII-33
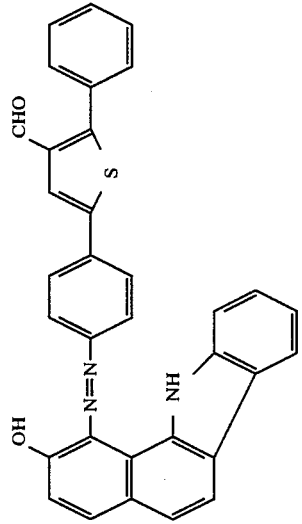
VIII-34
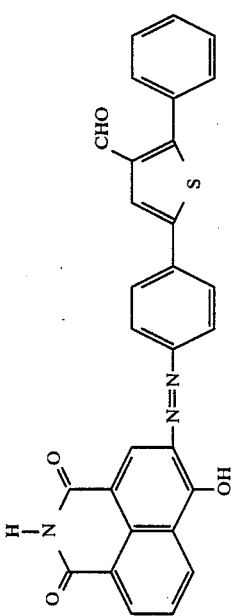
VIII-35
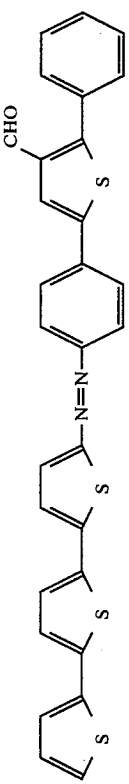

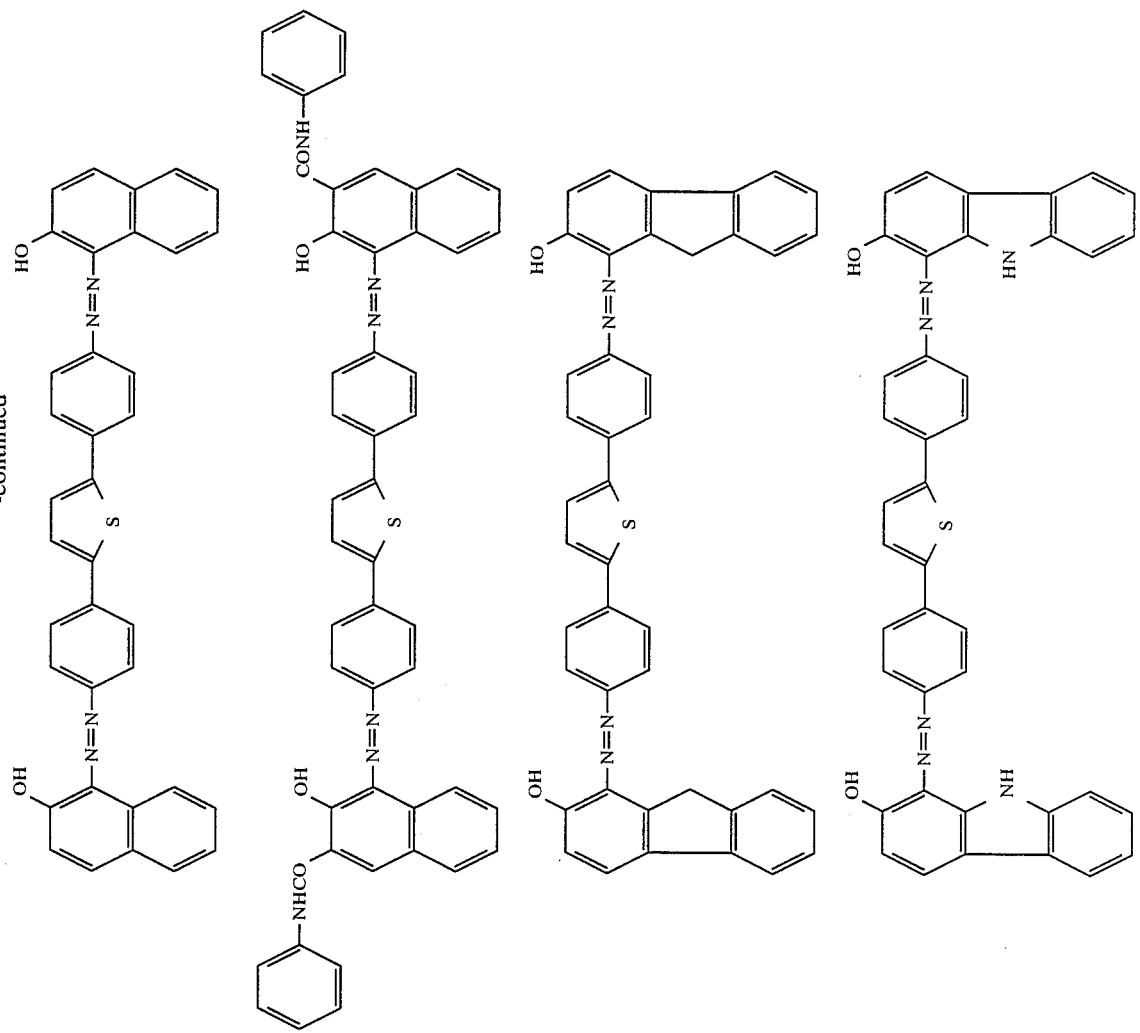

IX-40
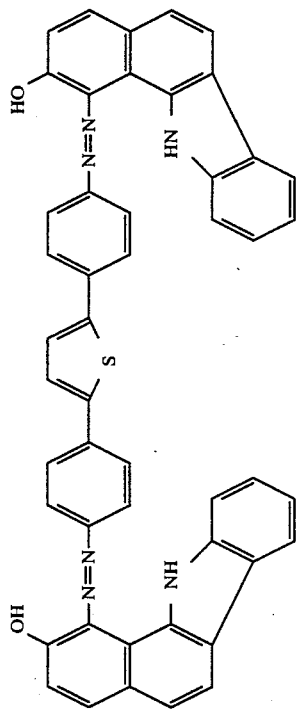
IX-41
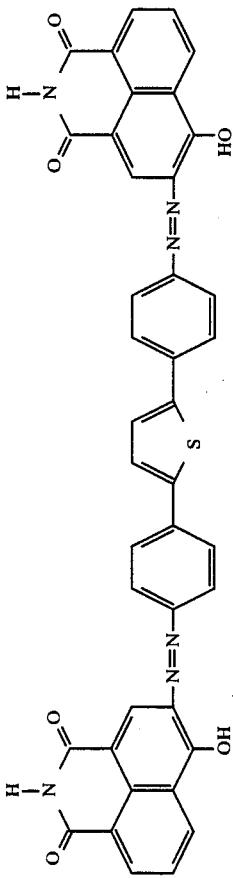
IX-42
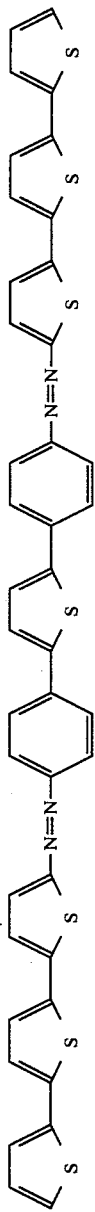

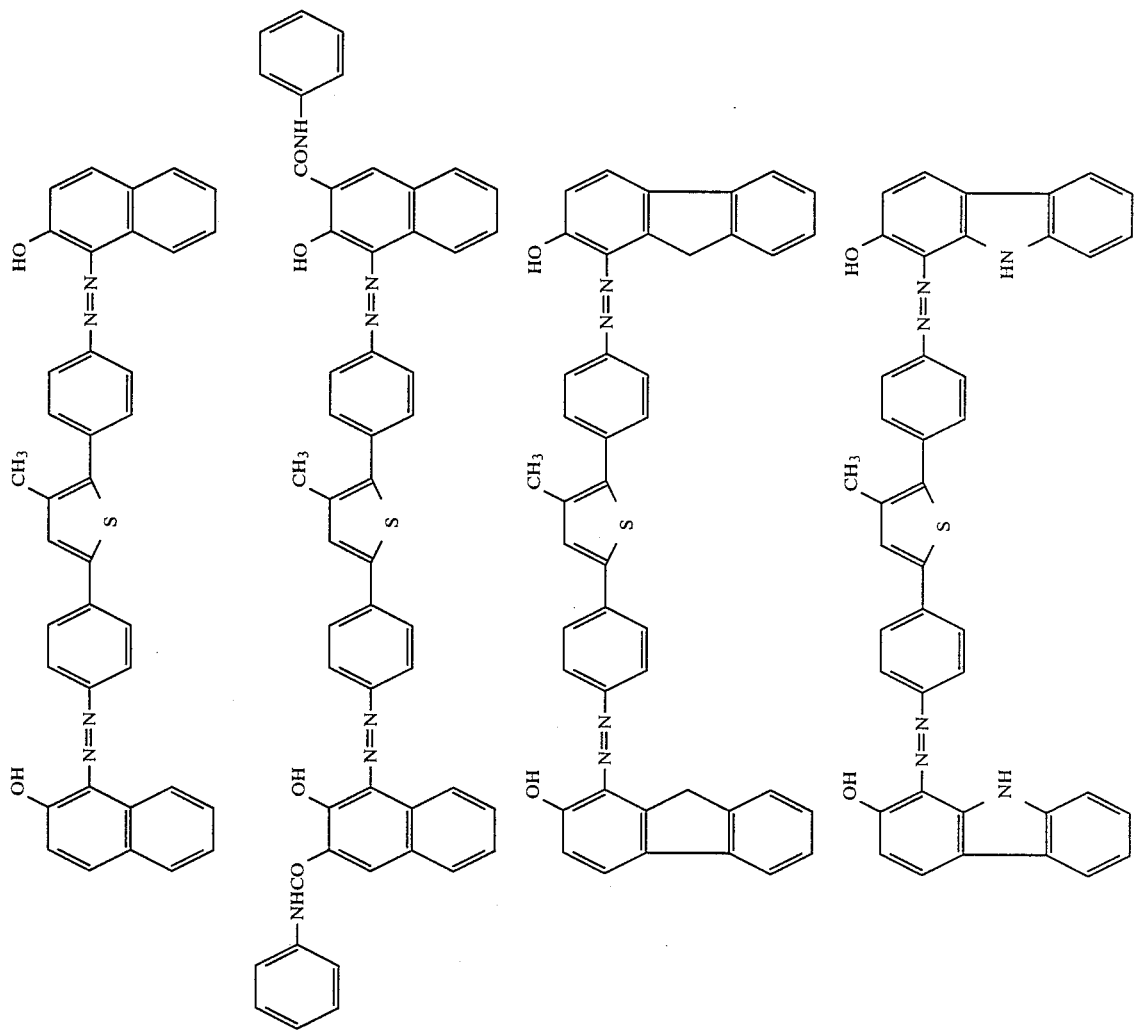

109 110
IX-47
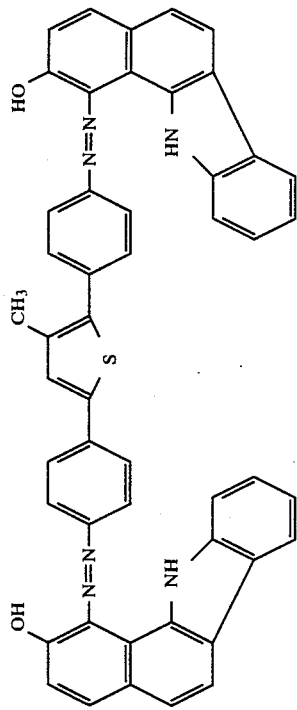
IX-48
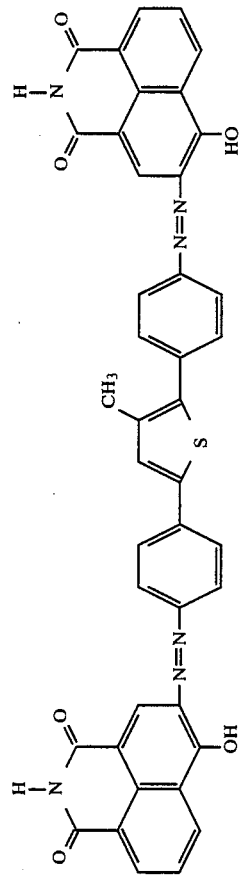
IX-49
IX-50
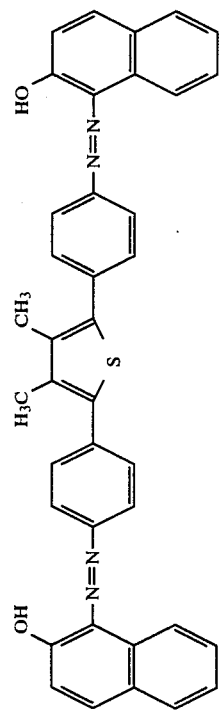
-continued

-continued
IX-51
111
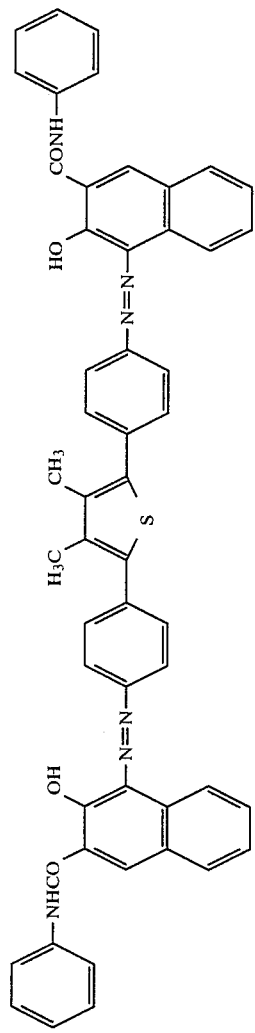
IX-52
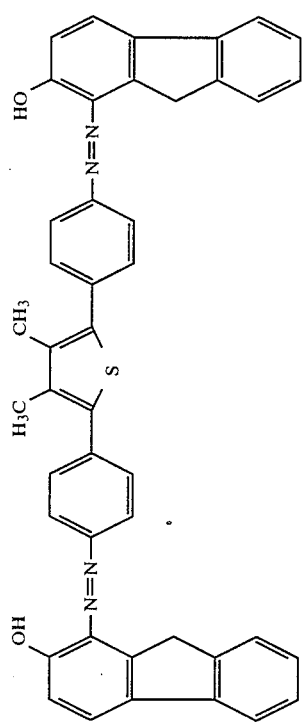
IX-53
112
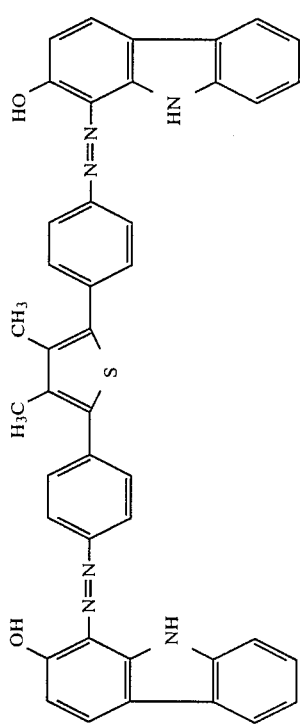

IX-54
-continued
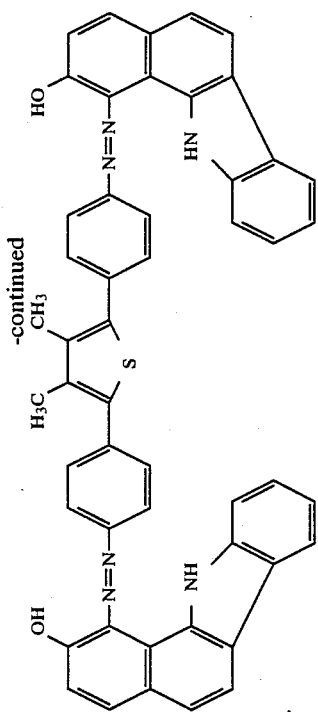

IX-55
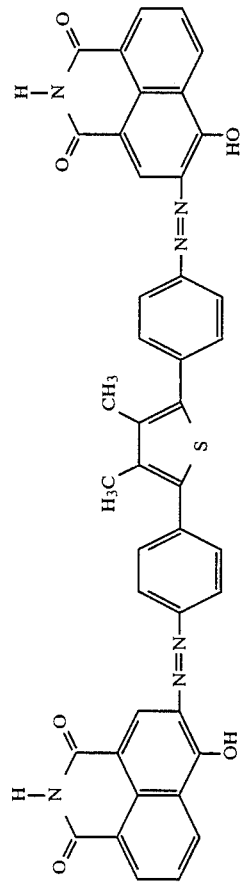
IX-56
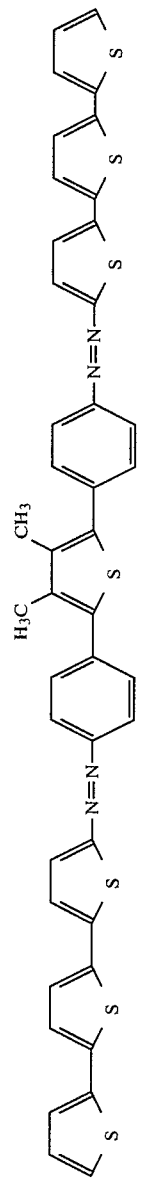
IX-57
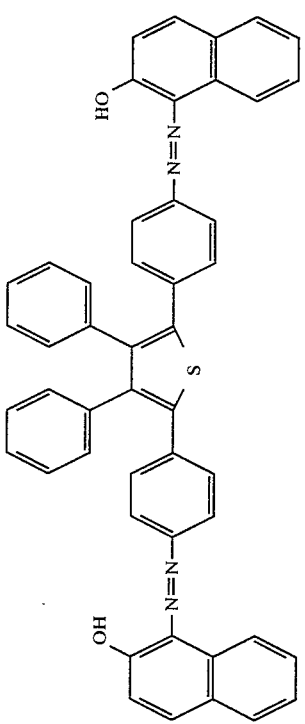
IX-58
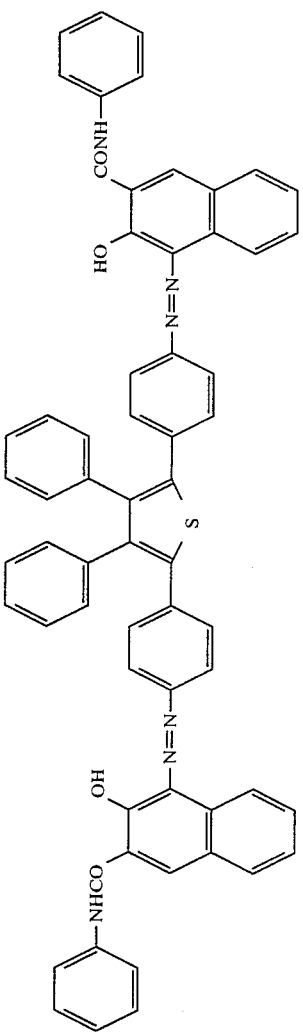

117 118
IX-59 IX-60
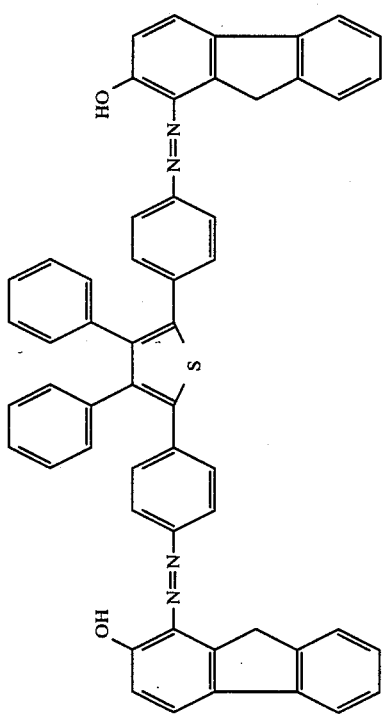
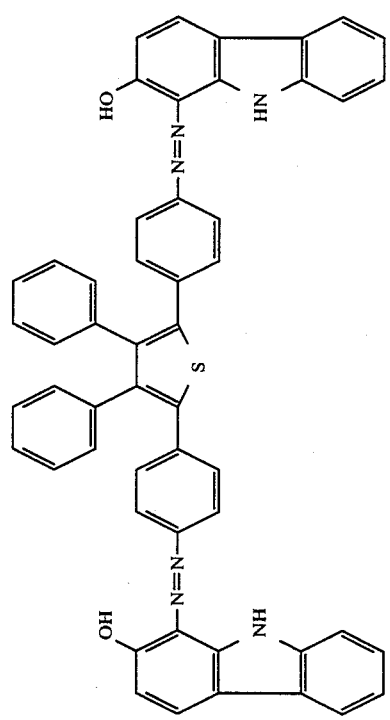

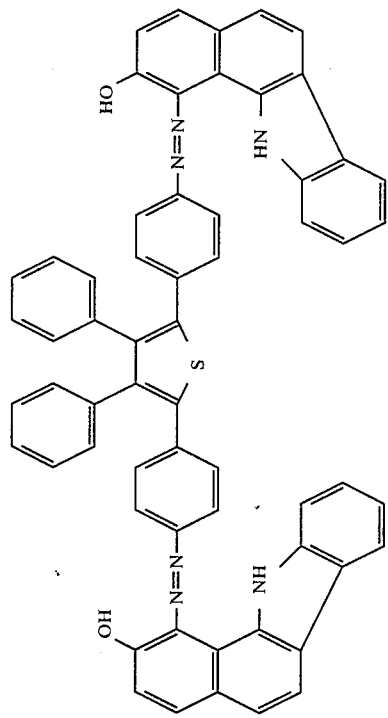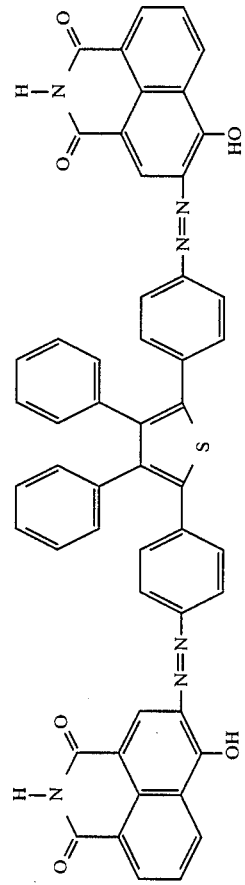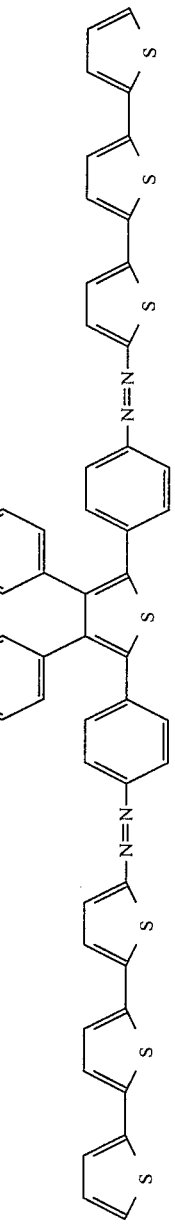

IX-64 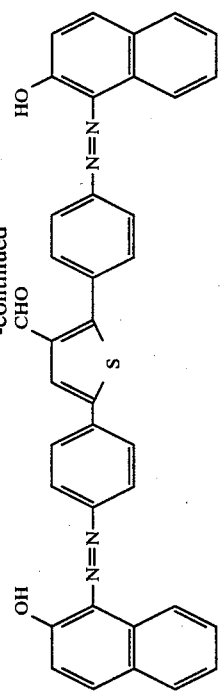
IX-65 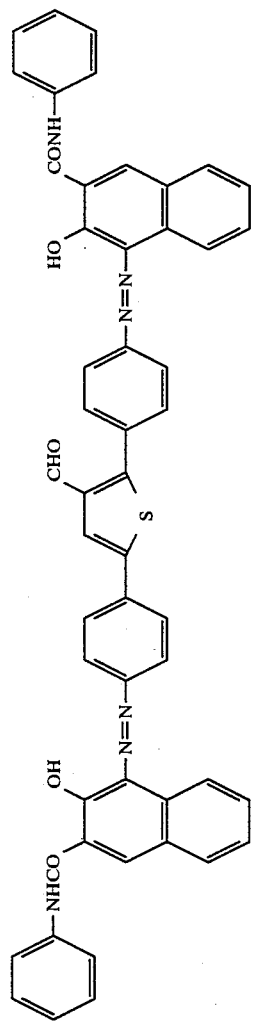
IX-66 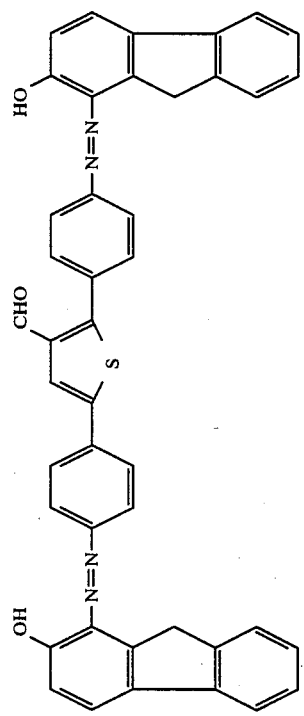
IX-67 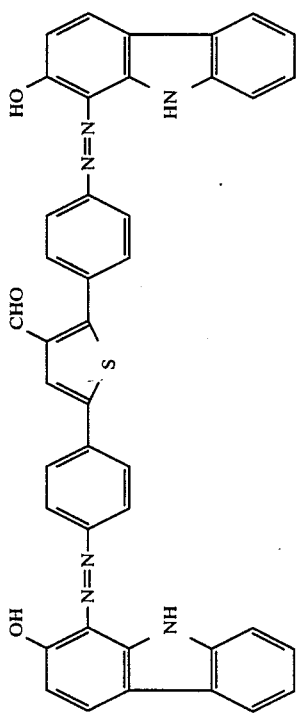

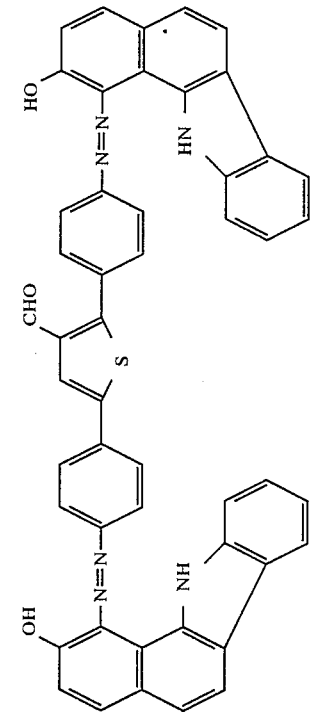
IX-68
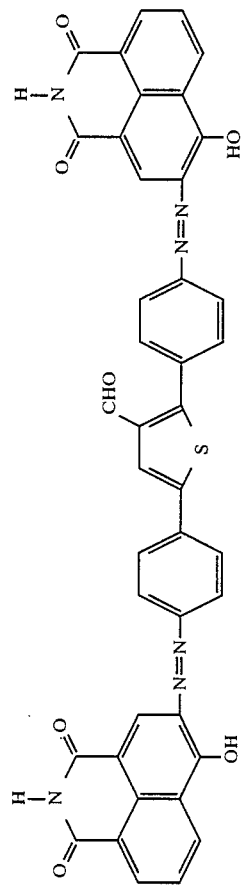
IX-69
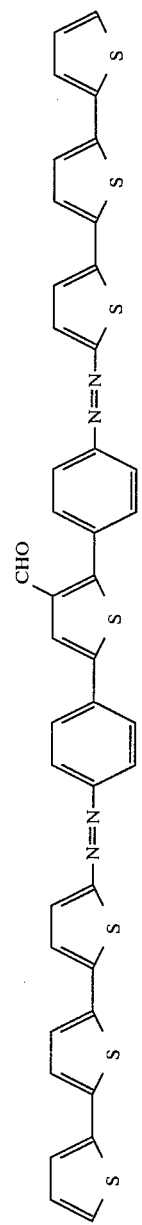
IX-70
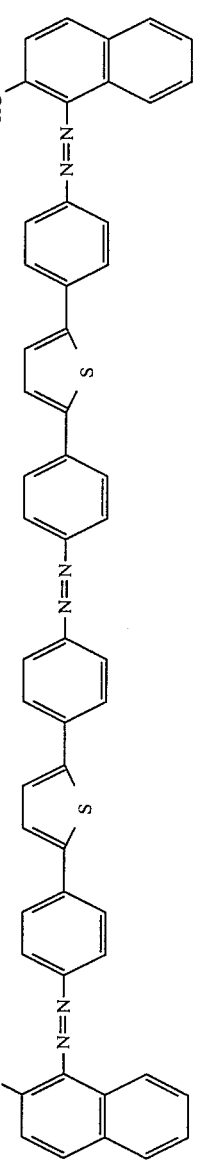
X-71

X-72
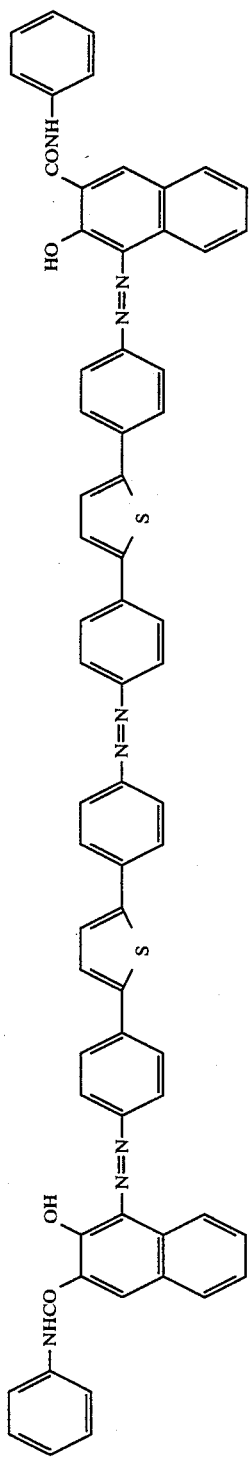
X-73
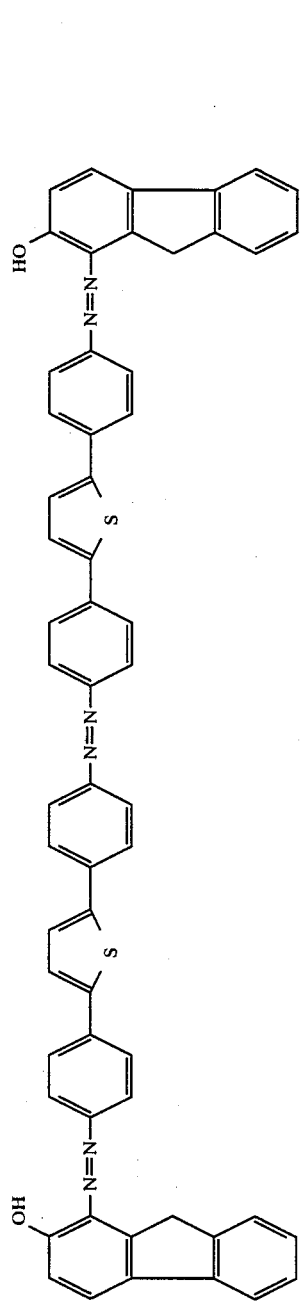
X-74
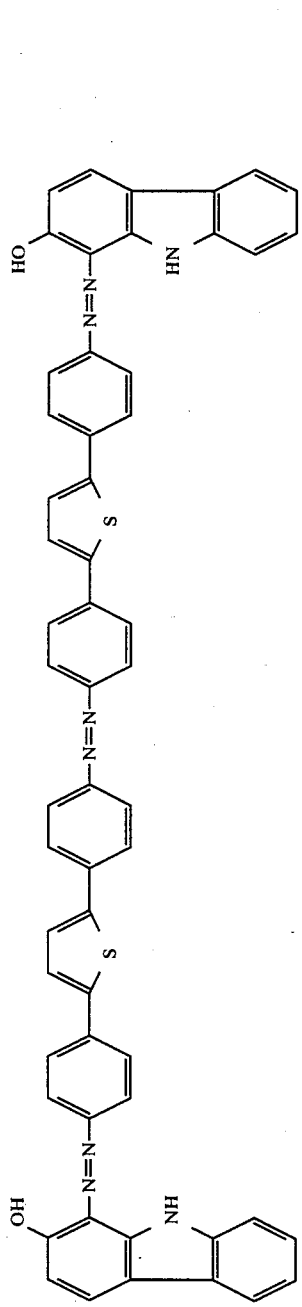

X-75
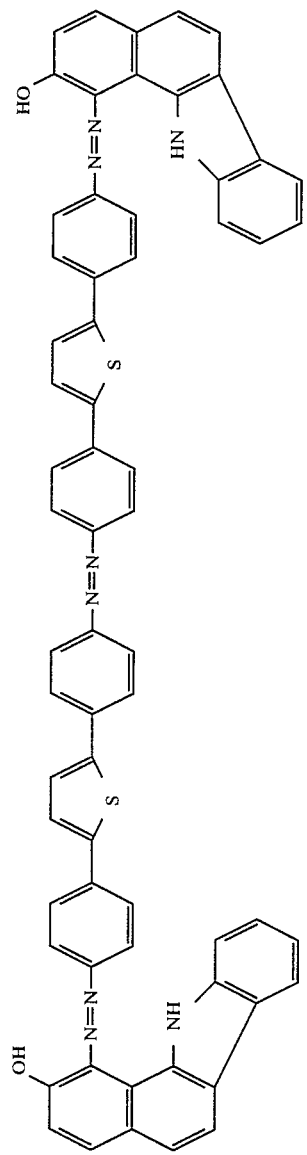
X-76
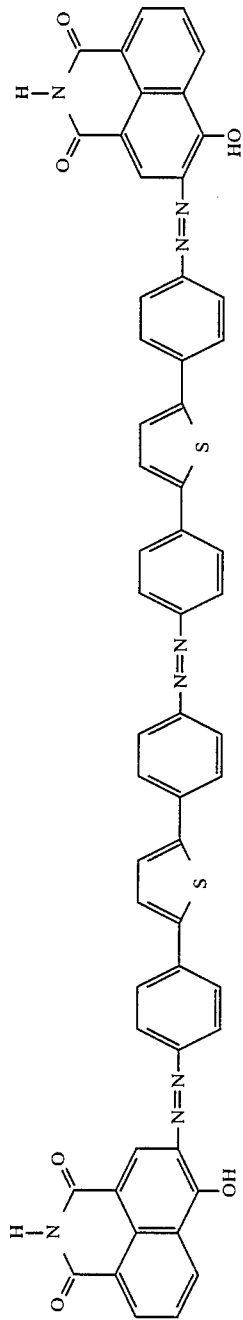
X-77 X-78
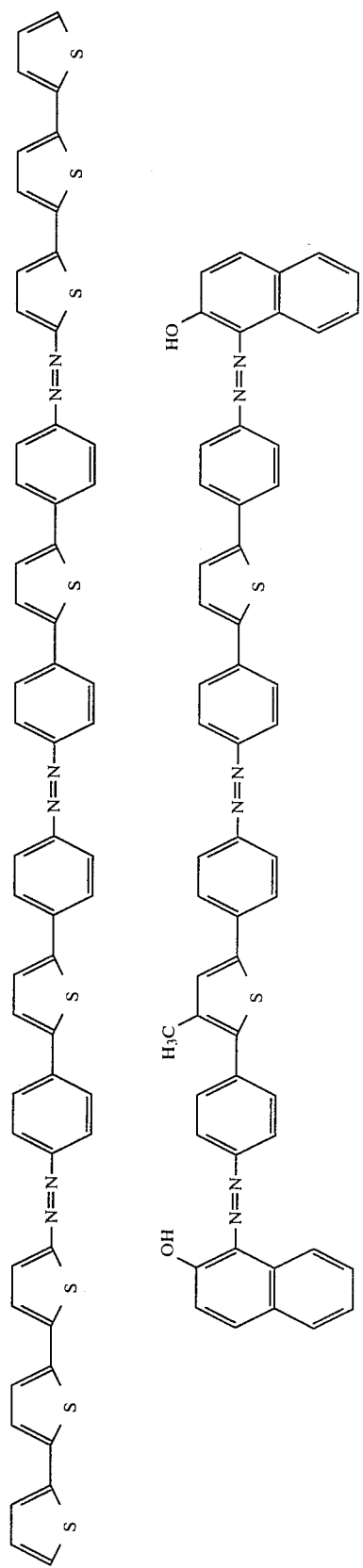

X-79
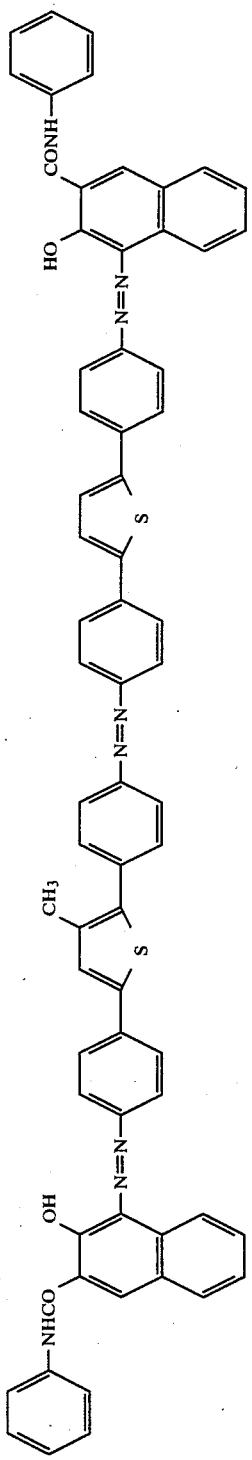
X-80
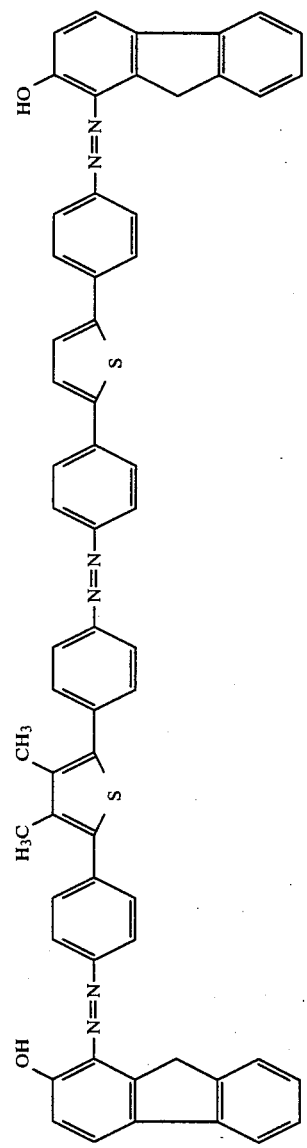
X-81

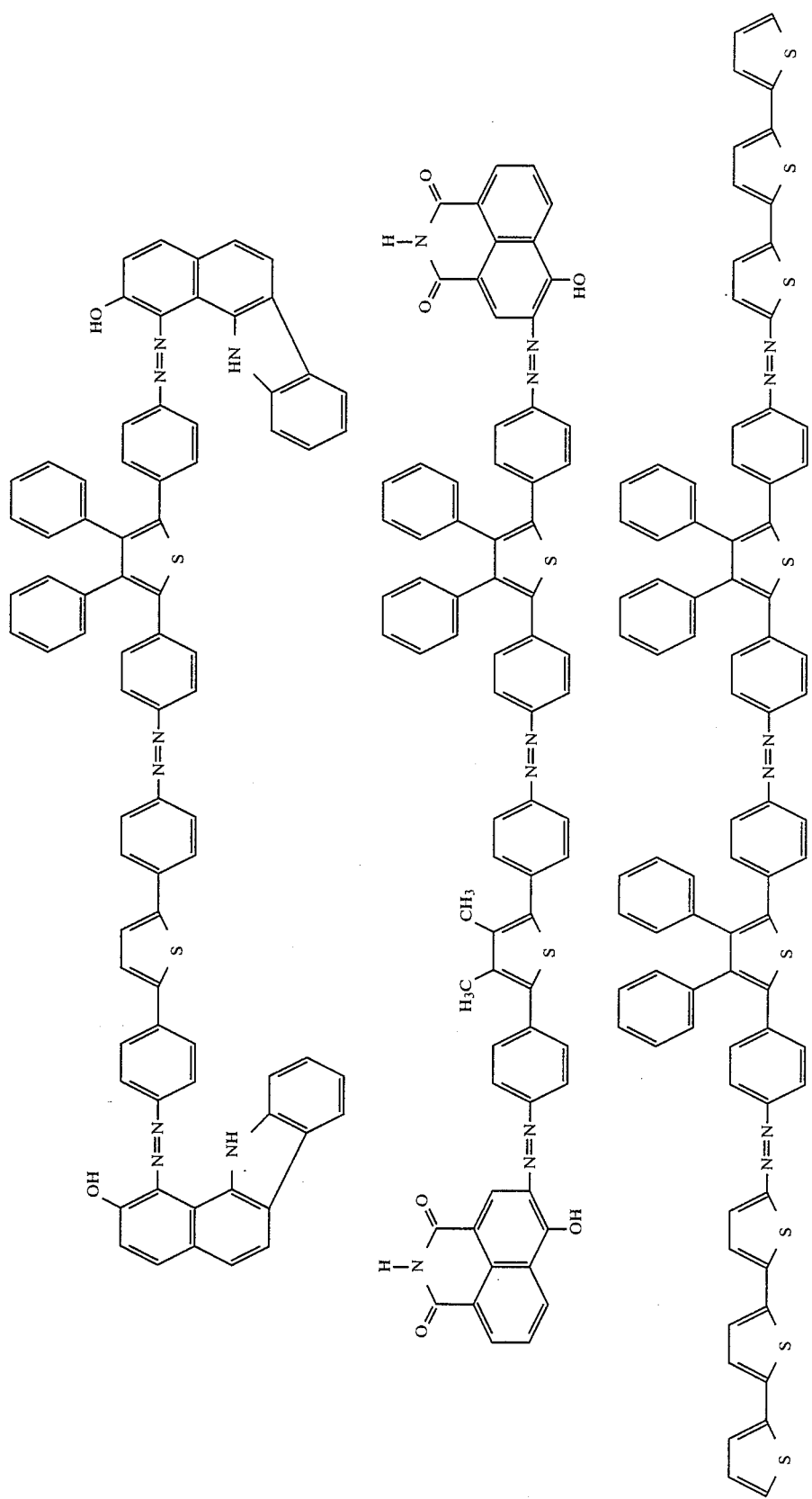

In the above examples, Compounds VIII-1 to VIII-35 correspond to general formula (VIII), Compounds IX-36 to IX-70 correspond to general formula (IX) and Compounds X-71 to X-84 correspond to general formula (X).

The photosensitive member of this invention contains a thiophene structure-containing azo compound such as mentioned above in the photosensitive layer thereof. According to the mode of use of the azo compound, three embodiments of the photosensitive member as shown in FIGS. 1 to 3 are possible.

Figure 2:
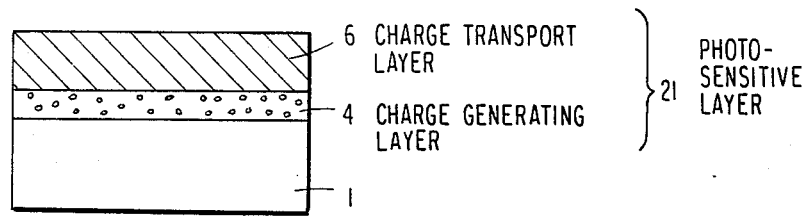
Figure 3:
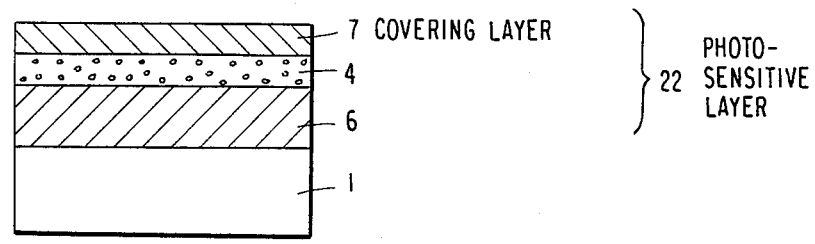

FIGS. 1 to 3 are schematic cross-sectional views of different embodiments of the photosensitive member of this invention. In the figures, the reference number 1 indicates an electroconductive substrate, 20, 21 and 22 each a photosensitive layer, 3 a charge generating substance, 4 a charge generating layer, 5 a charge transporting substance, 6 a charge transport layer, and 7 a covering layer.

In the embodiment shown in FIG. 1, a photosensitive layer 20 consisting of a dispersion of a charge generating substance (i.e., the azo compound) 3 and a charge transporting substance 5 in a binder resin is disposed on an electroconductive substrate 1. Such a construction is generally referred to as a monolayer type photosensitive member.

In the embodiment shown in FIG. 2, a photosensitive layer 21 which is a laminate of a charge generating layer 4 mainly composed of a charge generating substance (i.e., the azo compound) 3 and a charge transport layer 6 containing a charge transporting substance 5 is disposed on an electroconductive substrate 1. Such a construction is generally referred to as a laminate type photosensitive member.

In the embodiment shown in FIG. 3, the layer construction is reversed as compared with that shown in FIG. 2. In the case of this construction, a covering layer 7 is generally disposed for the protection of the charge generating layer 4.

The layer construction shown in FIG. 2 is generally used in the negative charge mode. Even if it is desired to use the layer construction shown in FIG. 2 in the positive charge mode, no appropriate charge transporting substance is available at present. Therefore, for use in the positive charge mode, the layer construction shown in FIG. 3 should be employed, as already proposed by the present inventors.

The photosensitive member shown in FIG. 1 can be prepared by dispersing the charge generating substance in a solution containing a charge transporting substance and a binder resin and applying the dispersion to an electroconductive substrate.

The photosensitive member shown in FIG. 2 can be prepared by applying a dispersion of a charge generating substance in particle form in a solvent or a binder resin to an electroconductive substrate, drying the coat layer and further applying a solution containing a charge transporting substance and a binder resin onto said coat layer, followed by drying.

The photosensitive member shown in FIG. 3 can be prepared by applying a solution containing a charge transporting substance and a binder resin to an electroconductive substrate and drying, then applying a dispersion of the charge generating substance in particle form in a solvent or a binder resin and drying, and further providing a covering layer 7.

The electroconductive substrate 1 has a function as an electrode of the photosensitive member as well as a function as a substrate for each layer of the photosensitive member. The electroconductive substrate 1 may be in the form of sheet, film or cylinder and may be made of a metal such as aluminum, stainless steel or nickel or of glass, a resin or the like as electroconductively surface-treated.

The charge generating layer 4 is formed by applying a dispersion of the charge generating substance 3, namely the azo compound having one of the general formulae (I) to (X), in particle form, in a binder resin. Said layer 4 accepts light and generates charges. It is important that said layer have high charge generating efficiency and, at the same time, that the charges generated be injected into the charge transport layer 6 and covering layer 7. It is desirable that the injection be as little dependent as possible on the electric field and be sufficient even in low intensity electric fields. It is also possible to form the charge generating layer using the charge generating substance in admixture with a minor proportion of a charge transporting substance and so forth. Usable as the binder resin are polycarbonates, polyesters, polyamides, polyurethanes, epoxy resins, silicone resins, methacrylic ester homopolymers and copolymers, for instance, either alone or in appropriate combinations. The amount ratio of the charge generating substance to the binder resin in the charge generating layer is preferably about 0.1:1 to about 1:1 by weight. The thickness of the charge generating layer is preferably less than 1 $\mu$m.

The charge transport layer is formed by application of a solution or dispersion of an organic compound, pyrazoline compound, styryl compound (stilbene derivative), triphenylamine compound, oxazole compound or oxadiazole compound, in a binder resin. In the dark, said layer serves as an insulator layer and retains electrostatic charges on the photosensitive member and, upon acceptable light, transports the charges injected from the charge generating layer. Examples of usable charge transporting substance include p-dimethylaminobenzaldehyde diphenylhydrazone, p-diethylaminobenzaldehyde diphenylhydrazone, p-diphenylaminobenzaldehyde diphenylhydrazone and 9-ethylcarbazole-3-carboxyaldehyde diphenylhydrazone as a hydrazone compound, 1,3,5-triphenylpyrazoline, 1-phenyl-3-(p-dimethylaminostyryl)-5-(p-dimethylaminophenyl)-2-pyrazoline and 1-phenyl-3-(p-diethylaminostyryl)-5-(p-diethylaminophenyl)-2-pyrazoline as a pyrazoline compound, α-phenyl-4'-N,N-dimethylaminostilbene, α-phenyl-4'-N,N-diethylaminostilbene and α-phenyl-4'-N,N-diphenylaminostilbene as a styryl compound, 2,5-bis(p-dimethylaminophenyl)-1,3,4-oxadiazole, 2,5-bis(p-diethylaminophenyl)-1,3,4-oxadiazole and 2,5-bis(p-dibenzylaminophenyl)-1,3,4-oxadiazole as an oxadiazole compound and tri(p-tolyl)amine as a triphenylamine compound. Further, another amine compound such as tetraphenylbenzidine can also be used. Usable as the binder resin are polycarbonates, polyesters, polyamides, polyurethanes, epoxy resins, silicone resins, methacrylic ester homopolymers and copolymers, among others. The amount ratio of the charge transporting substance to the resin binder in the charge transport layer is preferably about 0.2:1 to about 1:1 by weight. The thickness of the charge transport layer is preferably about 5 to 30 $\mu$m.

The covering layer 7, in the dark, accepts charges generated by corona discharge and retains them. It is necessary that said layer be capable of transmitting light to which the charge generating layer should respond and that said layer be capable of transmitting light at the time of exposure to thereby allow the light to reach the charge generating layer so that the surface charges can be neutralized and disappear upon injection of charges generated in the charge generating layer. Usable as the covering material are film-forming insulator materials such as polyesters and polyamides. Furthermore, such organic materials can be used in admixture with inorganic materials such as glass resins and $SiO_2$ or, further, materials which reduce the electric resistance, such as metals and metal oxides. The covering material is not limited to organic film-forming insulator materials but it is also possible to form the covering layer by using an inorganic material such as $SiO_2$ or by applying a metal, metal oxide or the like by the technique of vapor phase deposition or sputtering, for instance. The covering material should desirably be as transparent as possible in the wavelength region corresponding to the absorption maximum of the charge generating substance.

The thickness of the covering layer may vary depending on the composition thereof but generally is optional unless the covering layer produces an adverse effect, for example, causes an increase in residual potential in repeated continuous use. The thickness of the covering layer is preferably less than 1 μm.

The following examples are further illustrative of the present invention.

First of all, examples are given in which azo compounds of general formula (I) were used.

EXAMPLE I-1

A coating liquid was prepared by kneading in a mixer 50 weight parts of the azo compound No. I-1 shown above with 100 weight parts of a polyester resin (Vylon 200 (a trademark) produced by Toyo Spinning Co., Ltd.), 100 weight parts of 1-phenyl-3-(p-diethylaminostyryl)-5-(p-diethylaminophenyl)-2-pyrazoline (ASPP) and 10,000 weight parts of the solvent tetrahydrofuran for 3 hours. A photosensitive layer was formed, in a dry thickness of 15 μm, on an aluminum-deposited polyester film (electroconductive substrate) by applying the coating liquid to the substrate by the wire bar technique. Thus was prepared a photosensitive member.

EXAMPLE I-2

First, a coating solution was prepared by mixing a solution of 100 weight parts of p-diethylaminobenzaldehyde diphenylhydrazone (ABPH) in 700 weight parts of tetrahydrofuran and a solution of 100 weight parts of a polycarbonate resin (Panlite L-1250 (a trademark) produced by Teijin Chemicals, Ltd.) in 700 weight parts of a 1:1 mixed solvent composed of tetrahydrofuran and dichloromethane. A charge transport layer, in a dry thickness of 15 μm, was formed on an aluminum-deposited polyester film substrate by applying the coating solution to said substrate using a wire bar. On the thus-obtained charge transport layer, there was formed a charge generating layer in a dry thickness of 0.5 μm by applying, with a wire bar, a coating liquid prepared by kneading in a mixer 50 weight parts of the above-mentioned azo compound No. I-1, 50 weight parts of a polyester (Vylon 200), and 10,000 weight parts of tetrahydrofuran for 3 hours. Thus was prepared a photosensitive member.

EXAMPLE I-3

A photosensitive member was prepared by forming a charge transport layer and further a charge generating layer in the same manner as in Example I-2 except that the same amount of α-phenyl-4'-N,N-dimethylaminostilbene, which is a styryl compound, was used as the charge transporting substance in lieu of ABPH.

EXAMPLE I-4

A photosensitive member was prepared by forming a charge transport layer and further a charge generating layer in the same manner as in Example I-2 except that the same amount of tri(p-tolyl)amine, which is a triphenylamine compound, was used as the charge transporting substance in lieu of ABPH.

EXAMPLE I-5

A photosensitive member was prepared by forming a charge transport layer and further a charge generating layer in the same manner as in Example I-2 except that the same amount of 2,5-bis(p-diethylaminophenyl)-1,3,4-oxadiazole, which is an oxadiazole compound, was used as the charge transporting substance in lieu of ABPH.

The thus-obtained photosensitive members were measured for their electrophotographic characteristics using an electrostatic recording paper testing apparatus (Kawaguchi Denki model SP-428). The results obtained are shown in Table I-1.

The surface potential $V_s$ (volts) of each photosensitive member is the initial surface potential attained upon positively charging the photosensitive member surface by corona discharging at +6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE I-1

| Example No. | $V_s$ (volts) | $V_r$ (volts) | $E_{\frac{1}{2}}$ (lux · sec) |
|---|---|---|---|
| Example I-1 | 650 | 80 | 4.9 |
| Example I-2 | 620 | 70 | 5.1 |
| Example I-3 | 610 | 100 | 5.2 |
| Example I-4 | 670 | 50 | 4.8 |
| Example I-5 | 700 | 40 | 4.4 |

As can be seen in Table I-1, the photosensitive members of Examples I-1, I-2, I-3, I-4 and I-5 were satisfactory with respect to both half decay exposure and residual potential.

EXAMPLE I-6

A coating liquid was prepared by kneading in a mixer 100 weight parts of one of the azo compounds Nos. I-2 to I-35 specifically shown hereinabove, 100 weight parts of a polyester resin (Vylon 200) and 10,000 weight parts of tetrahydrofuran for 3 hours. A charge generating layer, in a dry thickness of about 0.5 μm, was formed on an aluminum support by applying the coating liquid to the support. An ASPP-containing coating liquid prepared in the same manner as in Example I-2 by using ASPP in lieu of ABPH was coated on the charge generating layer to give a layer thickness (dry) of about 15 μm. Thus were prepared photosensitive members.

The thus-obtained photosensitive members were measured for their electrophotographic characteristics using an electrostatic recording paper testing apparatus (Kawaguchi Denki model SP-428). The results obtained are shown in Table I-2.

The surface potential $V_s$ (volts) of each photosensitive member is the initial surface potential attained upon negatively charging the photosensitive member surface by corona discharging at −6.0 kV in the dark. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

As can be seen in Table I-2, the photosensitive members prepared by using the compounds Nos. I-2 to I-35 were satisfactory with respect to half decay exposure as well as residual potential.

TABLE I-2

| Compound No. | $E_{\frac{1}{2}}$ (lux · sec) | $V_r$ (volts) |
| --- | --- | --- |
| I-2 | 4.9 | −60 |
| I-3 | 4.1 | −50 |
| I-4 | 4.8 | −60 |
| I-5 | 6.5 | −60 |
| I-6 | 4.7 | −60 |
| I-7 | 6.3 | −50 |
| I-8 | 4.9 | −40 |
| I-9 | 4.2 | −70 |
| I-10 | 4.9 | −50 |
| I-11 | 5.8 | −80 |
| I-12 | 5.1 | −70 |
| I-13 | 4.8 | −90 |
| I-14 | 4.0 | −90 |
| I-15 | 4.4 | −80 |
| I-16 | 4.9 | −90 |
| I-17 | 5.5 | −70 |
| I-18 | 5.3 | −70 |
| I-19 | 4.2 | −40 |
| I-20 | 4.6 | −30 |
| I-21 | 4.8 | −90 |
| I-22 | 5.9 | −80 |
| I-23 | 5.5 | −30 |
| I-24 | 4.1 | −50 |
| I-25 | 4.1 | −80 |
| I-26 | 4.1 | −60 |
| I-27 | 4.8 | −90 |
| I-28 | 5.6 | −70 |
| I-29 | 6.3 | −120 |
| I-30 | 6.0 | −130 |
| I-31 | 6.3 | −90 |
| I-32 | 5.8 | −20 |
| I-33 | 4.2 | −70 |
| I-34 | 4.6 | −40 |
| I-35 | 5.6 | −50 |

Examples are now given in which azo compounds of general formulae (II) and (III) were used.

EXAMPLE II-1

A coating liquid was prepared by kneading in a mixer 50 weight parts of the azo compound No. II-1 shown above with 100 weight parts of a polyester resin (Vylon 200), 100 weight parts of 1-phenyl-3-(p-diethylaminostyryl)-5-(p-diethylaminophenyl)-2-pyrazoline (ASPP) and 10,000 weight parts of tetrahydrofuran for 3 hours. A photosensitive layer was formed, in a dry thickness of 15 μm, on an aluminum-deposited polyester film (electroconductive substrate) by applying the coating liquid to the substrate by the wire bar technique. Thus was prepared a photosensitive member having the construction shown in FIG. 1.

EXAMPLE II-2

A photosensitive member was prepared in the same manner as in Example II-1 except that the same amount of the azo compound No. III-36 given above was used in lieu of the azo compound No. II-1.

EXAMPLE II-3

First, a coating solution was prepared by mixing a solution of 100 weight parts of p-diethylaminobenzaldehyde diphenylhydrazone (ABPH) in 700 weight parts of tetrahydrofuran and a solution of 100 weight parts of a polycarbonate resin (Panlite L-1250) in 700 weight parts of a 1:1 mixed solvent composed of tetrahydrofuran and dichloromethane. A charge transport layer, in a dry thickness of 15 μm, was formed on an aluminum-deposited polyester film substrate by applying the coating solution to said substrate using a wire bar. On the thus-obtained charge transport layer, there was formed a charge generating layer in a dry thickness of 0.5 μm by applying, with a wire bar, a coating liquid prepared by kneading in a mixer 50 weight parts of the above-mentioned azo compound No. II-1, 50 weight parts of a polyester (Vinyl 200) and 10,000 weight parts of tetrahydrofuran for 3 hours. Thus was prepared a photosensitive member corresponding in construction to FIG. 3. No covering layer was provided in this example since the invention is not directly concerned with the covering layer.

EXAMPLE II-4

A photosensitive member was prepared in the same manner as in Example II-3 except that the same amount of the azo compound No. III-36 was used in lieu of the azo compound No. II-1.

EXAMPLE II-5

A photosensitive member was prepared by forming a charge transport layer and further a charge generating layer in the same manner as in Example II-3 except that the same amount of α-phenyl-4'-N,N-dimethylaminostilbene, which is a styryl compound, was used as the charge transporting substance in lieu of ABPH.

EXAMPLE II-6

A photosensitive member was prepared in the same manner as in Example II-5 except that the same amount of the azo compound No. III-36 was used in lieu of the azo compound No. II-1.

EXAMPLE II-7

A photosensitive member was prepared by forming a charge transport layer and further a charge generating layer in the same manner as in Example II-3 except that tri(p-tolyl)amine, which is a triphenylamine compound, was used as the charge transporting substance in lieu of ABPH.

EXAMPLE II-8

A photosensitive member was prepared in the same manner as in Example II-7 except that the same amount of the azo compound No. III-36 was used in lieu of the azo compound No. II-1.

EXAMPLE II-9

A photosensitive member was prepared by forming a charge transport layer and further a charge generating layer in the same manner as in Example II-3 except that the same amount of 2,5-bis(p-diethylaminophenyl)-1,3,4-oxadiazole, which is an oxadiazole compound, was used as the charge transporting substance in lieu of ABPH.

EXAMPLE II-10

A photosensitive member was prepared in the same manner as in Example II-9 except that the same amount of the azo compound No. III-36 was used in lieu of the azo compound No. II-1.

The thus-obtained photosensitive members were measured for their electrophotographic characteristics using an electrostatic recording paper testing apparatus (Kawaguchi Denki model SP-428). The results obtained are shown in Table II-1.

The surface potential $V_s$ (volts) of each photosensitive member is the initial surface potential attained upon positively charging the photosensitive member surface by corona discharging at $-6.0$ kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE II-1

| Example No. | $V_s$ (volts) | $V_r$ (volts) | $E_{\frac{1}{2}}$ (lux · sec) |
|---|---|---|---|
| Example II-1 | 660 | 60 | 4.2 |
| Example II-2 | 650 | 80 | 4.1 |
| Example II-3 | 610 | 40 | 4.1 |
| Example II-4 | 670 | 40 | 4.1 |
| Example II-5 | 630 | 30 | 4.8 |
| Example II-6 | 610 | 50 | 3.9 |
| Example II-7 | 610 | 50 | 5.0 |
| Example II-8 | 640 | 30 | 4.3 |
| Example II-9 | 650 | 60 | 4.7 |
| Example II-10 | 600 | 60 | 4.8 |

As can be seen in Table II-1, the photosensitive members of Examples II-1 to II-10 in which the azo compound No. II-1 or No. III-36 was used as the charge generating substance were satisfactory with respect to all of surface potential $V_s$, half decay exposure $E_{\frac{1}{2}}$ and residual potential $V_r$.

EXAMPLE II-11

A coating liquid was prepared by kneading in a mixer 100 weight parts of one of the azo compounds Nos. II-2 to II-35 specifically shown hereinabove, 100 weight parts of a polyester resin (Vylon 200) and 10,000 weight parts of tetrahydrofuran for 3 hours. A charge generating layer, in a dry thickness of about 0.5 μm, was formed on an aluminum support by applying the coating liquid to the support. An ASPP-containing coating liquid prepared in the same manner as in Example II-3 by using ASPP in lieu of ABPH was coated on the charge generating layer to give a dry thickness of about 15 μm. Thus were prepared photosensitive members having the construction shown in FIG. 2.

The thus-obtained photosensitive members were measured for their electrophotographic characteristics using an electrostatic recording paper testing apparatus (Kawaguchi Denki model SP-428). The results obtained are shown in Table II-2.

The surface potential $V_s$ (volts) of each photosensitive member is the initial surface potential attained upon negatively charging the photosensitive member surface by corona discharging at $-6.0$ kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE II-2

| Compound No. | $E_{\frac{1}{2}}$ (lux · sec) | $V_r$ (volts) |
|---|---|---|
| II-2 | 6.5 | −50 |
| II-3 | 5.7 | −80 |
| II-4 | 3.5 | −20 |
| II-5 | 4.4 | −80 |
| II-6 | 4.6 | −70 |
| II-7 | 4.2 | −70 |
| II-8 | 4.5 | −60 |
| II-9 | 5.2 | −50 |
| II-10 | 4.4 | −50 |
| II-11 | 4.8 | −80 |
| II-12 | 5.9 | −60 |
| II-13 | 4.8 | −90 |
| II-14 | 6.2 | −20 |
| II-15 | 4.6 | −80 |
| II-16 | 5.1 | −30 |
| II-17 | 5.2 | −50 |
| II-18 | 5.2 | −30 |
| II-19 | 5.2 | −50 |
| II-20 | 4.6 | −30 |
| II-21 | 6.2 | −50 |
| II-22 | 6.8 | −50 |
| II-23 | 5.3 | −60 |
| II-24 | 4.8 | −90 |
| II-25 | 4.6 | −40 |
| II-26 | 4.7 | −60 |
| II-27 | 4.3 | −90 |
| II-28 | 4.3 | −80 |
| II-29 | 4.8 | −30 |
| II-30 | 5.5 | −70 |
| II-31 | 5.9 | −40 |
| II-32 | 4.4 | −50 |
| II-33 | 5.6 | −30 |
| II-34 | 4.1 | −60 |
| II-35 | 4.9 | −80 |

As can be seen in Table II-2, the photosensitive members prepared by using the azo compound Nos. II-2 to II-35 were satisfactory with respect to half decay exposure $E_{\frac{1}{2}}$ and residual potential $V_r$.

EXAMPLE II-12

Photosensitive members were prepared in the same manner as in Example II-11 except that the same amount of the azo compounds Nos. III-37 to III-70 were used. The physical characteristics of the members were measured. The results of the measurements are shown in Table III.

TABLE III

| Compound No. | $E_{\frac{1}{2}}$ (lux · sec) | $V_r$ (volts) |
| --- | --- | --- |
| III-37 | 4.0 | −40 |
| III-38 | 6.1 | −40 |
| III-39 | 3.9 | −90 |
| III-40 | 4.5 | −70 |
| III-41 | 4.6 | −70 |
| III-42 | 4.8 | −50 |
| III-43 | 4.3 | −30 |
| III-44 | 5.1 | −60 |
| III-45 | 4.2 | −40 |
| III-46 | 4.6 | −50 |
| III-47 | 5.8 | −50 |
| III-48 | 4.1 | −70 |
| III-49 | 5.7 | −90 |
| III-50 | 4.6 | −40 |
| III-51 | 5.1 | −30 |
| III-52 | 5.8 | −20 |
| III-53 | 5.3 | −80 |
| III-54 | 5.9 | −70 |
| III-55 | 4.8 | −60 |
| III-56 | 4.6 | −50 |
| III-57 | 4.8 | −80 |
| III-58 | 5.2 | −70 |
| III-59 | 4.8 | −60 |
| III-60 | 4.2 | −50 |
| III-61 | 4.6 | −90 |
| III-62 | 4.3 | −80 |
| III-63 | 4.8 | −60 |
| III-64 | 4.6 | −90 |
| III-65 | 5.5 | −20 |
| III-66 | 5.7 | −30 |
| III-67 | 5.8 | −40 |
| III-68 | 5.4 | −60 |
| III-69 | 4.9 | −50 |
| III-70 | 6.8 | −30 |

As can be seen in Table III, the photosensitive members prepared by using the azo compounds Nos. III-37 to III-70 were also satisfactory with respect to half decay exposure $E_{\frac{1}{2}}$ and residual potential $V_r$.

In the following, Examples of the photosensitive member according to the invention with azo compounds of general formulae (IV) and (V) contained in the respective photosensitive layers are described.

EXAMPLE IV-1

A coating liquid was prepared by kneading in a mixer 50 weight parts of the azo compound No. IV-1 shown above with 100 weight parts of a polyester resin (Vylon 200), 100 weight parts of 1-phenyl-3-(p-diethylaminostyryl)-5-(p-diethylaminophenyl)-2-pyrazoline (ASPP) and 10,000 weight parts of tetrahydrofuran for 3 hours. A photosensitive layer was formed, in a dry thickness of 15 μm, on an aluminum-deposited polyester film (electroconductive substrate) by applying the coating liquid to the substrate by the wire bar technique. Thus was prepared a photosensitive member.

EXAMPLE IV-2

A photosensitive member was prepared in the same manner as in Example IV-1 except that the same amount of the azo compound No. V-36 was used in lieu of the azo compound No. IV-1.

EXAMPLE IV-3

First, a coating solution was prepared by mixing a solution of 100 weight parts of p-diethylaminobenzaldehyde diphenylhydrazone (ABPH) in 700 weight parts of tetrahydrofuran and a solution of 100 weight parts of a polycarbonate resin (Panlite L-1250) in 700 weight parts of a 1:1 mixed solvent composed of tetrahydrofuran and dichloromethane. A charge transport layer, in a dry thickness of 15 μm, was formed on an aluminum-deposited polyester film substrate by applying the coating solution to said substrate using a wire bar. On the thus-obtained charge transport layer, there was formed a charge generating layer in a dry thickness of 0.5 μm by applying, with a wire bar, a coating liquid prepared by kneading in a mixer 50 weight parts of the above-mentioned azo compound No. IV-1, 50 weight parts of a polyester (Vylon 200), and 10,000 weight parts of tetrahydrofuran for 3 hours. Thus was prepared a photosensitive member.

EXAMPLE IV-4

A photosensitive member was prepared in the same manner as in Example IV-3 except that the same amount of the azo compound No. V-36 was used in lieu of the azo compound No. IV-1.

EXAMPLE IV-5

A photosensitive member was prepared by forming a charge transport layer and further a charge generating layer in the same manner as in Example IV-3 except that the same amount of α-phenyl-4'-N,N-dimethylaminostilbene, which is a styryl compound, was used as the charge transporting substance in lieu of ABPH.

EXAMPLE IV-6

A photosensitive member was prepared in the same manner as in Example IV-5 except that the same amount of the azo compound No. V-36 was used in lieu of the azo compound No. IV-1.

EXAMPLE IV-7

A photosensitive member was prepared by forming a charge transport layer and further a charge generating layer in the same manner as in Example IV-3 except that the same amount of tri(p-tolyl)amine, which is a triphenylamine compound, was used as the charge transporting substance in lieu of ABPH.

EXAMPLE IV-8

A photosensitive member was prepared in the same manner as in Example IV-7 except that the same amount of the azo compound No. V-36 was used in lieu of the azo compound No. IV-1.

EXAMPLE IV-9

A photosensitive member was prepared by forming a charge transport layer and further a charge generating layer in the same manner as in Example IV-3 except that the same amount of 2,5-bis(p-diethylaminophenyl)-1,3,4-oxadiazole, which is an oxadiazole compound, was used as the charge transporting substance in lieu of ABPH.

EXAMPLE IV-10

A photosensitive member was prepared in the same manner as in Example IV-9 except that the same amount of the azo compound No. V-36 was used in lieu of the azo compound No. IV-1.

The thus-obtained photosensitive members were measured for their electrophotographic characteristics using an electrostatic recording paper testing apparatus (Kawaguchi Denki model SP-428). The results obtained are shown in Table IV-1.

The surface potential $V_s$ (volts) of each photosensitive member is the initial surface potential attained upon positively charging the photosensitive member surface by corona discharging at +6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE IV-1

| Example No. | $V_s$ (volts) | $V_r$ (volts) | $E_{\frac{1}{2}}$ (lux·sec) |
|---|---|---|---|
| Example IV-1 | 600 | 90 | 4.3 |
| Example IV-2 | 670 | 80 | 4.2 |
| Example IV-3 | 650 | 60 | 4.1 |
| Example IV-4 | 620 | 90 | 4.8 |
| Example IV-5 | 620 | 30 | 4.8 |
| Example IV-6 | 700 | 40 | 3.9 |
| Example IV-7 | 700 | 40 | 5.1 |
| Example IV-8 | 680 | 30 | 4.4 |
| Example IV-9 | 680 | 80 | 5.2 |
| Example IV-10 | 610 | 40 | 4.7 |

As can be seen in Table IV-1, the photosensitive members of Examples IV-1 to IV-10 as prepared by using the azo compound No. IV-1 or V-36 as the charge generating substance were satisfactory with respect to surface potential $V_s$, half decay exposure $E_{\frac{1}{2}}$ and residual potential $V_r$.

EXAMPLE IV-11

A coating liquid was prepared by kneading in a mixer 100 weight parts of one of the azo compounds Nos. IV-2 to IV-35 shown hereinabove, 100 weight parts of a polyester resin (Vylon 200) and 10,000 weight parts of tetrahydrofuran for 3 hours. A charge generating layer, in a dry thickness of about 0.5 μm, was formed on an aluminum support by applying the coating liquid to the support. An ASPP-containing coating liquid prepared in the same manner as in Example IV-3 by using ASPP in lieu of ABPH was coated on the charge generating layer to give a layer thickness (dry) of about 15 μm. Thus were prepared photosensitive members.

The thus-obtained photosensitive members were measured for their electrophotographic characteristics using an electrostatic recording paper testing apparatus (Kawaguchi Denki model SP-428). The results obtained are shown in Table IV-2.

The surface potential $V_s$ (volts) of each photosensitive member is the initial surface potential attained upon negatively charging the photosensitive member surface by corona discharging at −6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE IV-2

| Compound No. | $E_{\frac{1}{2}}$ (lux·sec) | $V_r$ (volts) |
|---|---|---|
| IV-2 | 5.5 | −60 |
| IV-3 | 4.4 | −70 |
| IV-4 | 5.3 | −80 |
| IV-5 | 5.7 | −60 |
| IV-6 | 3.6 | −50 |
| IV-7 | 5.4 | −70 |
| IV-8 | 4.3 | −70 |
| IV-9 | 6.3 | −50 |
| IV-10 | 5.4 | −60 |
| IV-11 | 4.5 | −40 |
| IV-12 | 5.4 | −80 |
| IV-13 | 4.6 | −50 |
| IV-14 | 5.7 | −80 |
| IV-15 | 4.5 | −80 |
| IV-16 | 4.4 | −30 |
| IV-17 | 4.7 | −30 |
| IV-18 | 5.6 | −70 |
| IV-19 | 4.2 | −50 |
| IV-20 | 5.4 | −20 |
| IV-21 | 5.3 | −30 |
| IV-22 | 3.2 | −60 |
| IV-23 | 5.6 | −70 |
| IV-24 | 4.4 | −50 |
| IV-25 | 6.1 | −30 |
| IV-26 | 5.5 | −60 |
| IV-27 | 4.6 | −50 |
| IV-28 | 5.8 | −40 |
| IV-29 | 4.2 | −20 |
| IV-30 | 5.2 | −80 |
| IV-31 | 4.6 | −60 |
| IV-32 | 4.8 | −40 |
| IV-33 | 4.7 | −70 |
| IV-34 | 5.2 | −70 |
| IV-35 | 4.9 | −60 |

As can be seen in Table IV-2, the photosensitive members prepared by using the compounds Nos. IV-2 to IV-35 were satisfactory with respect to half decay exposure and residual potential.

EXAMPLE IV-12

Photosensitive members were prepared in the same manner as in Example IV-11 except that the same in lieu of the azo compounds Nos. IV-2 to IV-35. The members obtained were measured for their electrophotographic characteristics. The results obtained are shown in Table V.

TABLE V

| Compound No. | $E_{\frac{1}{2}}$ (lux·sec) | $V_r$ (volts) |
|---|---|---|
| V-37 | 4.0 | −90 |
| V-38 | 5.1 | −80 |
| V-39 | 4.9 | −30 |
| V-40 | 6.5 | −30 |
| V-41 | 5.6 | −20 |
| V-42 | 6.8 | −90 |
| V-43 | 4.3 | −60 |
| V-44 | 5.1 | −50 |
| V-45 | 4.2 | −80 |
| V-46 | 5.6 | −50 |
| V-47 | 5.8 | −50 |
| V-48 | 4.1 | −50 |
| V-49 | 5.7 | −80 |
| V-50 | 4.6 | −30 |
| V-51 | 5.1 | −60 |
| V-52 | 5.8 | −70 |
| V-53 | 5.3 | −40 |
| V-54 | 5.0 | −60 |
| V-55 | 4.5 | −90 |
| V-56 | 4.7 | −80 |
| V-57 | 4.4 | −30 |
| V-58 | 6.6 | −30 |
| V-59 | 4.5 | −20 |
| V-60 | 5.0 | −60 |

TABLE V-continued

| Compound No. | $E_{\frac{1}{2}}$ (lux · sec) | $V_r$ (volts) |
| --- | --- | --- |
| V-61 | 4.4 | −50 |
| V-62 | 4.4 | −40 |
| V-63 | 4.8 | −60 |
| V-64 | 4.2 | −50 |
| V-65 | 5.6 | −30 |
| V-66 | 5.8 | −30 |
| V-67 | 4.8 | −40 |
| V-68 | 4.6 | −90 |
| V-69 | 5.1 | −70 |
| V-70 | 4.6 | −70 |

As can be seen in Table V, the photosensitive members prepared by using the compounds Nos. V-37 to V-70 were also satisfactory with respect to half decay exposure and residual potential.

The following examples describe photosensitive members containing azo compounds of general formulae (VI) and (VII) in their photosensitive layers.

EXAMPLE VI-1

A coating liquid was prepared by kneading in a mixer 50 weight parts of the azo compound No. VI-1 shown above with 100 weight parts of a polyester resin (Vylon 200), 100 weight parts of 1-phenyl-3-(p-diethylaminostyryl)-5-(p-diethylaminophenyl)-2-pyrazoline (ASPP) and 10,000 weight parts of tetrahydrofuran for 3 hours. A photosensitive layer was formed, in a dry thickness of 15 μm, on an aluminum-deposited polyester film (electroconductive substrate) by applying the coating liquid to the substrate by the wire bar technique. Thus was prepared a photosensitive member having the construction shown in FIG. 1.

EXAMPLE VI-2

A photosensitive member was prepared in the same manner as in Example VI-1 except that the same amount of the azo compound No. VII-15 was used in lieu of the azo compound No. VI-1.

EXAMPLE VI-3

First, a coating solution was prepared by mixing a solution of 100 weight parts of p-diethylaminobenzaldehyde diphenylhydrazone (ABPH) in 700 weight parts of tetrahydrofuran and a solution of 100 weight parts of a polycarbonate resin (Panlite L-1250) in 700 weight parts of a 1:1 mixed solvent composed of tetrahydrofuran and dichloromethane. A charge transport layer, in a dry thickness of 15 μm, was formed on an aluminum-deposited polyester film substrate by applying the coating solution to said substrate using a wire bar. On the thus-obtained charge transport layer, there was formed a charge generating layer in a dry thickness of 0.5 μm by applying, with a wire bar, a coating liquid prepared by kneading in a mixer 50 weight parts of the above-mentioned azo compound No. VI-1, 50 weight parts of a polyester (Vylon 200), and 10,000 weight parts of tetrahydrofuran for 3 hours. Thus was prepared a photosensitive member corresponding in construction to FIG. 3. No covering layer was provided in this example since the invention is not directly concerned with the covering layer.

EXAMPLE VI-4

A photosensitive member was prepared in the same manner as in Example VI-3 except that the same amount of the azo compound No. VII-15 was used in lieu of the azo compound No. VI-1.

EXAMPLE VI-5

A photosensitive member was prepared by forming a charge transport layer and further a charge generating layer in the same manner as in Example VI-3 except that α-phenyl-4', N,N-dimethylaminostilbene, which is a styryl compound, was used as the charge transporting substance in lieu of ABPH.

EXAMPLE VI-6

A photosensitive member was prepared in the same manner as in Example VI-5 except that the same amount of the azo compound No. VII-15 was used in lieu of the azo compound No. VI-1.

EXAMPLE VI-7

A photosensitive member was prepared by forming a charge transport layer and further a charge generating layer in the same manner as in Example VI-3 except that tri(p-tolyl)amine, which is a triphenylamine compound, was used as the charge transporting substance in lieu of ABPH.

EXAMPLE VI-8

A photosensitive member was prepared in the same manner as in Example VI-7 except that the same amount of the azo compound No. VII-15 was used in lieu of the azo compound No. VI-1.

EXAMPLE VI-9

A photosensitive member was prepared by forming a charge transport layer and further a charge generating layer in the same manner as in Example VI-3 except that 2,5-bis(p-diethylaminophenyl)-1,3,4-oxadiazole, which is an oxadiazole compound, was used as the charge transporting substance in lieu of ABPH.

EXAMPLE VI-10

A photosensitive member was prepared in the same manner as in Example VI-9 except that the azo compound No. VII-15 was used in lieu of the azo compound No. VI-1.

The thus-obtained photosensitive members were measured for their electrophotographic characteristics using an electrostatic recording paper testing apparatus (Kawaguchi Denki model SP-428). The results obtained are shown in Table VI-1.

The surface potential $V_s$ (volts) of each photosensitive member is the initial surface potential attained upon positively charging the photosensitive member surface by corona discharging at +6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE VI-1

| Example No. | $V_s$ (volts) | $V_r$ (volts) | $E_{\frac{1}{2}}$ (lux · sec) |
|---|---|---|---|
| Example VI-1 | 700 | 100 | 4.8 |
| Example VI-2 | 700 | 80 | 4.1 |
| Example VI-3 | 640 | 80 | 4.4 |
| Example VI-4 | 640 | 30 | 4.7 |
| Example VI-5 | 680 | 100 | 4.9 |
| Example VI-6 | 610 | 20 | 4.9 |
| Example VI-7 | 640 | 80 | 5.0 |
| Example VI-8 | 670 | 40 | 4.4 |
| Example VI-9 | 700 | 70 | 4.7 |
| Example VI-10 | 630 | 70 | 5.0 |

As can be seen in Table VI-1, the photosensitive members of Examples VI-1 to VI-10 as prepared by using the azo compound No. VI-1 or VII-15 as the charge generating substance were satisfactory with respect to surface potential $V_s$, half decay exposure $E_{\frac{1}{2}}$ and residual potential $V_r$.

EXAMPLE VI-11

A coating liquid was prepared by kneading in a mixer 100 weight parts of one of the azo compounds Nos. VI-2 to VI-14 shown hereinbefore, 100 weight parts of a polyester resin (Vylon 200) and 10,000 weight parts of tetrahydrofuran for 3 hours. A charge generating layer, in a dry thickness of about 0.5 μm, was formed on an aluminum support by applying the coating liquid to the support. An ASPP-containing coating liquid prepared in the same manner as in Example VI-3 by using ASPP in lieu of ABPH was coated on the charge generating layer to give a layer thickness (dry) of about 15 μm. Thus were prepared photosensitive members having the construction shown in FIG. 2.

The thus-obtained photosensitive members were measured for their electrophotographic characteristics using an electrostatic recording paper testing apparatus (Kawaguchi Denki model SP-428). The results obtained are shown in Table VI-2.

The surface potential $V_s$ (volts) of each photosensitive member is the initial surface potential attained upon negatively charging the photosensitive member surface by corona discharging at −6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE VI-2

| Compound No. | $E_{\frac{1}{2}}$ (lux · sec) | $V_r$ (volts) |
|---|---|---|
| VI-2 | 3.2 | −60 |
| VI-3 | 4.2 | −70 |
| VI-4 | 4.8 | −40 |
| VI-5 | 5.5 | −80 |
| VI-6 | 6.1 | −50 |
| VI-7 | 4.6 | −70 |
| VI-8 | 4.2 | −90 |
| VI-9 | 5.8 | −50 |
| VI-10 | 5.2 | −80 |
| VI-11 | 4.5 | −70 |
| VI-12 | 4.7 | −40 |
| VI-13 | 6.2 | −50 |
| VI-14 | 4.1 | −40 |

As can be seen in Table VI-2, the photosensitive members prepared by using the azo compounds Nos. VI-2 to VI-14 were satisfactory with respect to half decay exposure $E_{\frac{1}{2}}$ and residual potential $V_r$.

EXAMPLE VI-12

Photosensitive members were prepared in the same manner as in Example VI-11 except that the same amount of the azo compounds Nos. VII-16 to VII-28 were used. The members thus obtained were measured for characteristics. The results obtained are shown in Table VI-3.

TABLE VI-3

| Compound No. | $E_{\frac{1}{2}}$ (lux · sec) | $V_r$ (volts) |
|---|---|---|
| VII-16 | 4.2 | −80 |
| VII-17 | 5.6 | −70 |
| VII-18 | 4.3 | −50 |
| VII-19 | 5.8 | −60 |
| VII-20 | 3.6 | −80 |
| VII-21 | 4.5 | −70 |
| VII-22 | 5.7 | −90 |
| VII-23 | 5.8 | −90 |
| VII-24 | 4.4 | −60 |
| VII-25 | 5.9 | −70 |
| VII-26 | 4.8 | −30 |
| VII-27 | 3.9 | −90 |
| VII-28 | 4.7 | −80 |

As can be seen in Table VI-3, the photosensitive members prepared by using the azo compounds Nos. VII-16 to VII-28 were also satisfactory with respect to half decay exposure $E_{\frac{1}{2}}$ and residual potential $V_r$.

The following examples are illustrative of photosensitive members containing azo compounds of general formulae (VIII), (IX) or (X) in their photosensitive layers.

EXAMPLE VIII-1

A coating liquid was prepared by kneading in a mixer 50 weight parts of the azo compound No. VIII-1 shown above with 100 weight parts of a polyester resin (Vylon 200), 100 weight parts of 1-phenyl-3-(p-diethylaminostyryl)-5-(p-diethylaminophenyl)-2-pyrazoline (ASPP) and 10,000 weight parts of tetrahydrofuran for 3 hours. A photosensitive layer was formed, in a dry thickness of 15 μm, on an aluminum-deposited polyester film (electroconductive substrate) by applying the coating liquid to the substrate by the wire bar technique. Thus was prepared a photosensitive member having the construction shown in FIG. 1.

EXAMPLE VIII-2

A photosensitive member was prepared in the same manner as in Example VIII-1 except that the same amount of the azo compound No. IX-36 was used in lieu of the azo compound No. VIII-1.

EXAMPLE VIII-3

A photosensitive member was prepared in the same manner as in Example VIII-1 except that the same amount of the azo compound No. X-71 was used in lieu of the azo compound No. VIII-1.

EXAMPLE VIII-4

First, a coating solution was prepared by mixing solution of 100 weight parts of p-diethylaminobenzaldehyde diphenylhydrazone (ABPH) in 700 weight parts of tetrahydrofuran and a solution of 100 weight parts of a polycarbonate resin (Panlite L-1250) in 700 weight parts of a 1:1 mixed solvent composed of tetrahydrofuran and dichloromethane. A charge transport layer, in a dry thickness of 15 μm, was formed on an aluminum-deposited polyester film substrate by applying the coating solution to said substrate using a wire bar. On the thus-obtained charge transport layer, there was formed a charge generating layer in a dry thickness of 0.5 μm by applying, with a wire bar, a coating liquid prepared by kneading in a mixer 50 weight parts of the above-mentioned azo compound No. VIII-1, 50 weight parts of a polyester (Vylon 200), and 10,000 weight parts of tetrahydrofuran for 3 hours. Thus was prepared a photosensitive member corresponding in construction to FIG. 3. No covering layer was provided in this example since the invention is not directly concerned with the covering layer.

EXAMPLE VIII-5

A photosensitive member was prepared in the same manner as in Example VIII-4 except that the same amount of the azo compound No. IX-36 was used in lieu of the azo compound No. VIII-1.

EXAMPLE VIII-6

A photosensitive member was prepared in the same manner as in Example VIII-4 except that the same amount of the azo compound No. X-71 was used in lieu of the azo compound No. VIII-1.

EXAMPLES VIII-7, VIII-8 AND VIII-9

Photosensitive members of Examples VIII-7, VIII-8 and VIII-9 were prepared in the same manner as in Examples VIII-4, VIII-5 and VIII-6, respectively, except that the same amount of α-phenyl-4'-N,N-dimethylaminostilbene, which is a styryl compound, was used in lieu of ABPH.

EXAMPLES VIII-10, VIII-11 AND VIII-12

Photosensitive members of Examples VIII-10, VIII-11 and VIII-12 were prepared in the same manner as in Examples VIII-4, VIII-5 and VIII-6, respectively, except that the same amount of tri(p-tolyl)amine, which is a triphenylamine compound, was used in lieu of ABPH.

EXAMPLES VIII-13, VIII-14 AND VIII-15

Photosensitive members of examples VIII-13, VIII-14 and VIII-15 were prepared in the same manner as in Examples VIII-4, VIII-5 and VIII-6, respectively, except that the same amount of 2,5-bis(p-diethylaminophenyl)-1,3,4-oxadiazole, which is an oxadiazole compound, was used in lieu of ABPH.

The thus-obtained photosensitive members were measured for their electrophotographic characteristics using an electrostatic recording paper testing apparatus (Kawaguchi Denki model SP-428). The results obtained are shown in Table VIII-1.

The surface potential $V_s$ (volts) of each photosensitive member is the initial surface potential attained upon positively charging the photosensitive member surface by corona discharging at +6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE VIII-1

| Example No. | $V_s$ (volts) | $V_r$ (volts) | $E_{\frac{1}{2}}$ (lux · sec) |
| --- | --- | --- | --- |
| Example VIII-1 | 630 | 80 | 4.9 |
| Example VIII-2 | 730 | 80 | 5.1 |
| Example VIII-3 | 600 | 80 | 4.9 |
| Example VIII-4 | 660 | 90 | 5.4 |
| Example VIII-5 | 640 | 100 | 5.4 |
| Example VIII-6 | 630 | 100 | 5.1 |
| Example VIII-7 | 650 | 70 | 5.1 |
| Example VIII-8 | 680 | 60 | 5.0 |
| Example VIII-9 | 650 | 70 | 4.4 |
| Example VIII-10 | 700 | 100 | 5.0 |
| Example VIII-11 | 700 | 100 | 4.8 |
| Example VIII-12 | 640 | 50 | 4.2 |
| Example VIII-13 | 620 | 60 | 5.7 |
| Example VIII-14 | 610 | 70 | 5.9 |
| Example VIII-15 | 670 | 40 | 5.0 |

As can be seen in Table VIII-1, the photosensitive members of Examples VIII-1 to VIII-15 as prepared by using the azo compounds Nos. VIII-1, IX-36 and X-71 each as the charge generating substance were satisfactory with respect to surface potential $V_s$, half decay exposure $E_{\frac{1}{2}}$ and residual potential $V_r$.

EXAMPLE VIII-16

A coating liquid was prepared by kneading in a mixer 100 weight parts of one of the azo compounds Nos. VIII-2 to VIII-35 shown hereinbefore (as the charge generating substance), 100 weight parts of a polyester resin (Vylon 200), and 10,000 weight parts of tetrahydrofuran for 3 hours. A charge generating layer was formed, in a dry thickness of about 0.5 μm, on an aluminum support by applying the coating liquid to the support. An ASPP-containing coating liquid prepared in the same manner as in Example VIII-4 by using ASPP in lieu of ABPH was coated on the charge generating layer to give a layer thickness (dry) of about 15 μm. Thus were prepared photosensitive members having the construction shown in FIG. 2.

The thus-obtained photosensitive members were measured for their electrophotographic characteristics using an electrostatic recording paper testing apparatus (Kawaguchi Denki model SP-428). The results obtained are shown in Table VIII-2.

The surface potential $V_s$ (volts) of each photosensitive member is the initial surface potential attained upon negatively charging the photosensitive member surface by corona discharging at −6.0 kV in the dark for 10 seconds. After allowing the member to stand in the dark for 2 seconds following discontinuation of the corona discharge, the surface potential $V_d$ (volts) was measured. The photosensitive member surface was then further irradiated with white light at an illuminance of 2 lux, and the time (in seconds) required for the illumination to discharge the member surface to half of $V_d$ was measured and the half decay exposure amount $E_{\frac{1}{2}}$ (lux·sec) was calculated. The residual potential $V_r$ (volts) is the surface potential after 10 seconds of irradiation with white light at an illuminance of 2 lux.

TABLE VIII-2

| Compound No. | $E_{\frac{1}{2}}$ (lux · sec) | $V_r$ (volts) |
|---|---|---|
| VIII-2 | 6.1 | −60 |
| VIII-3 | 5.6 | −90 |
| VIII-4 | 3.9 | −40 |
| VIII-5 | 4.5 | −60 |
| VIII-6 | 4.9 | −90 |
| VIII-7 | 4.9 | −80 |
| VIII-8 | 4.3 | −30 |
| VIII-9 | 5.1 | −70 |
| VIII-10 | 4.9 | −40 |
| VIII-11 | 4.5 | −70 |
| VIII-12 | 5.3 | −30 |
| VIII-13 | 4.9 | −90 |
| VIII-14 | 6.1 | −90 |
| VIII-15 | 4.9 | −80 |
| VIII-16 | 5.8 | −110 |
| VIII-17 | 5.6 | −80 |
| VIII-18 | 5.4 | −60 |
| VIII-19 | 5.9 | −50 |
| VIII-20 | 4.2 | −30 |
| VIII-21 | 6.1 | −50 |
| VIII-22 | 6.2 | −60 |
| VIII-23 | 5.2 | −90 |
| VIII-24 | 4.3 | −40 |
| VIII-25 | 4.9 | −60 |
| VIII-26 | 4.1 | −90 |
| VIII-27 | 4.6 | −80 |
| VIII-28 | 4.5 | −30 |
| VIII-29 | 4.7 | −80 |
| VIII-30 | 5.0 | −70 |
| VIII-31 | 5.5 | −50 |
| VIII-32 | 4.4 | −60 |
| VIII-33 | 5.9 | −40 |
| VIII-34 | 4.8 | −90 |
| VIII-35 | 4.6 | −90 |

As can be seen in Table VIII-2, the photosensitive members prepared by using the azo compounds Nos. VIII-2 to VIII-35 were satisfactory with respect to half decay exposure $E_{\frac{1}{2}}$ and residual potential $V_r$.

EXAMPLE VIII-17

Photosensitive members were prepared in the same manner as in Example VIII-16 except that the same amount of the azo compounds Nos. IX-37 to IX-70 were used in lieu of the azo compounds Nos. VIII-2 to VIII-35. The photosensitive members were measured for characteristics. The results obtained are shown in Table IX.

TABLE IX

| Compound No. | $E_{\frac{1}{2}}$ (lux · sec) | $V_r$ (volts) |
|---|---|---|
| IX-37 | 5.0 | −70 |
| IX-38 | 5.3 | −60 |
| IX-39 | 3.8 | −50 |
| IX-40 | 4.1 | −80 |
| IX-41 | 4.8 | −70 |
| IX-42 | 4.6 | −60 |
| IX-43 | 4.2 | −50 |
| IX-44 | 5.5 | −90 |
| IX-45 | 4.8 | −80 |
| IX-46 | 4.1 | −60 |
| IX-47 | 5.2 | −90 |
| IX-48 | 4.8 | −80 |
| IX-49 | 5.8 | −110 |
| IX-50 | 4.2 | −50 |
| IX-51 | 5.6 | −60 |
| IX-52 | 5.1 | −90 |
| IX-53 | 5.1 | −90 |
| IX-54 | 5.2 | −60 |
| IX-55 | 4.9 | −40 |
| IX-56 | 4.1 | −40 |
| IX-57 | 4.2 | −80 |
| IX-58 | 5.9 | −40 |
| IX-59 | 4.9 | −50 |
| IX-60 | 4.5 | −60 |
| IX-61 | 4.6 | −90 |
| IX-62 | 4.0 | −70 |
| IX-63 | 4.9 | −70 |
| IX-64 | 4.6 | −80 |
| IX-65 | 5.9 | −80 |
| IX-66 | 5.6 | −70 |
| IX-67 | 5.2 | −60 |
| IX-68 | 5.3 | −50 |
| IX-69 | 4.9 | −90 |
| IX-70 | 6.0 | −80 |

As can be seen in Table IX, the photosensitive members prepared by using the azo compounds Nos. IX-37 to IX-70 were also satisfactory with respect to half decay exposure $E_{\frac{1}{2}}$ and residual potential $V_r$.

EXAMPLE IX-1

Photosensitive members were prepared in the same manner as in Example VIII-16 except that the same amount of the azo compounds Nos. X-72 to X-84 were used each as the charge generating substance in lieu of the azo compounds Nos. VIII-2 to VIII-35. The photosensitive members were measured for characteristics. The results obtained are shown in Table X.

TABLE X

| Compound No. | $E_{\frac{1}{2}}$ (lux · sec) | $V_r$ (volts) |
|---|---|---|
| X-72 | 3.1 | −30 |
| X-73 | 5.2 | −60 |
| X-74 | 6.5 | −90 |
| X-75 | 3.9 | −50 |
| X-76 | 5.1 | −40 |
| X-77 | 4.6 | −60 |
| X-78 | 5.5 | −50 |
| X-79 | 4.4 | −40 |
| X-80 | 5.8 | −20 |
| X-81 | 4.6 | −90 |
| X-82 | 5.8 | −30 |
| X-83 | 5.2 | −40 |
| X-84 | 4.0 | −60 |

As can be seen in Table X, the photosensitive members prepared by using the azo compounds Nos. X-72 to X-84 were also satisfactory with respect to half decay exposure $E_{\frac{1}{2}}$ and residual potential $V_r$.

As detailedly described hereinabove, the invention can provide photosensitive members which are highly sensitive both in the positive charging mode or in the negative charging mode and at the same time are excellent in repeated use characteristics as a result of the use of the azo compounds defined by the above general formulae (I) to (X) each as the charge generating substance in the photosensitive layer to be formed on an electroconductive substrate. When required, the durability of the photosensitive members can be improved by providing a covering layer on the surface.

While the invention has been described in detail and with reference to specific embodiments thereof, it will be apparent to one skilled in the art that various changes and modifications can be made therein without departing from the spirit and scope thereof.

What is claimed is:

1. A photosensitive member for electrophotography which comprises an electroconductive substrate and a photosensitive layer containing at least one member of the group consisting of thiophene structure-containing azo compounds having one of the general formulae (I) to (X):

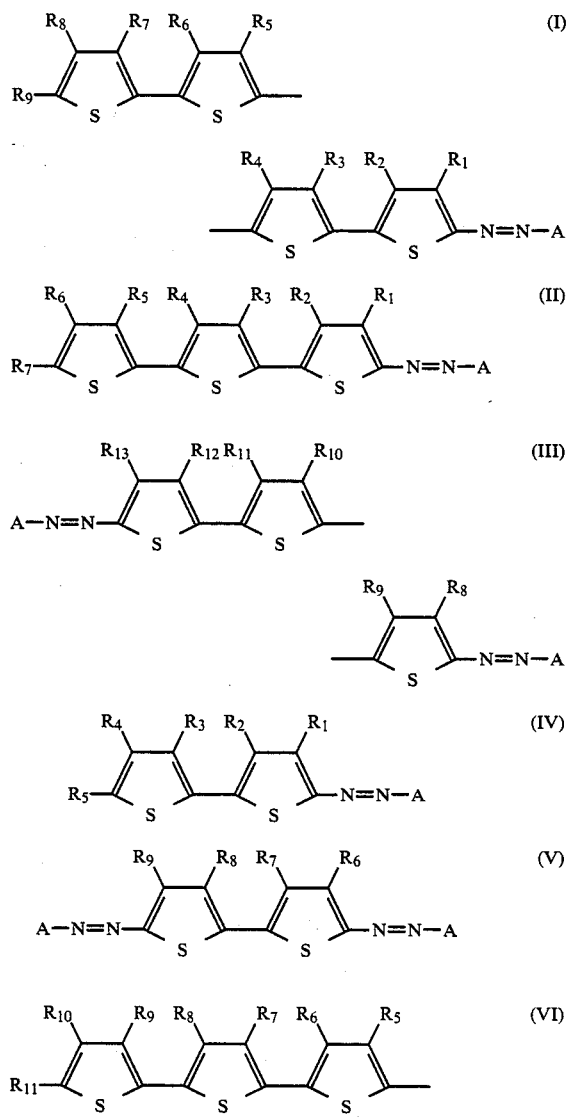

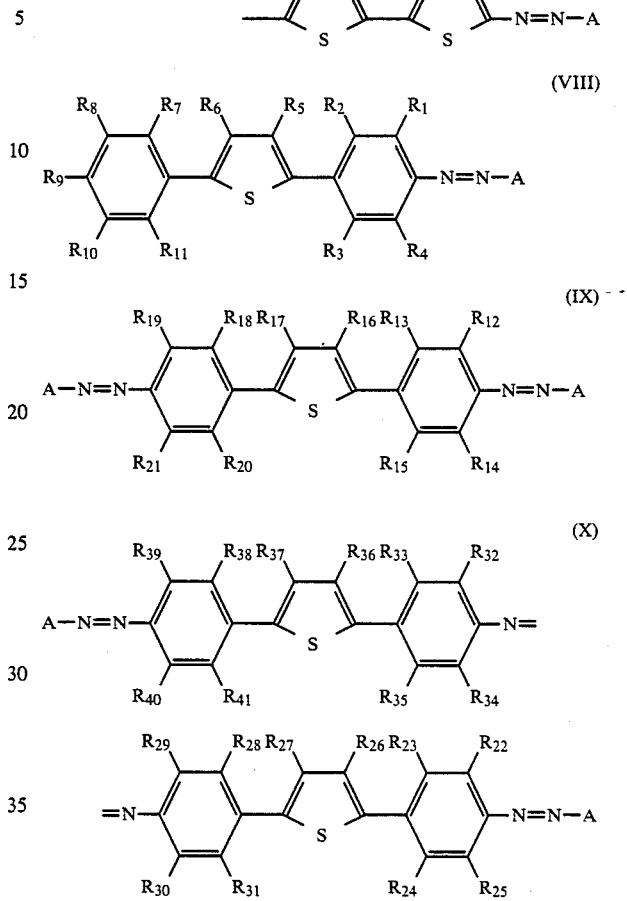

wherein $R_1$ to $R_{41}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group, or a cyano group, and A represents a coupler residue.

2. The photosensitive member as claimed in claim 1, wherein said azo compound is represented by the general formula (I):

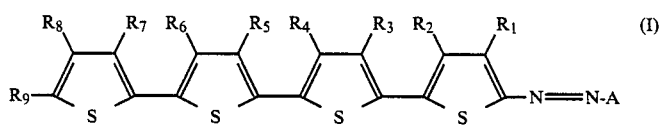

wherein $R_1$ to $R_9$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

3. The photosensitive member as claimed in claim 1, wherein said azo compound is represented by the general formula (II):

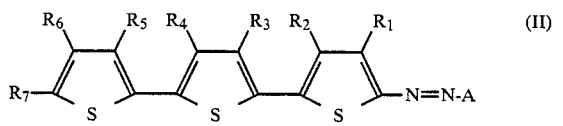

(II)

wherein $R_1$ to $R_7$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

4. The photosensitive member as claimed in claim 1, wherein said azo compound is represented by the general formula (III):

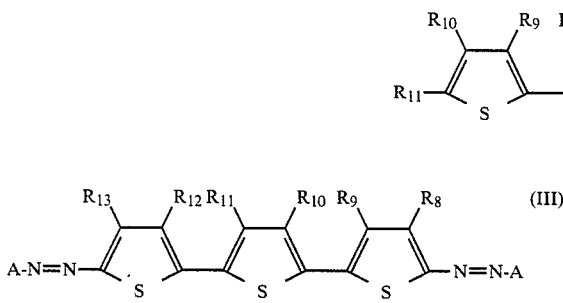

(III)

wherein $R_8$ to $R_{13}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

5. The photosensitive member as claimed in claim 1, wherein said azo compound is represented by the general formula (IV):

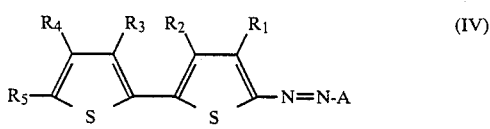

(IV)

wherein $R_1$ to $R_4$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

6. The photosensitive member as claimed in claim 1, wherein said azo compound is represented by the general formula (V):

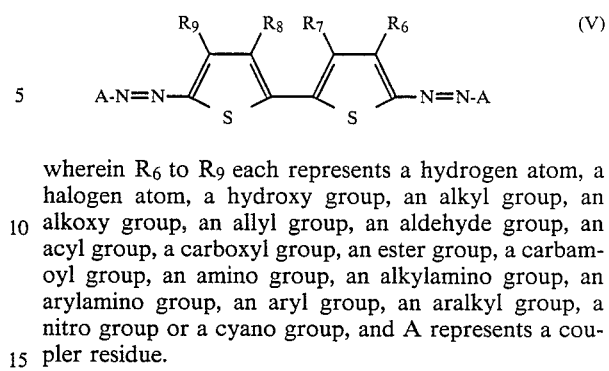

(V)

wherein $R_6$ to $R_9$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

7. The photosensitive member as claimed in claim 1, wherein said azo compound is represented by the general formula (VI):

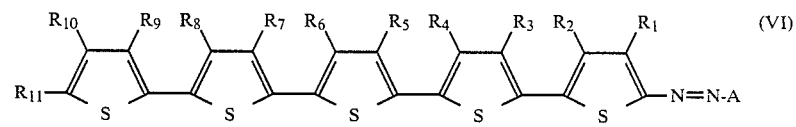

(VI)

wherein $R_1$ to $R_{11}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

8. The photosensitive member as claimed in claim 1, wherein said azo compound is represented by the general formula (VII):

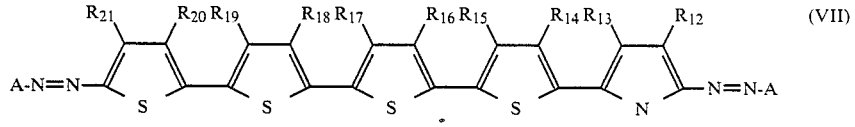

(VII)

wherein $R_{12}$ to $R_{21}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

9. The photosensitive member as claimed in claim 1 wherein said azo compound is represented by the general formula (VIII):

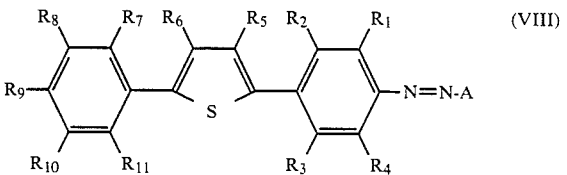

(VIII)

wherein $R_1$ to $R_{11}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

10. The photosensitive member as claimed in claim 1, wherein said azo compound is represented by the general formula (IX):

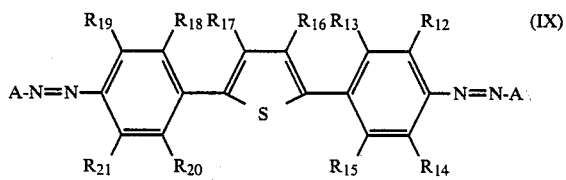
(IX)

wherein $R_{12}$ to $R_{21}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

11. The photosensitive member as claimed in claim 1, wherein said azo compound is represented by the general formula (X):

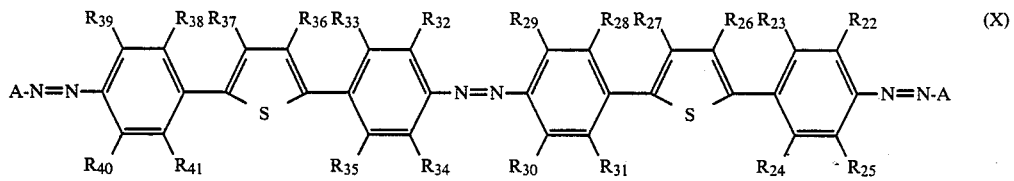
(X)

wherein $R_{22}$ to $R_{41}$ each represents a hydrogen atom, a halogen atom, a hydroxy group, an alkyl group, an alkoxy group, an allyl group, an aldehyde group, an acyl group, a carboxyl group, an ester group, a carbamoyl group, an amino group, an alkylamino group, an arylamino group, an aryl group, an aralkyl group, a nitro group or a cyano group, and A represents a coupler residue.

12. The photosensitive member as claimed in claim 1, wherein said photosensitive layer comprises a dispersion of a charge generating substance and a charge transporting substance in a binder resin, and said charge generating substance is a compound selected from thiophene structure-containing azo compound represented by one of the general formulae (I) to (X).

13. The photosensitive member as claimed in claim 1, wherein said photosensitive layer comprises a laminate of a charge generating layer mainly composed of a charge generating substance and a charge transport layer, and said charge generating substance is a compound selected from thiophene structure-containing azo compound represented by one of the general formulae (I) to (X).

* * * * *